(12) United States Patent
Hajjar et al.

(10) Patent No.: US 7,733,310 B2
(45) Date of Patent: Jun. 8, 2010

(54) DISPLAY SCREENS HAVING OPTICAL FLUORESCENT MATERIALS

(75) Inventors: Roger A. Hajjar, San Jose, CA (US);
David Kindler, Concord, MA (US);
Patrick Tan, Wellesley, MA (US);
David Kent, Framingham, MA (US);
Phillip H. Malyak, Canton, MA (US)

(73) Assignee: Prysm, Inc., San Jose, CA (US)

( * ) Notice: Subject to any disclaimer, the term of this patent is extended or adjusted under 35 U.S.C. 154(b) by 942 days.

(21) Appl. No.: 11/337,170

(22) Filed: Jan. 19, 2006

(65) Prior Publication Data
US 2007/0014318 A1    Jan. 18, 2007

Related U.S. Application Data

(63) Continuation of application No. 11/335,813, filed on Jan. 18, 2006, and a continuation-in-part of application No. 11/116,998, filed on Apr. 27, 2005, now Pat. No. 7,474,286.

(60) Provisional application No. 60/733,342, filed on Nov. 2, 2005, provisional application No. 60/690,760, filed on Jun. 14, 2005, provisional application No. 60/683,381, filed on May 20, 2005, provisional application No. 60/667,839, filed on Apr. 1, 2005.

(51) Int. Cl.
*G09G 3/34* (2006.01)
(52) U.S. Cl. .......................... 345/84; 359/457; 348/744
(58) Field of Classification Search ......... 359/455–457, 359/71; 345/84, 75.2, 81; 356/951; 348/744
See application file for complete search history.

(56) References Cited

U.S. PATENT DOCUMENTS

| | | | |
|---|---|---|---|
| 2,439,181 A * | 4/1948 | Nicoll | 250/459.1 |
| 3,025,161 A | 3/1962 | Thaddeus | |
| 3,556,637 A | 1/1971 | Palmquist | |
| 3,652,956 A * | 3/1972 | Pinnow et al. | 359/278 |
| 3,691,482 A | 9/1972 | Pinnow et al. | |

(Continued)

FOREIGN PATENT DOCUMENTS

DE        10044603        4/2001

(Continued)

OTHER PUBLICATIONS

Withnall et al., "Studies of UV stimulated luminesence from phosphors of commerical importance," Central Laser Facility Annual Report 2004/2005 http://www.clf.rl.ac.uk/Reports/2004-2005/pdf/64.pdf [accessed on Mary 23, 2008], 2 pages.

(Continued)

*Primary Examiner*—Amare Mengitsu
*Assistant Examiner*—Koosha Sharifi
(74) *Attorney, Agent, or Firm*—Fish & Richardson P.C.

(57) ABSTRACT

Fluorescent screens and display systems and devices based on such screens using at least one excitation optical beam to excite one or more fluorescent materials on a screen which emit light to form images. The fluorescent materials may include phosphor materials and non-phosphor materials such as quantum dots. A screen may include a multi-layer dichroic layer.

44 Claims, 46 Drawing Sheets

U.S. PATENT DOCUMENTS

| | | | |
|---|---|---|---|
| 3,750,189 A | 7/1973 | Fleischer | |
| 4,165,154 A * | 8/1979 | Takahashi | 359/455 |
| 4,166,233 A * | 8/1979 | Stanley | 313/422 |
| 4,307,320 A | 12/1981 | Kotera et al. | |
| 4,401,362 A | 8/1983 | Maeda | |
| 4,512,911 A | 4/1985 | Kotera et al. | |
| 4,613,201 A | 9/1986 | Shortle et al. | |
| 4,624,528 A | 11/1986 | Brueggemann | |
| 4,661,419 A | 4/1987 | Nakamura | |
| 4,707,093 A | 11/1987 | Testa | |
| 4,737,840 A * | 4/1988 | Morishita | 348/59 |
| 4,816,920 A | 3/1989 | Paulsen | |
| 4,923,262 A | 5/1990 | Clay | |
| 4,978,202 A | 12/1990 | Yang | |
| 4,979,030 A | 12/1990 | Murata | |
| 5,054,866 A | 10/1991 | Tomita et al. | |
| 5,080,467 A | 1/1992 | Kahn et al. | |
| 5,089,907 A | 2/1992 | Yoshikawa et al. | |
| 5,094,788 A | 3/1992 | Schrenk et al. | |
| 5,122,905 A | 6/1992 | Wheatley et al. | |
| 5,136,426 A | 8/1992 | Linden et al. | |
| 5,138,441 A | 8/1992 | Tanaka | |
| 5,140,604 A | 8/1992 | Alablanche et al. | |
| 5,146,355 A | 9/1992 | Prince et al. | |
| 5,166,944 A | 11/1992 | Conemac | |
| 5,175,637 A * | 12/1992 | Jones et al. | 349/1 |
| 5,182,659 A | 1/1993 | Clay et al. | |
| 5,198,679 A | 3/1993 | Katoh et al. | |
| 5,213,918 A * | 5/1993 | Donofrio | 430/23 |
| 5,255,113 A | 10/1993 | Yoshikawa et al. | |
| 5,269,995 A | 12/1993 | Ramanathan et al. | |
| 5,270,842 A | 12/1993 | Clay et al. | |
| 5,296,922 A * | 3/1994 | Mitani et al. | 348/779 |
| 5,365,288 A | 11/1994 | Dewald et al. | |
| 5,389,324 A | 2/1995 | Lewis et al. | |
| 5,414,521 A | 5/1995 | Ansley | |
| 5,442,254 A * | 8/1995 | Jaskie | 313/485 |
| 5,473,396 A * | 12/1995 | Okajima et al. | 353/122 |
| 5,475,524 A | 12/1995 | Harris | |
| 5,477,285 A | 12/1995 | Riddle et al. | |
| 5,477,330 A | 12/1995 | Dorr | |
| 5,491,578 A | 2/1996 | Harris | |
| 5,526,166 A | 6/1996 | Genovese | |
| 5,541,731 A | 7/1996 | Freedenberg et al. | |
| 5,550,667 A | 8/1996 | Krimmel et al. | |
| 5,587,818 A | 12/1996 | Lee | |
| 5,594,556 A | 1/1997 | Vronsky et al. | |
| 5,598,292 A | 1/1997 | Yoshikawa et al. | |
| 5,602,445 A | 2/1997 | Solanki et al. | |
| 5,614,961 A | 3/1997 | Gibeau et al. | |
| 5,633,736 A | 5/1997 | Griffith et al. | |
| 5,646,766 A | 7/1997 | Conemac | |
| 5,648,181 A | 7/1997 | Watanabe | |
| 5,666,174 A | 9/1997 | Cupolo, III | |
| 5,668,662 A | 9/1997 | Magocs et al. | |
| 5,670,209 A | 9/1997 | Wyckoff | |
| 5,684,552 A | 11/1997 | Miyamoto et al. | |
| 5,698,857 A | 12/1997 | Lambert et al. | |
| 5,710,021 A | 1/1998 | Hintz et al. | |
| 5,715,021 A | 2/1998 | Gibeau et al. | |
| 5,716,118 A | 2/1998 | Sato et al. | |
| 5,744,061 A * | 4/1998 | Bredol et al. | 252/301.6 S |
| 5,870,224 A | 2/1999 | Saitoh et al. | |
| 5,882,774 A | 3/1999 | Jonza et al. | |
| 5,907,312 A | 5/1999 | Sato et al. | |
| 5,920,361 A | 7/1999 | Gibeau et al. | |
| 5,959,296 A | 9/1999 | Cyr et al. | |
| 5,973,813 A | 10/1999 | Takeuchi | |
| 5,976,424 A | 11/1999 | Weber et al. | |
| 5,978,142 A | 11/1999 | Blackham et al. | |
| 5,994,722 A | 11/1999 | Averbeck et al. | |
| 5,998,918 A | 12/1999 | Do et al. | |
| 5,998,925 A | 12/1999 | Shimizu et al. | |
| 6,008,925 A | 12/1999 | Conemac | |
| 6,010,751 A | 1/2000 | Shaw et al. | |
| 6,057,953 A | 5/2000 | Ang | |
| 6,064,417 A | 5/2000 | Harrigan et al. | |
| 6,066,861 A | 5/2000 | Hohn et al. | |
| 6,069,599 A | 5/2000 | Py et al. | |
| 6,080,467 A | 6/2000 | Weber et al. | |
| 6,088,163 A | 7/2000 | Gilbert et al. | |
| 6,101,032 A | 8/2000 | Wortman et al. | |
| 6,117,530 A | 9/2000 | Jonza et al. | |
| 6,118,516 A | 9/2000 | Irie et al. | |
| 6,128,131 A | 10/2000 | Tang | |
| 6,134,050 A | 10/2000 | Conemac | |
| 6,154,259 A | 11/2000 | Hargis et al. | |
| 6,157,490 A | 12/2000 | Wheatley et al. | |
| 6,172,810 B1 | 1/2001 | Fleming et al. | |
| 6,175,440 B1 | 1/2001 | Conemac | |
| 6,219,168 B1 | 4/2001 | Wang | |
| 6,224,216 B1 | 5/2001 | Parker | |
| 6,226,126 B1 | 5/2001 | Conemac | |
| 6,252,254 B1 | 6/2001 | Soules et al. | |
| 6,255,670 B1 | 7/2001 | Srivastava et al. | |
| 6,288,817 B2 | 9/2001 | Rowe | |
| 6,329,966 B1 * | 12/2001 | Someya et al. | 345/22 |
| 6,333,724 B1 | 12/2001 | Taira et al. | |
| 6,417,019 B1 | 7/2002 | Mueller et al. | |
| 6,429,583 B1 | 8/2002 | Levinson et al. | |
| 6,429,584 B2 | 8/2002 | Kubota | |
| 6,463,585 B1 | 10/2002 | Hendricks et al. | |
| 6,531,230 B1 | 3/2003 | Weber et al. | |
| 6,576,156 B1 | 6/2003 | Ratna et al. | |
| 6,621,593 B1 | 9/2003 | Wang et al. | |
| 6,621,609 B1 | 9/2003 | Conemac | |
| 6,628,248 B2 | 9/2003 | Masumoto et al. | |
| 6,678,081 B2 | 1/2004 | Nishihata et al. | |
| 6,717,704 B2 | 4/2004 | Nakai | |
| 6,765,237 B1 | 7/2004 | Doxsee et al. | |
| 6,777,861 B2 | 8/2004 | Russ et al. | |
| 6,809,347 B2 | 10/2004 | Tasch et al. | |
| 6,809,781 B2 | 10/2004 | Setlur et al. | |
| 6,839,042 B2 | 1/2005 | Conemac et al. | |
| 6,853,131 B2 | 2/2005 | Srivastava et al. | |
| 6,900,916 B2 | 5/2005 | Okazaki et al. | |
| 6,905,220 B2 | 6/2005 | Wortman et al. | |
| 6,937,221 B2 | 8/2005 | Lippert et al. | |
| 6,937,383 B2 | 8/2005 | Morikawa et al. | |
| 6,947,198 B2 | 9/2005 | Morikawa et al. | |
| 6,986,581 B2 | 1/2006 | Sun et al. | |
| 6,987,610 B2 | 1/2006 | Piehl | |
| 7,068,406 B2 | 6/2006 | Shimomura | |
| 7,088,335 B2 | 8/2006 | Hunter et al. | |
| 7,090,355 B2 | 8/2006 | Liu et al. | |
| 7,147,802 B2 | 12/2006 | Sugimoto et al. | |
| 7,181,417 B1 | 2/2007 | Langseth et al. | |
| 7,213,923 B2 | 5/2007 | Liu et al. | |
| 7,230,767 B2 | 6/2007 | Walck et al. | |
| 7,239,436 B2 | 7/2007 | Orttinger et al. | |
| 7,283,301 B2 | 10/2007 | Peeters et al. | |
| 7,302,174 B2 | 11/2007 | Tan et al. | |
| 7,474,286 B2 | 1/2009 | Hajjar et al. | |
| 2001/0019240 A1 * | 9/2001 | Takahashi | 313/483 |
| 2001/0024086 A1 * | 9/2001 | Fox et al. | 313/495 |
| 2001/0050371 A1 | 12/2001 | Odaki et al. | |
| 2002/0003233 A1 | 1/2002 | Mueller-Mach et al. | |
| 2002/0008854 A1 | 1/2002 | Leigh Travis | |
| 2002/0024495 A1 | 2/2002 | Lippert et al. | |
| 2002/0050963 A1 | 5/2002 | Conemac et al. | |
| 2002/0122260 A1 | 9/2002 | Okazaki et al. | |
| 2002/0124250 A1 | 9/2002 | Proehl et al. | |
| 2002/0145685 A1 | 10/2002 | Mueller-Mach et al. | |
| 2002/0163702 A1 | 11/2002 | Hori et al. | |

| | | | | | | |
|---|---|---|---|---|---|---|
| 2002/0185965 | A1 | 12/2002 | Collins et al. | KR | 2002-0024425 | 3/2002 |
| 2003/0015692 | A1* | 1/2003 | Teng et al. ............... 252/582 | KR | 2003-0068589 | 8/2003 |
| 2003/0094893 | A1 | 5/2003 | Ellens et al. | WO | WO 90/12387 | 10/1990 |
| 2003/0184209 | A1 | 10/2003 | Russ et al. | WO | WO 92/22109 | 12/1992 |
| 2003/0184531 | A1 | 10/2003 | Morikawa et al. | WO | WO 00/20912 | 4/2000 |
| 2003/0184613 | A1 | 10/2003 | Nakamura et al. | WO | WO 01/88609 | 11/2001 |
| 2003/0184842 | A1 | 10/2003 | Morikawa et al. | WO | WO 02/23962 | 3/2002 |
| 2004/0027465 | A1 | 2/2004 | Smith et al. | WO | WO 02/33970 | 4/2002 |
| 2004/0070551 | A1 | 4/2004 | Walck et al. | WO | WO 02/057838 | 7/2002 |
| 2004/0141220 | A1 | 7/2004 | Hama et al. | WO | WO 02/071148 | 9/2002 |
| 2004/0145312 | A1 | 7/2004 | Ouderkirk et al. | WO | WO 2005/119797 | 12/2005 |
| 2004/0156079 | A1 | 8/2004 | Marshall et al. | WO | WO 2006/097876 | 9/2006 |
| 2004/0160516 | A1 | 8/2004 | Ford | WO | WO 2006/107720 | 10/2006 |
| 2004/0165642 | A1 | 8/2004 | Lamont | WO | WO 2007/050662 | 5/2007 |
| 2004/0184123 | A1 | 9/2004 | Moikawa et al. | WO | WO 2007/095329 | 8/2007 |
| 2004/0223100 | A1* | 11/2004 | Kotchick et al. ............ 349/114 | WO | WO 2007/114918 | 10/2007 |
| 2004/0227465 | A1 | 11/2004 | Menkara et al. | WO | WO 2007/131195 | 11/2007 |
| 2004/0263074 | A1 | 12/2004 | Baroky et al. | WO | WO 2007/134329 | 11/2007 |
| 2005/0001225 | A1 | 1/2005 | Yoshimura et al. | WO | WO 2008/116123 | 9/2008 |
| 2005/0012446 | A1 | 1/2005 | Jermann et al. | WO | WO 2008/124707 | 10/2008 |
| 2005/0023962 | A1 | 2/2005 | Menkara et al. | WO | WO 2008/144673 | 11/2008 |
| 2005/0023963 | A1 | 2/2005 | Menkara et al. | WO | WO 2009/003192 | 12/2008 |
| 2005/0051790 | A1 | 3/2005 | Ueda | | | |
| 2005/0094266 | A1 | 5/2005 | Liu et al. | | | |
| 2005/0093818 | A1 | 11/2005 | Hatam-Tabrizi et al. | | | |
| 2006/0050015 | A1* | 3/2006 | Kusunoki et al. ............ 345/30 | | | |
| 2006/0066508 | A1 | 3/2006 | Walck et al. | | | |
| 2006/0081793 | A1 | 4/2006 | Nesterovic et al. | | | |
| 2006/0082873 | A1 | 4/2006 | Allen et al. | | | |
| 2006/0088951 | A1 | 4/2006 | Hayashi et al. | | | |
| 2006/0132021 | A1 | 6/2006 | Naberhuis et al. | | | |
| 2006/0139580 | A1* | 6/2006 | Conner ........................ 353/98 | | | |
| 2006/0197922 | A1 | 9/2006 | Liu et al. | | | |
| 2006/0221021 | A1 | 10/2006 | Hajjar et al. | | | |
| 2006/0221022 | A1 | 10/2006 | Hajjar | | | |
| 2006/0227087 | A1 | 10/2006 | Hajjar et al. | | | |
| 2006/0262243 | A1 | 11/2006 | Lester et al. | | | |
| 2006/0266958 | A1 | 11/2006 | Shimizu et al. | | | |
| 2006/0290898 | A1 | 12/2006 | Liu et al. | | | |
| 2007/0183466 | A1 | 8/2007 | Son et al. | | | |
| 2007/0187580 | A1 | 8/2007 | Kykta et al. | | | |
| 2007/0187616 | A1 | 8/2007 | Burroughs et al. | | | |
| 2007/0188417 | A1 | 8/2007 | Hajjar et al. | | | |
| 2007/0206258 | A1 | 9/2007 | Malyak et al. | | | |
| 2007/0228927 | A1 | 10/2007 | Kindler et al. | | | |
| 2007/0229946 | A1 | 10/2007 | Okada et al. | | | |
| 2008/0018558 | A1 | 1/2008 | Kykta et al. | | | |
| 2008/0066107 | A1 | 3/2008 | Moonka et al. | | | |
| 2008/0068295 | A1 | 3/2008 | Hajjar | | | |
| 2008/0235749 | A1 | 9/2008 | Jain et al. | | | |
| 2008/0247020 | A1 | 10/2008 | Malyak et al. | | | |
| 2008/0291140 | A1 | 11/2008 | Kent et al. | | | |
| 2009/0001272 | A1 | 1/2009 | Hajjar | | | |
| 2009/0116107 | A1 | 5/2009 | Kindler et al. | | | |
| 2009/0153582 | A1 | 6/2009 | Hajjar et al. | | | |
| 2009/0174632 | A1 | 7/2009 | Hajjar et al. | | | |

FOREIGN PATENT DOCUMENTS

| | | |
|---|---|---|
| EP | 0196862 | 10/1986 |
| EP | 0271650 | 6/1988 |
| JP | 56164826 | 12/1981 |
| JP | 59-155826 | 9/1984 |
| JP | 02-157790 | 6/1990 |
| JP | 2-199975 | 8/1990 |
| JP | 5232583 | 9/1993 |
| JP | 06046461 A * | 2/1994 |
| JP | 2000-49380 | 2/2000 |
| JP | 2001-210122 | 8/2001 |
| JP | 2001-316664 | 11/2001 |
| JP | 2002-83549 | 3/2002 |
| JP | 2006-323391 | 11/2006 |
| KR | 10-2001-0097415 | 11/2001 |

OTHER PUBLICATIONS

"Fuji Film Color Mosaic Excellent for Image Sensor CM-EXIS," http://www.fujifilm-ffem.com/downloads/Product%20Spotlight%20Color%20Mosaic.pdf (1 page) [accessed May 27, 2008].

"Quantum Dots Explained," http://www.evidenttech.com/quantum-dots-explained.html (1 page) [accessed May 27, 2008].

"Reflection and retroreflection," Delta Technical Note—RS 101 http://www.delta.dk/C1256ED600446B80/sysOakFil/roadsensors%20techn%20info%20RS101/$File/RS101.pdf, revised: Jul. 10, 2004, 7 pages [accessed Oct. 23, 2008].

Collins et al., "Process Control of the Chlorobenzene Single-Step Liftoff Process with a Diazo-Type Resist," IBM J. Res. Develop. 26(5): 596-604 (Sep. 1982).

Cusano, D.A., "Cathodo-, Photo-, and D.C. -Electroluminescence in Zinc Sulfide Layers," Luminescence of Organic and Inorganic Materials, Kallman, H.P. and G.M. Spruch (Eds.), New York University, pp. 494-522 (1962).

Daud, A. et al., "Transparent $Y_2O_2S:Eu^{3+}$ phosphor thin films grown by reactive evaporation and their luminescent properties," Journal of the Society for Information Display (SID), vol. 4, No. 3, pp. 193-196 (1996).

Donofrio, R.L. and C.H. Rehkopf, "Screen Weight Optimization," Journal of the Electrochemical Society, vol. 126, No. 9, pp. 1563-1567 (Sep. 1979).

Greer, J.A. et al., "38.4: P-53 Thin Film Phosphors Prepared by Pulsed—Laser Deposition," 1994 SID International Symposium Digest of Technical Papers (SID '94 Digest) vol. XXV, pp. 827-830 (May 1994).

Hopkinson, R. G., "An Examination of Cathode-Ray-Tube Characteristics," The Journal of the Institute of Electrical Engineers, vol. 93, Part IIIa (Radiolocation), No. 5, pp. 779-794 (1946).

International Search Report and Written Opinion dated Aug. 29, 2008, for PCT/US2008/059603, filed Apr. 7, 2008, entitled: "Post-Objective Scanning Beam Systems".

International Search Report and Written Opinion dated Jul. 20, 2006 and International Preliminary Report on Patentability for dated Oct. 3, 2007 for PCT/US2006/11757, now WO 2006/107720, published on Oct. 12, 2006, entitled: "Display Systems and Devices Having Screens with Optical Fluorescent Materials".

International Search Report and Written Opinion dated Jun. 27, 2008 for PCT/US2008/057763, filed Mar. 20, 2008, entitled: "Delivering and Displaying Advertisement or Other Application Data to Display Systems".

International Search Report and Written Opinion dated Mar. 13, 2008 and International Preliminary Report on Patentability for dated Aug. 19, 2008 for PCT/US2007/004004, now WO 2007/095329, published on Aug. 23, 2007, entitled: "Servo-Assisted Scanning Beam Display Systems Using Fluorescent Screens".

International Search Report and Written Opinion dated May 28, 2008 for PCT/US06/41584, now Wo 2007/050662, published on May 3, 2007, entitled: "Optical Designs for Scanning Beam Display Systems Using Fluorescent Screens," 9 pages.

Kalkhoran, N.M. et al., "LP-E: *Late News Poster*: Luminescence Study of Ion-Implanted $ZnGa_2O_4$ Thin Films on Flexible Organic Substrates," 1997 SID International Symposium Digest of Technical Papers (SID '97 Digest), vol. XXVIII, pp. 623-626 (May 1997).

Kim, J.M. et al. "6.3: Development of 4-in. Full Color FED, Devices," 1997 SID International Symposium Digest of Technical Papers ( SID '97 Digest), vol. XVIII, pp. 56-59 (May 1997).

Kramer, C.J., "Hologon deflectors for graphic arts applications: an overview," SPIE Proceedings on Beam Deflection and Scanning Technologies 1454: 68-100 (1991).

Kramer, C.J., "Hologon deflectors incorporating dispersive optical elements for scan line bow correction," SPIE Proceedings on Holographic Optics: Design and Applications, 883: 230-244 (1988).

Loewen, E.G. et al., "Grating efficiency theory as it applies to blazed and holographic gratings," Applied Optics, vol. 16, No. 10, pp. 2711-2721 (Oct. 1977).

McDonald, L. W. and A. C. Lowe (Eds.), *Display Systems, Design Applications*, John Wiley & Sons: Chichester, England, pp. 195-196 (1997).

Mezner, L.Z. et al., "P-23: Centrifugal Settling of High Resolution 1-in CRT Screens," 1994 SID International Symposium Digest of Technical Papers (SID '94 Digest), vol. XXV, pp. 520-522 (May 1994).

Morikawa, M. et al., "S11-3 Study to Improve the Flood-Beam CRT for Giant Screen Display," Proceedings of the Twelfth International Display Research Conference, Japan Display '92, Oct. 12-14, 1992, International Conference Center, Hiroshima, Japan pp. 385-388.

Mueller-Mach, R. et al., "High-Power Phosphor-Converted Light Emitting Diodes Based on III-Nitrides," IEEE Journal on Selected Topics in Quantum Electronics 8(2): 339-345 (Mar./Apr. 2002).

Nonogaki, S. et al., "Dry Process for Phosphor Screen Fabrication of Multicolored Cathode Ray Tubes," Research & Development in Japan, pp. 50-55 (1984).

Oki, K. and L. Ozawa, "A phosphor screen for high-resolution CRTs," Journal of the SID, vol. 3, No. 2, pp. 51-57 (Sep. 1995).

Pringsheim, P. and M. Vogel, *Luminescence of Liquids and Solids and its Practical Applications*, Interscience Publishers, Inc.: New York, N.Y., pp. 144-145 (1946).

Rowe, D.M., "Developments in holographic-based scanner designs," Proc. SPIE, Optical Scanning Systems: Design and Applications, Leo Beiser and Stephen F. Sagan, Eds. vol. 3131: 52-58 (1997).

Rynearson, R.L. et al., "Low-cost, mechanically rigid, high-aspect-ratio mirrors," SPIE Proceedings on Design, Fabrication, and Applications of Precision Plastic Optics 2600: 137-143 (1995).

Schermerhorn, J.D. et al., "15.5: A Grooved Structure for a Large High-Resolution Color ACPDP," 1997 SID International Symposium Digest of Technical Papers ( SID '97 Digest), vol. XVII, pp. 229-232 (May 1997).

Schlesinger et al., "Screening," Design, Development, and Fabrication of Ultra-High-Resolution Cathode Ray tube. Technical Report ECOM-00476, pp. 64-72, Feb. 1969.

Smith, D.C. et. al., "32.5: Late-News Paper: Crystalline-As-Deposited $CaGa2S_4$:Ce via Low Temperature Metal Organic Chemical Vapor Deposition," 1995 SID International Symposium Digest of Technical Papers (SID '95 Digest), vol. XXVI, pp. 728-731 (May 1995).

Smith, W.J., "Scanner/f-0 and Laser Disk Collimator Lenses," Chapter 22 in Modern Lens Design: A Resource Manual, pp. 411-430, Boston, Mass.: McGraw-Hill, Inc., 1992.

Yocom, P. N., "Future requirements of display phosphors from an historical perspective," Journal of the Society for Information Display (SID), Special Section: Papers from the First International Conference on the Science and Technology of Display Phosphors, vol. 4, No. 3, pp. 149-152 (Oct. 1996).

Yocom, P. N., "New green phosphors for plasma displays," Journal of the Society for Information Display (SID), Special Section: Papers from the First International Conference on the Science and Technology of Display Phosphors, vol. 4, No. 3, pp. 169-172 (Oct. 1996).

Županc-Mežnar, L. and M. Žumer, "26.4:Preparation of P43 Suspension and Screen-Quality Evaluation in 1—in. CRTs", 1997 SID International Symposium Digest of Technical Papers ( SID '97 Digest), vol. XVIII, pp. 440-443 (May 1997).

USPTO Non-Final Action in U.S. Appl. No. 11/116,998, mailed Aug. 5, 2008, 25 pages.

Supplementary European Search Report dated Jul. 29, 2009 for European Patent Application No. 06836510.5 (6 pages).

Supplementary European Search Report dated Mar. 25, 2009 for European Patent Application No. 06740108.3 (7 pages).

The Korean Intellectual Property Office, Office Action dated Mar. 31, 2009 for Korean Patent Application No. 10-2007-7025455 (4 pages).

English language translation of The Korean Intellectual Property Office, Office Action dated Mar. 31, 2009 for Korean Patent Application No. 10-2007-7025455 (5 pages).

International Search Report and Written Opinion dated Nov. 24, 2008 for PCT/US07/68989, now WO 2007/134329, published on Nov. 22, 2007 and entitled: "Multilayered Fluorescent Screens for Scanning Beam Display Systems" 9 pages.

International Search Report and Written Opinion dated Nov. 28, 2008 for PCT/US2008/064169, now WO 2008/144673, published on Nov. 27, 2007 and entitled: "Multilayered Screens with Light-Emitting Stripes for Scanning Beam Display Systems" 9 pages.

International Search Report and Written Opinion dated Nov. 26, 2008 for PCT/US2008/068679, now WO 2009/003192, published on Dec. 31, 2008 and entitled: "Servo Feedback Control Based On Designated Scanning Servo Beam In Scanning Beam Display Systems With Light-Emitting Screens" 11 pages.

\* cited by examiner

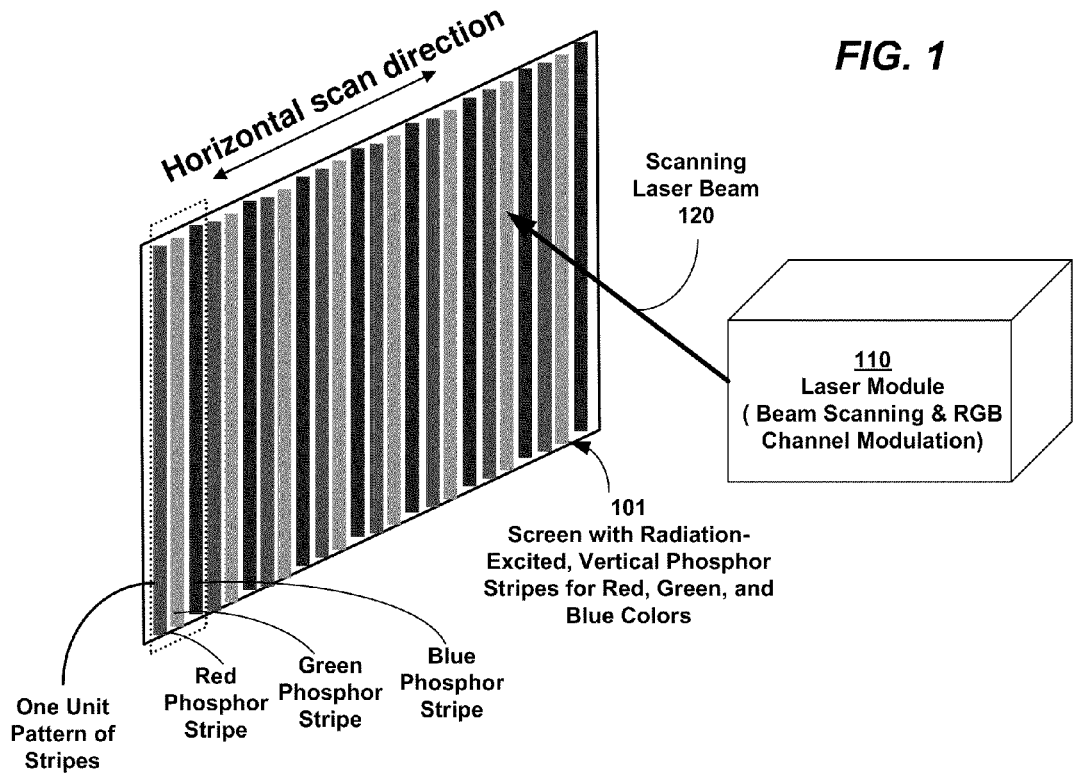
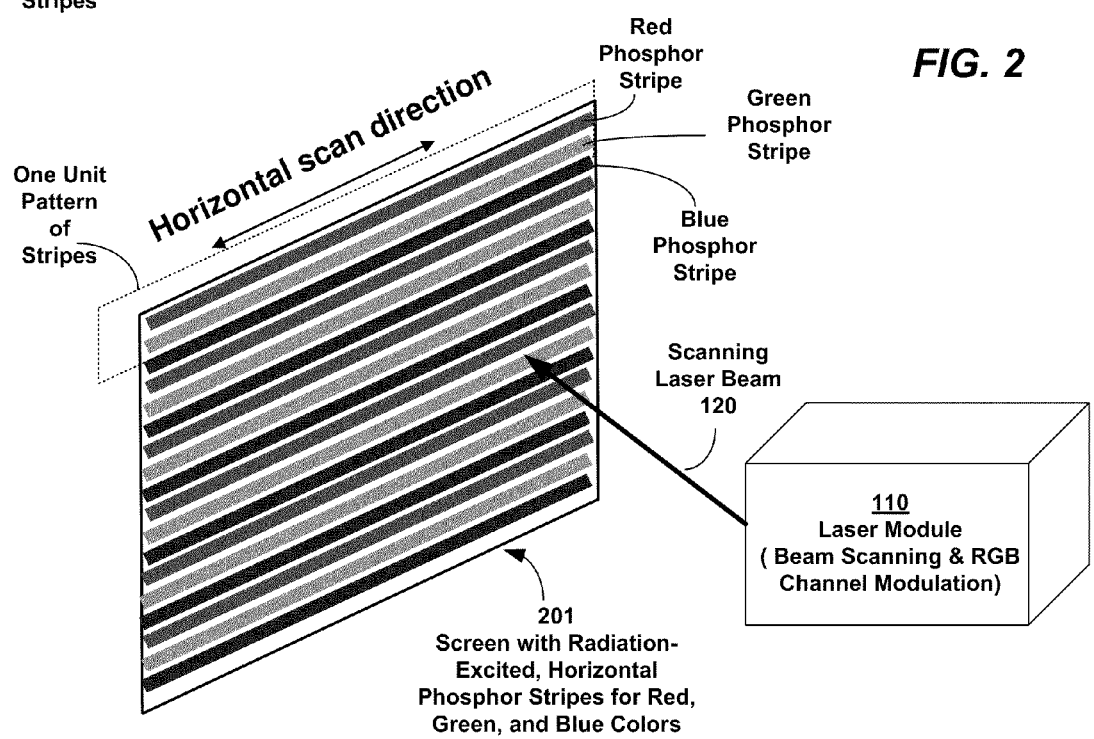

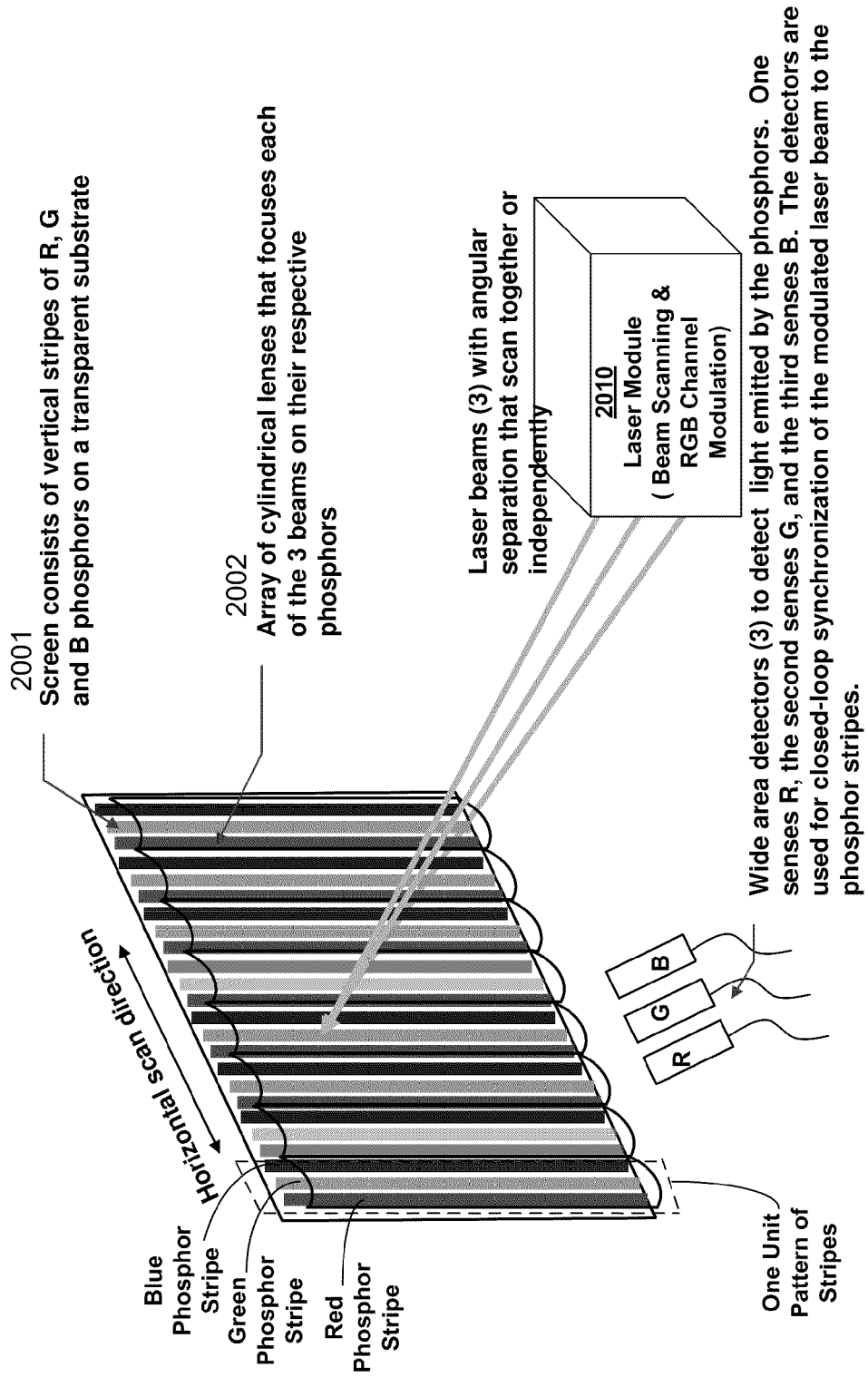

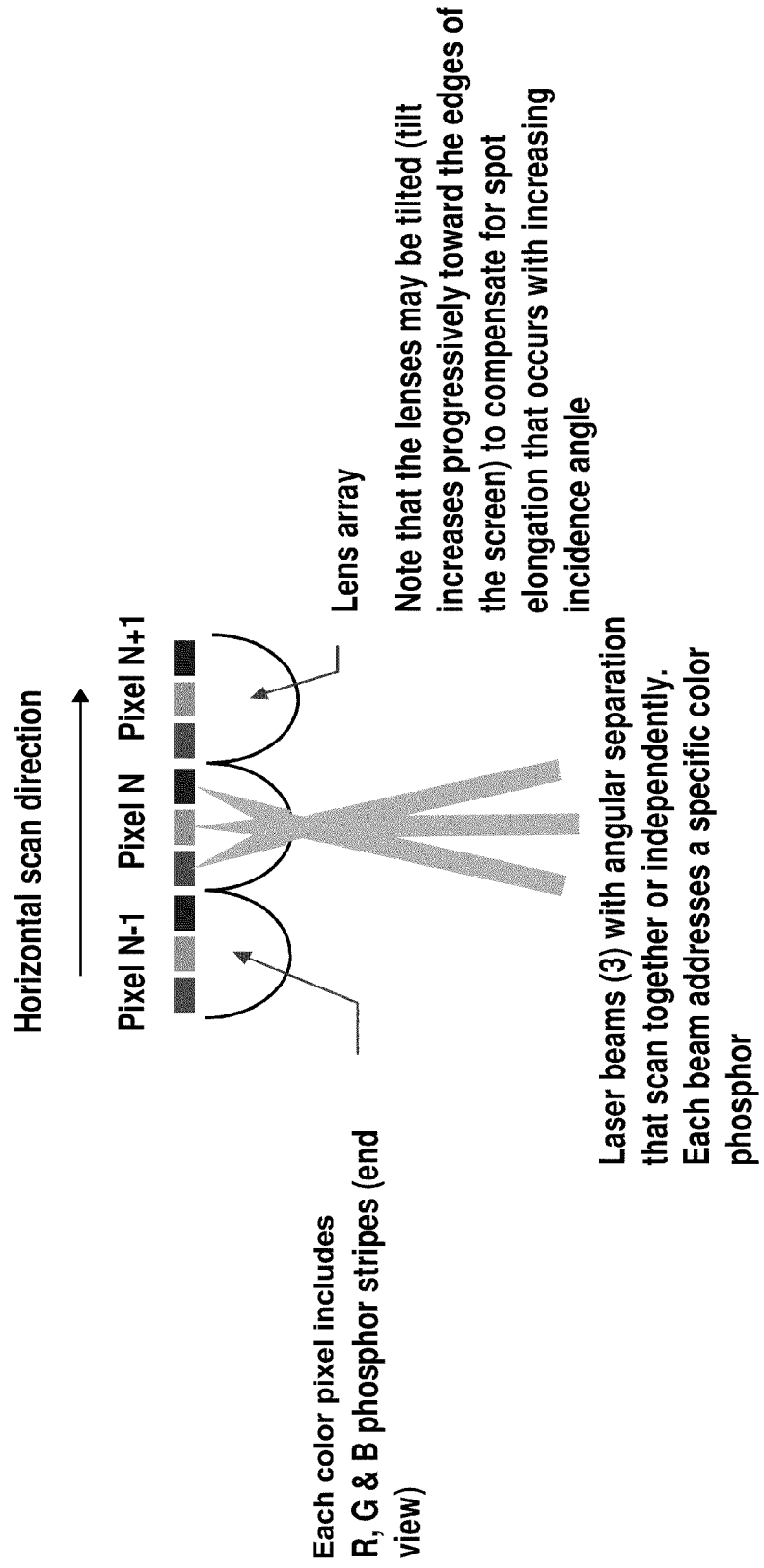

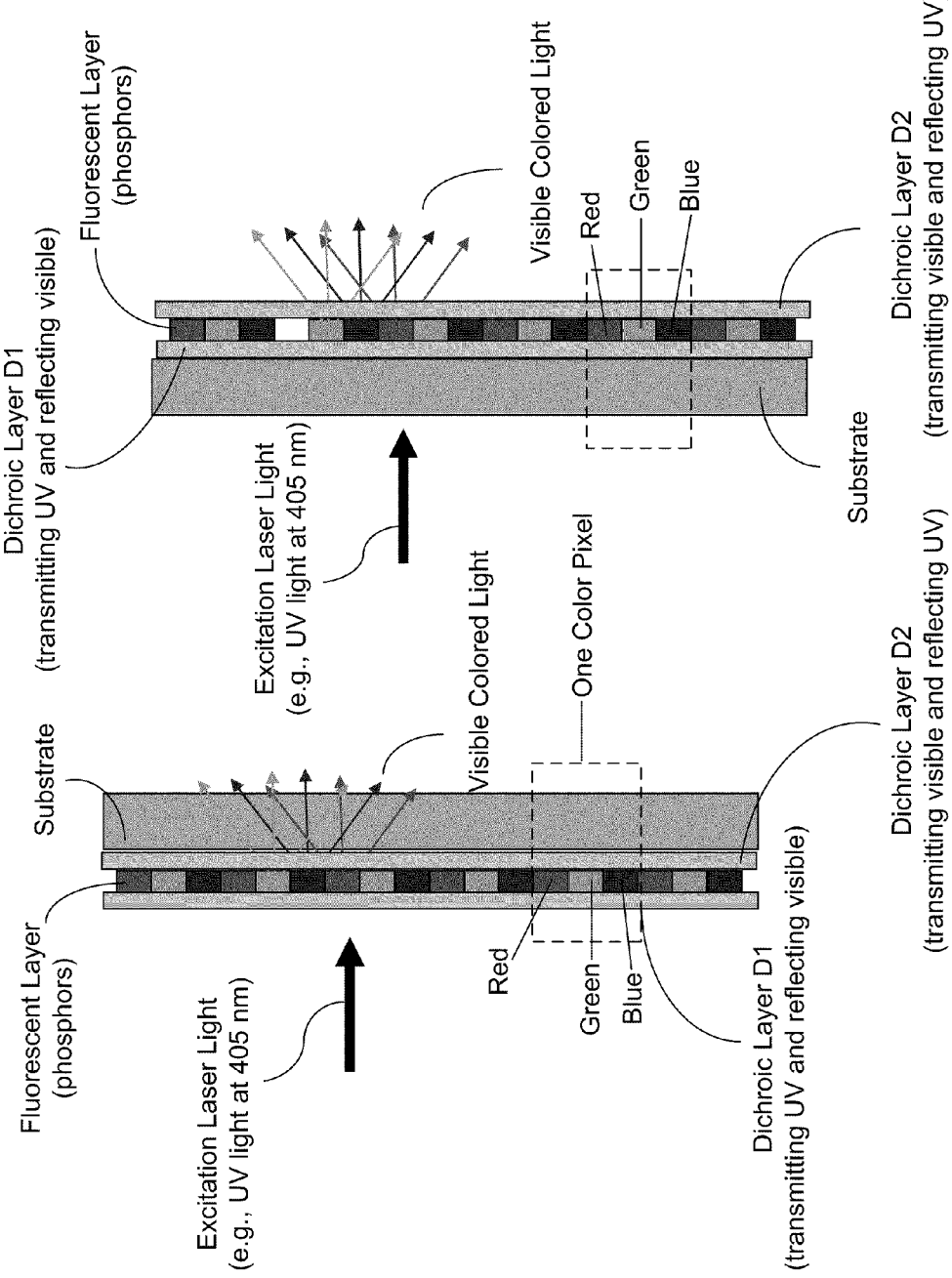

DISPLAY SCREENS HAVING OPTICAL FLUORESCENT MATERIALS

This application claims the benefits of the following four U.S. provisional applications:

1. U.S. provisional application No. 60/667,839 entitled "Laser Displays" and filed Apr. 1, 2005,
2. U.S. provisional application No. 60/683,381 entitled "Display Screen Having UV-Excitable Phosphors" and filed May 20, 2005,
3. U.S. provisional application No. 60/690,760 entitled "Display Screen Having Lens Array, Transmitting Slit Array and UV-Excitable Phosphors" and filed Jun. 14, 2005, and
4. U.S. provisional application No. 60/733,342 entitled "Display Screens Having Multi-Layer Dichroic Layer and UV-Excitable Phosphors" and filed Nov. 2, 2005.

This application also claims the benefit of and is a continuation-in-part application of U.S. patent application Ser. No. 11/116,998 entitled "Laser Displays Using UV-Excitable Phosphors Emitting Visible Colored Light" and filed Apr. 27, 2005 now U.S. Pat. No. 7,474,286.

In addition, this application claims the benefit of and is a continuation application of U.S. patent application Ser. No. 11/335,813 entitled "Display Systems Having Screens With Optical Fluorescent Materials" and filed Jan. 18, 2006.

The entire disclosures of the above 6 U.S. patent applications are incorporated by reference as part of the specification of this application.

BACKGROUND

This application relates to display systems that use screens with fluorescent materials to emit colored light under optical excitation, such as laser-based image and video displays and screen designs for such displays.

Many image and video displays are designed to directly produce color images in different colors, such as red, green and blue and then project the color images on a screen. Such systems are often referred to as "projection displays" where the screen is simply a surface to make the color images visible to a viewer. Such projection displays may use white light sources where white beams are filtered and modulated to produce images in red, green and blue colors. Alternatively, three light sources in red, green and blue may be used to directly produce three beams in red, green and blue colors and the three beams are modulated to produce images in red, green and blue. Examples of such projection displays include digital light processing (DLP) displays, liquid crystal on silicon (LCoS) displays, and grating light valve (GLV) displays. Notably, GLV displays use three grating light valves to modulate red, green and blue laser beams, respectively, and use a beam scanner to produce the color images on a screen. Another example of laser-based projection displays is described in U.S. Pat. No. 5,920,361 entitled "Methods and apparatus for image projection." Projection displays use optical lens systems to image and project the color images on the screen.

Some other image and video displays use a "direct" configuration where the screen itself includes light-producing color pixels to directly form color images in the screen. Such direct displays eliminate the optical lens systems for projecting the images and therefore can be made relatively smaller than projection displays with the same screen sizes. Examples of direct display systems include plasma displays, liquid crystal displays (LCDs), light-emitting-diode (LED) displays (e.g., organic LED displays), and field-emission displays (FEDs). Each color pixel in such direct displays includes three adjacent color pixels which produce light in red, green and blue, respectively, by either directly emit colored light as in LED displays and FEDs or by filtering white light such as the LCDs.

These and other displays are replacing cathode-ray tube (CRT) displays which dominated the display markets for decades since its inception. CRT displays use scanning electron beams in a vacuum tube to excite color phosphors in red, green and blue colors on the screen to emit colored light to produce color images. Although CRT displays can produce vivid colors and bright images with high resolutions, the use of cathode-ray tubes places severe technical limitations on the CRT displays and leads to dramatic decline in demand for CRT displays in recent years.

SUMMARY

The display systems and techniques described in this application include fluorescent screens using at least one excitation optical beam to excite one or more fluorescent materials on a screen to emit light to form images. The fluorescent materials may include phosphor materials and non-phosphor materials. The excitation light may be a laser beam or a non-laser beam.

Examples of display systems described here use at least one screen with a fluorescent material to receive a laser beam and to produce at least one monochromatic image. A screen with three or more different fluorescent materials that absorb laser light to emit colored light at different wavelengths may be used as the screen to produce the final images for viewing. Alternatively, a screen with only one fluorescent material may be used as a monochromatic projector to produce only one of monochromatic images of different colors and this one monochromatic image is combined with other monochromatic images to produce the final images for viewing at a final viewing screen. Such a laser excitable fluorescent material absorbs the laser light, e.g., UV laser light, to emit a color which is determined by the composition of the fluorescent material.

Screens with laser-excitable fluorescent materials may be used in various laser displays. One example is a laser vector scanner which scans one or more excitation laser beams on the screen to trace out texts, graphics, and images. Hence, an image of the letter "O" can be formed on the screen by scanning a laser beam along an "O" shaped path on the screen. The excitation laser beam may be a UV beam to excite the fluorescent material which emits colored light to form the image. Two or more scanning laser beams of different colors may be used to trace the same pattern to produce color mixing effects. Other complex and moving patterns can be generated by using complex scanning patterns.

Lasers may also be used in laser TV systems to form still and moving images, graphics, videos or motion pictures by raster scanning similar to the raster scanning of electron beams in CRT TVs. Such laser TVs may use scan one or more multiple excitation laser beams and a screen with one or more fluorescent materials. A scanning laser beam excites the fluorescent material on the screen to produce colored light which forms the image.

In some implementations, a display screen may include a fluorescent layer that absorbs UV light to emit visible light, a first layer on a first side of the fluorescent layer to transmit the UV light and to reflect the visible light. A Fresnel lens may be formed on the first side of the fluorescent layer to direct the UV light incident to the screen at different angles to be approximately normal to the fluorescent layer. The Fresnel lens may be in a telecentric configuration for the incident UV light. The first layer can be a dichroic layer. In addition, the screen may also include a second layer on a second side of the fluorescent layer to transmit visible light and to block the UV light. The second layer may be, e.g., a dichroic layer. In other implementations, the first layer may include a lens having a first surface to receive the UV light and a second opposing surface facing the fluorescent layer and coated with a reflective layer to reflect the UV and the visible light, wherein the reflective layer has an aperture in a center of the second surface to allow for the UV light to transmit through.

Other laser display systems are described.

For example, a laser display system is described to include a screen comprising a substrate on which a plurality of parallel phosphor stripes are formed, wherein at least three adjacent phosphor stripes are made of three different phosphors: a first phosphor to absorb light at an excitation wavelength to emit light of a first color, a second phosphor to absorb light at the excitation wavelength to emit light of a second color, and a third phosphor to absorb light at the excitation wavelength to emit light of a third color. The system also includes a laser module to project and scan a laser beam at the excitation wavelength onto the screen to convert an image carried by the laser beam via an optical modulation into a color image produced by the phosphor stripes on the screen.

In one implementation, the screen in the above system may include phosphor stripes that comprise a fourth phosphor to absorb light at the excitation wavelength to emit light of a fourth color.

In another implementation, the display system may include optical sensors positioned to receive and detect light from the phosphor stripes, where one optical sensor receives only one of colors emitted by the phosphor stripes on the screen. A feedback mechanism is included to direct outputs of the phosphor sensors to the laser module and an alignment control mechanism in the laser module is further included to control a timing of image data modulated on the laser beam to correct an alignment of the laser beam respect to the phosphor stripes.

In yet another implementation, the laser module may include a modulation control which combines a pulse code modulation and a pulse width modulation in the optical modulation of the laser beam to produce image grey scales.

In yet another implementation, the laser module may be configured to project and scan at least a second laser beam on the screen simultaneously with the scanning of the laser beam to produce two different spatial parts of an image on different locations of the screen.

In yet another implementation, the laser module may be configured to include a mechanism to monitor image data bits to be modulated on the laser beam to produce a black pixel monitor signal, at least a diode laser to produce the laser beam, and a laser control coupled to receive the black pixel monitor signal and to operate the diode laser at a driving current below a laser threshold current without turning off the driving current to produce a virtual black color on the screen when the black pixel monitor signal indicates a length of black pixels is less than a threshold and turn off the driving current to produce a true black color on the screen when the black pixel monitor signal indicates a length of black pixels is greater than a threshold.

Laser display systems with three or more monochromatic laser display projection modules are also described. In one example, such a system includes first, second, and third laser display modules to produce first, second and third monochromatic image components of a final image in first, second, and third different colors, respectively, and to project the first, second and third monochromatic image components on a display screen to produce the final image. In this example, the first laser display module includes: (1) a first screen comprising a first phosphor to absorb light at an excitation wavelength to emit light at a first wavelength different from the excitation wavelength; (2) a first laser module to project and scan at least one laser beam at the excitation wavelength onto the first screen to convert an image in the first color carried by the laser beam into the first monochromatic image component produced by the first phosphor on the first screen; and (3) a first projection optical unit to project the first monochromatic image component from the first screen to the display screen.

In one implementation, the third laser display module may include (1) a third screen which does not have a phosphor; (2) a third laser module to project and scan at least one laser beam of the third color onto the third screen to directly produce the third monochromatic image component on the third screen; and (3) a third projection optical unit to project the third monochromatic image component from the third screen to the display screen.

In another implementation, the third laser display module directly projects and scans at least one laser beam of the third color onto the display screen to directly produce the third monochromatic image component on the display screen.

Another example for laser display systems with three or more monochromatic laser display projection modules uses a first laser display module which comprises: (1) a first screen comprising a first phosphor to absorb light at an excitation wavelength to emit light at a first wavelength different from the excitation wavelength;. (2) a first laser module to project and scan at least one laser beam at the excitation wavelength onto the first screen to convert an image carried by the laser beam into a first image produced by the first phosphor on the first screen. A second laser display module is also used in this system and includes: (1) a second screen comprising a second phosphor to absorb light at an excitation wavelength to emit light at a second wavelength different from the excitation wavelength; (2) a second laser module to project and scan at least one laser beam at the excitation wavelength onto the second screen to convert an image carried by the laser beam into a second image produced by the second phosphor on the second screen. In addition, a third laser display module is used and includes: (1) a third screen which does not have a phosphor; (2) a third laser module to project and scan at least one laser beam at a third wavelength different from the first and second wavelengths onto the third screen to directly produce a third image on the third screen in a color of the third wavelength. Furthermore, first, second and third projection optical units are used to respectively project the first image, second image and third image on a display screen to produce a final image.

A further example for laser display systems is a system with at least three monochromatic laser display projection modules each with a phosphor projection screen. The first laser display module includes (1) a first screen comprising a first phosphor to absorb light at an excitation wavelength to emit light at a first wavelength different from the excitation wavelength; and (2) a first laser module to project and scan at least one laser beam at the excitation wavelength onto the first screen to convert an image carried by the laser beam into a first image produced by the first phosphor on the first screen. The second laser display module includes (1) a second screen comprising a second phosphor to absorb light at an excitation wavelength to emit light at a second wavelength different from the excitation wavelength; and (2) a second laser module to project and scan at least one laser beam at the excitation wavelength onto the second screen to convert an image carried by the laser beam into a second image produced by the second phosphor on the second screen. The third laser display module includes (1) a third screen comprising a third phosphor to absorb light at an excitation wavelength to emit light at a third wavelength different from the excitation wavelength; and (2) a third laser module to project and scan at least one laser beam at the excitation wavelength onto the third screen to convert an image carried by the laser beam into a third image produced by the third phosphor on the third screen. In addition, this system includes first, second and third projection optical units to project the first image, second image and third image to spatially overlap on a display screen to produce a final image.

The above and other laser display systems may use various phosphor materials on the screen. Suitable phosphor materials may include the following:

an Eu-doped photoluminescent metal sulfide in form of MS:Eu where M is at least one of Ca, Sr, Ba, Mg and Zn;

a metal thiometallate photoluminescent material in form of $M^*N^*_2S_4$:Eu,Ce where $M^*$ is at least one of Ca, Sr, Ba, Mg and Zn, and $N^*$ is at least one of Al, Ga, In, Y, La and Gd;

$Sr_{1-u-v-x}Mg_uCa_vBa_x)(Ga_{2-y-z}AlIn_zS_4)$:Eu$^{2+}$ or $(Sr_{1-u-v-x}Mg_uCa_vBa_x)(Ga.sub.2-y-z\ Al_yIn_zS_4)$:Eu$^{2+}$;

$(Y,Gd)_3Al_5O_{12}$:Ce;

a rare earth doped CaS, SrS or a thiogallates;

one of SrS:Eu$^{2+}$; CaS:Eu$^{2+}$; CaS:Eu$^{2+}$,Mn$^{2+}$; (Zn,Cd)S:Ag$^+$; Mg$_4$GeO$_{5.5}$F:Mn$^{4+}$; Y$_2$O$_2$S:Eu$^{2+}$, ZnS:Mn$^{2+}$, SrGa$_2$S$_4$:Eu$^{2+}$; ZnS:Cu,Al; BaMg$_2$Al$_{16}$O$_{27}$:Eu$^{2+}$, Mg; and (Y,Gd)$_3$Al$_5$O$_{12}$:Ce, Pr;

at least one of Ba$_2$MgSi$_2$O$_7$:Eu$^{2+}$; Ba$_2$SiO$_4$:Eu$^{2+}$; and (Sr,Ca,Ba)(Al,Ga)$_2$S$_4$:Eu$^{2+}$;

AEu$_{(1-x)}$Ln$_x$B$_2$O$_8$ where A is an element selected from the group consisting of Li, K, Na and Ag; Ln is an element selected from a group consisting of Y, La and Gd; and B is W or Mo; and x is number equal to or larger than 0, but smaller than 1;

at least one of YBO$_3$:Ce$^{3+}$, Tb$^{3+}$; BaMgAl$_{10}$O$_{17}$:Eu$^{2+}$, Mn$^{2+}$; (Sr,Ca,Ba)(Al,Ga)$_2$S$_4$:Eu$^{2+}$; Y$_3$Al$_5$O$_{12}$:Ce$^{3+}$; Y$_2$O$_2$S:Eu$^{3+}$,Bi$^{3+}$; YVO$_4$:Eu$^{3+}$,Bi$^{3+}$; SrS:Eu$^{2+}$; SrY$_2$S$_4$:Eu$^{2+}$; SrS:Eu$^{2+}$,Ce$^{3+}$,K$^+$; (Ca,Sr)S:Eu$^{2+}$; and CaLa$_2$S$_4$:Ce$^{3+}$;

a host material selected from Yttrium-Aluminum-Garnet, monoklinic YalO and YalO-perovskite, Y,Ln)AlO, and (Y,Ln)(Al,Ga)O, wherein the host is doped with at least one of Cerium (Ce), Praseodymium (Pr), Holmium (Ho), Ytterbium (Yb), and Europium (Eu);

$Me_xSi_{12-(m+n)}Al_{(m+n)}ON N_{16-n}$:Re1$_y$Re2$_z$, where Me is one or more of Li, Ca, Mg, Y and lanthanide metals except for La and Ce, Re1 and Re2 are lanthanide metals;

an oxide nitride phosphor that includes α-sialon and is doped with a rare-earth element;

a cerium ion doped lanthanum silicon nitride phosphor: La$_{1-x}$Si$_3$N$_5$:xCe(0<x<1);

a garnet fluorescent material comprising 1) at least one element selected from the group consisting of Y, Lu, Sc, La, Gd and Sm, and 2) at least one element selected from the group consisting of Al, Ga and In, and being activated with cerium;

a phosphor blend comprising BaMg$_2$Al$_{16}$O$_{27}$:Eu$^{2+}$(BAM) and (Tb$_{1-x-y}$A$_x$RE$_y$)$_3$D$_z$O$_{12}$(TAG), where A is a member selected from the group consisting of Y, La, Gd, and Sm; RE is a member selected from the group consisting of Ce, Pr, Nd, Sm, Eu, Gd, Dy, Ho, Er, Tm, Yb, and Lu; D is a member selected from the group consisting of Al, Ga, and In; x, y and z are positive numbers;

a phosphor blend comprising Tb$_3$Al$_{4.9}$O$_{12}$:Ce and at least one of BaMg$_2$Al$_{16}$O$_{27}$:Eu$^{2+}$(BAM) and (Sr,Ba,Ca,Mg)$_5$(PO$_4$)$_3$Cl:Eu$^{2+}$;

BaF$_2$.aBaX$_2$.bMgF$_2$.cBeF$_2$.dMe$^{II}$F$_2$:eLn, where X is at least one halogen selected from the group consisting of chlorine, bromine and iodine; Me$^{II}$ is at least one divalent metal selected from the group consisting of: calcium and strontium; Ln is at least one rare earth element selected from the group consisting of: divalent europium (Eu$^{2+}$), cerium (Ce$^{3+}$) and terbium (Tb$^{3+}$), and a, b, c, and d are positive numbers;

a cerium activated rare earth halophosphate phosphor: LnPO$_4$.aLnX$_3$:xCe$^{3+}$ in which Ln is at least one rare earth element selected from the group consisting of Y, La, Gd and Lu; X is at least one halogen selected from the group consisting of F, Cl, Br and I; and a and x are positive numbers;

Sr$_x$Ln1$_{y1}$Ln2$_{y2}$Ln3$_{y3}$M$_z$A$_a$B$_b$O$_{19-k(I)}$, where Ln1 represents at least one trivalent element selected from lanthanum, gadolinium and yttrium; Ln2 represents at least one trivalent element selected from neodymium, praseodymium, erbium, holmium and thulium; Ln3 represents an element selected from bivalent europium or trivalent cerium with retention of electric neutrality by virtue of oxygen holes; M represents at least one bivalent metal selected from magnesium, manganese, and zinc; A represents at least one trivalent metal selected from aluminum and gallium; B represents at least one trivalent transition metal selected from chromium and titanium; x, y1, y2, y3, z, a, b and k are positive numbers;

$M^{II}X_2.aM^{II}X'_2.bSiO:xEu^{2+}$, where $M^{II}$ is at least one alkaline earth metal selected from the group consisting of Ba, Sr and Ca; each of X and X' is at least one halogen selected from the group consisting of Cl, Br and I, and X is not the same as X'; a, b and x are positive numbers;

an alkaline-based halide as a host material and a rare earth as a dopant;

$(Ba_{1-q}M_q)(Hf_{1-z-e}Zr_zMg_e)$:yT wherein M is selected from the group consisting of Ca and Sr and combinations thereof; T is Cu; and q is, z, e and y are positive numbers;

A$_3$B$_5$X$_{12}$:M, where A is an element selected from the group consisting of Y, Ca, Sr; B is an element selected from the group consisting of Al, Ga, Si; X is an element selected from the group consisting of O and S; and M is an element selected from the group consisting of Ce and Tb;

Ba$_2$(Mg,Zn)Si$_2$O$_7$:Eu$^{2+}$ or (Ba$_{1-x-y-z}$,Ca$_x$,Sr$_{y,Euz}$)$_2$(Mg$_{1-w}$,Znw)Si$_2$O$_7$;

Sr$_x$Ba$_y$Ca$_z$SiO$_4$:Eu$^{2+}$ in which x, y, and z are each independently any value between and including 0 and 2;

ZnS$_x$Se$_y$:Cu,A in which x and y are each independently any value between 0 and 1 and A is at least one of Ag, Al, Ce, Tb, Cl, I, Mg, and Mn;

MA$_2$(S$_x$Se$_y$)$_4$:B in which x and y are each independently any value between about 0.01 and about 1; M is at least one of Be, Mg, Ca, Sr, Ba, Zn; and A is at least one of Al, Ga, In, Y, La, and Gd; and the activator B is at least one of Eu, Ce, Cu, Ag, Al, Tb, Cl, F, Br, I, Pr, Na, K, Mg, and Mn;

M$_2$A$_4$(S$_x$Se$_y$)$_7$:B in which x and y are each independently any value between about 0.01 and about 1, M is at least one of Be, Mg, Ca, Sr, Ba, Zn; and A is at least one of Al, Ga, In, Y, La, and Gd; and B is at least one of Eu, Ce, Cu, Ag, Al, Tb, Cl, Br, F, I, Pr, K, Na, Mg, and Mn;

(M1)$_m$(M2)$_n$A$_2$(S$_x$Se$_y$)$_4$:B in which: M1 comprises an element selected from the group consisting of: Be, Mg, Ca, Sr, Ba, Zn; M2 comprises an element selected from the group consisting of: Be, Mg, Ca, Sr, Ba, Zn; A comprises one or more elements selected from the group consisting of: Al, Ga, In, Y, La, and Gd; and B comprises one or more elements selected from the group consisting of: Eu, Ce, Cu, Ag, Al, Tb, Cl, Br, F, I, Mg, Pr, K, Na, and Mn;

(M1)$_m$(M2)$_n$A$_4$(S$_x$Se$_y$)$_7$:B in which M1 comprises an element selected from the group consisting of: Be, Mg, Ca, Sr,. Ba, Zn; M2 comprises an element selected from the group consisting of: Be, Mg, Ca, Sr, Ba, Zn; A comprises one or more elements selected from the group consisting of: Al, Ga, In, Y, La, and Gd; and B comprises one or more elements selected from the group consisting of: Eu, Ce, Cu, Ag, Al, Th, Cl, Br, F, I, Mg, Pr, K, Na, and Mn;

These and other laser display systems, display techniques, and fluorescent materials are described in greater detail in the attached drawings, the textual description, and the claims.

BRIEF DESCRIPTION OF THE DRAWINGS

FIGS. 1 and 2 shows two examples of laser display systems where screens are made of laser-excitable phosphors emitting colored lights under excitation of a scanning laser beam that carries the image information to be displayed.

FIGS. 20A and 20B illustrate a different screen design with colored phosphor stripes where three or more different scanning beams are directed to each color pixel to produce different constituent colors of the color pixel, respectively.

DETAILED DESCRIPTION

Figure 3A:
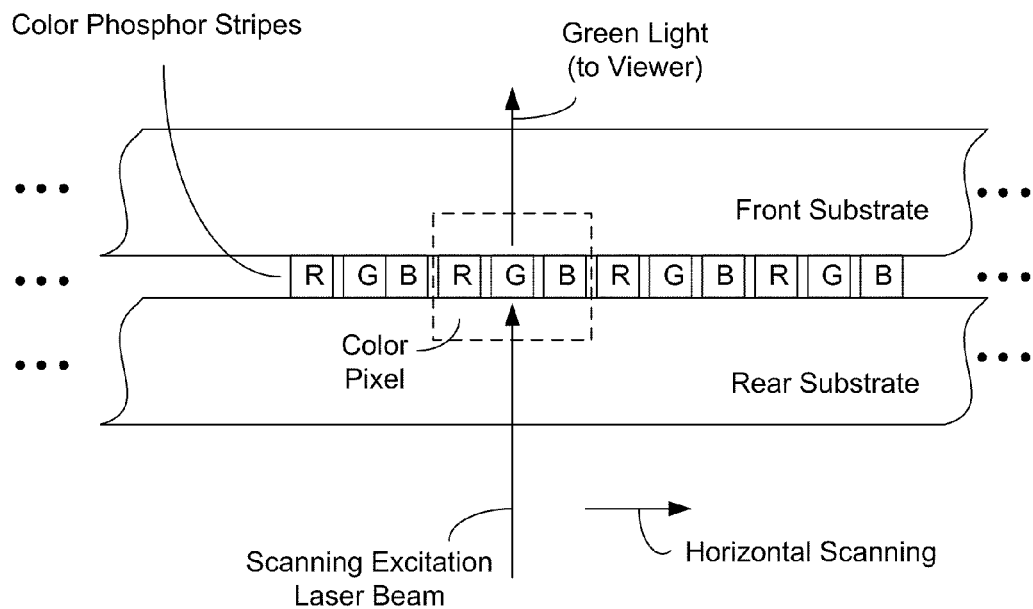
FIGS. 3A and 3B show one exemplary of a screen structure and the structure of color pixels on the screen.

This application describes display systems and devices that use screens with fluorescent materials to emit light under optical excitation to produce images, including laser vector scanner display devices and laser video display devices that use laser excitable fluorescent screens to produce images by absorbing excitation laser light and emitting colored light. Various examples of screen designs with fluorescent materials are described. Screens with phosphor materials under excitation of one or more scanning excitation laser beams are described in details and are used as specific implementation examples of optically excited fluorescent materials in various system and device examples in this application. In one implementation, for example, three different color phosphors that are optically excitable by the laser beam to respectively produce light in red, green, and blue colors suitable for forming color images may be formed on the screen as pixel dots or repetitive red, green and blue phosphor stripes in parallel. Various examples described in this application use screens with parallel color phosphor stripes for emitting light in red, green, and blue to illustrate various features of the laser-based displays. Phosphor materials are one type of fluorescent materials. Various described systems, devices and features in the examples that use phosphors as the fluorescent materials are applicable to displays with screens made of other optically excitable, light-emitting, non-phosphor fluorescent materials.

For example, quantum dot materials emit light under proper optical excitation and thus can be used as the fluorescent materials for systems and devices in this application. More specifically, semiconductor compounds such as, among others, CdSe and PbS can be fabricated in form of particles with a diameter on the order of the exciton Bohr radius of the compounds as quantum dot materials to emit light. To produce light of different colors, different quantum dot materials with different energy band gap structures may be used to emit different colors under the same excitation light. Some quantum dots are between 2 and 10 nanometers in size and include approximately tens of atoms such between 10 to 50 atoms. Quantum dots may be dispersed and mixed in various materials to form liquid solutions, powders, jelly-like matrix materials and solids (e.g., solid solutions). Quantum dot films or film stripes may be formed on a substrate as a screen for a system or device in this application. In one implementation, for example, three different quantum dot materials can be designed and engineered to be optically excited by the scanning laser beam as the optical pump to produce light in red, green, and blue colors suitable for forming color images. Such quantum dots may be formed on the screen as pixel dots arranged in parallel lines (e.g., repetitive sequential red pixel dot line, green pixel dot line and blue pixel dot line).

Some implementations of laser-based display techniques and systems described here use at least one scanning laser beam to excite color light-emitting materials deposited on a screen to produce color images. The scanning laser beam is modulated to carry images in red, green and blue colors or in other visible colors and is controlled in such a way that the laser beam excites the color light-emitting materials in red, green and blue colors with images in red, green and blue colors, respectively. Hence, the scanning laser beam carries the images but does not directly produce the visible light seen by a viewer. Instead, the color light-emitting fluorescent materials on the screen absorb the energy of the scanning laser beam and emit visible light in red, green and blue or other colors to generate actual color images seen by the viewer.

Laser excitation of the fluorescent materials using one or more laser beams with energy sufficient to cause the fluorescent materials to emit light or to luminesce is one of various forms of optical excitation. is In other implementations, the optical excitation may be generated by a non-laser light source that is sufficient energetic to excite the fluorescent materials used in the screen. Examples of non-laser excitation light sources include various light-emitting diodes (LEDs), light lamps and other light sources that produce light at a wavelength or a spectral band to excite a fluorescent material that converts the light of a higher energy into light of lower energy in the visible range. The excitation optical beam that excites a fluorescent material on the screen can be at a frequency or in a spectral range that is higher in frequency than the frequency of the emitted visible light by the fluorescent material. Accordingly, the excitation optical beam may be in the violet spectral range and the ultra violet (UV) spectral range, e.g., wavelengths under 420 nm. In the examples described blow, UV light or a UV laser beam is used as an example of the excitation light for a phosphor material or other fluorescent material and may be light at other wavelength.

FIGS. 1 and 2 illustrate two laser-based display systems using screens having color phosphor stripes. Alternatively, color phosphor dots may also be used to define the image pixels on the screen. The system in FIG. 1 includes a laser module 110 to produce and project at least one scanning laser beam 120 onto a screen 101. The screen 101 has parallel color phosphor stripes in the vertical direction where red phosphor absorbs the laser light to emit light in red, green phosphor absorbs the laser light to emit light in green and blue phosphor absorbs the laser light to emit light in blue. Adjacent three color phosphor stripes are in three different colors. One particular spatial color sequence of the stripes is shown in FIG. 1 as red, green and blue. Other color sequences may also be used. The laser beam 120 is at the wavelength within the optical absorption bandwidth of the color phosphors and thus is usually at a wavelength shorter than the visible blue and the green and red colors for the color images. As an example, the color phosphors may be phosphors that absorb UV light in the spectral range from about 380 nm to about 420 nm to produce desired red, green and blue light. The laser module 110 may include one or more lasers such as UV diode lasers to produce the beam 120, a beam scanning mechanism to scan the beam 120 horizontally and vertically to render one image frame at a time on the screen, and a signal modulation mechanism to modulate the beam 120 to carry the information for image channels for red, green and blue colors. FIG. 2 shows an alternative design where the color phosphor stripes are parallel to the horizontal direction of the screen 201. Such display systems may be configured as rear projection systems where the viewer and the laser module 101 are on the opposite sides of the screen 101 or 201. Alternatively, such display systems may be configured as front projection systems where the viewer and laser module are on the same side of the screen 101 or 201.

FIG. 3A shows an exemplary design of the screen 101 in FIG. 1. The screen 101 may include a rear substrate which is transparent to the scanning laser beam 120 and faces the laser module 110 to receive the scanning laser beam 120. The color phosphor stripes represented by "R", "G" and "B" for red, green and blue colors are formed on the rear substrate. A second substrate, the front substrate, is formed on top of the phosphor stripes and is transparent to the red, green and blue colors emitted by the phosphor stripes. The substrate may be made of various materials, including glass or plastic panels. Each color pixel includes portions of three adjacent color phosphor stripes in the horizontal direction and its vertical dimension is defined by the beam spread of the laser beam in the vertical direction. The laser module 110 scans the laser beam 120 one horizontal line at a time, e.g., from left to right and from top to bottom to fill the screen 101. The laser module 110 is fixed in position relative to the screen 101 so that the scanning of the beam 120 can be controlled in a predetermined manner to ensure proper alignment between the laser beam 120 and each pixel position on the screen 101.

Figure 3B:
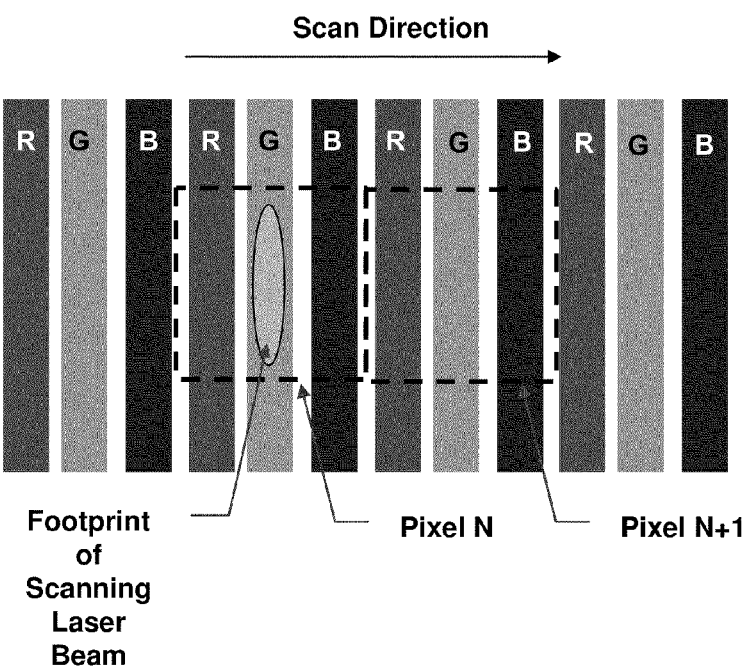

FIG. 3A shows the scanning laser beam 120 is directed at the green phosphor stripe in a pixel to produce green light from that pixel. FIG. 3B further shows the operation of the screen 101 in a view along the direction perpendicular to the screen 101. Since each color stripe is longitudinal in shape, the cross section of the beam 120 may be shaped to be elongated along the direction of the stripe to maximize the fill factor of the beam within each color stripe for a pixel. This may be achieved by using a beam shaping optical element in the laser module 110.

Figure 4:
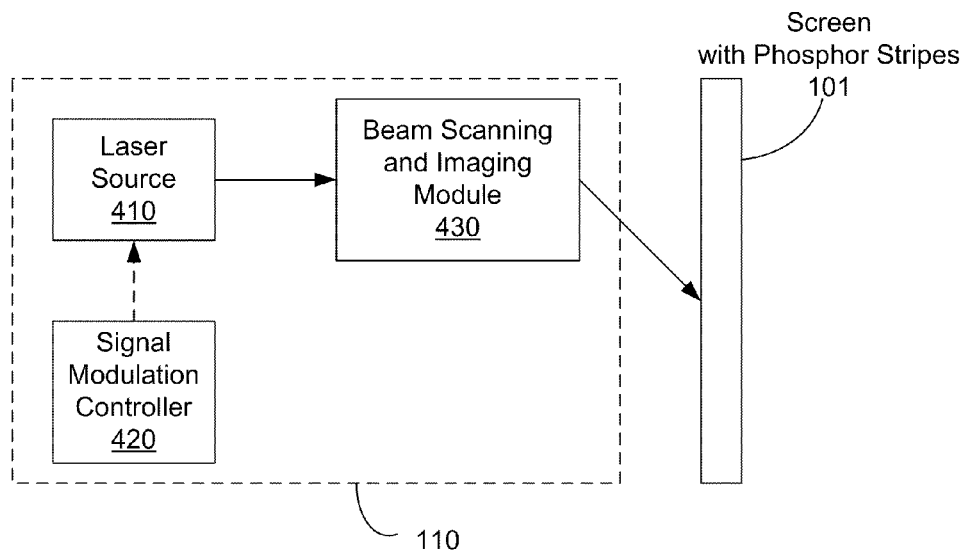
FIGS. 4 and 5 show two examples of optical modulation designs for the laser display systems in FIGS. 1 and 2.
Figure 5:
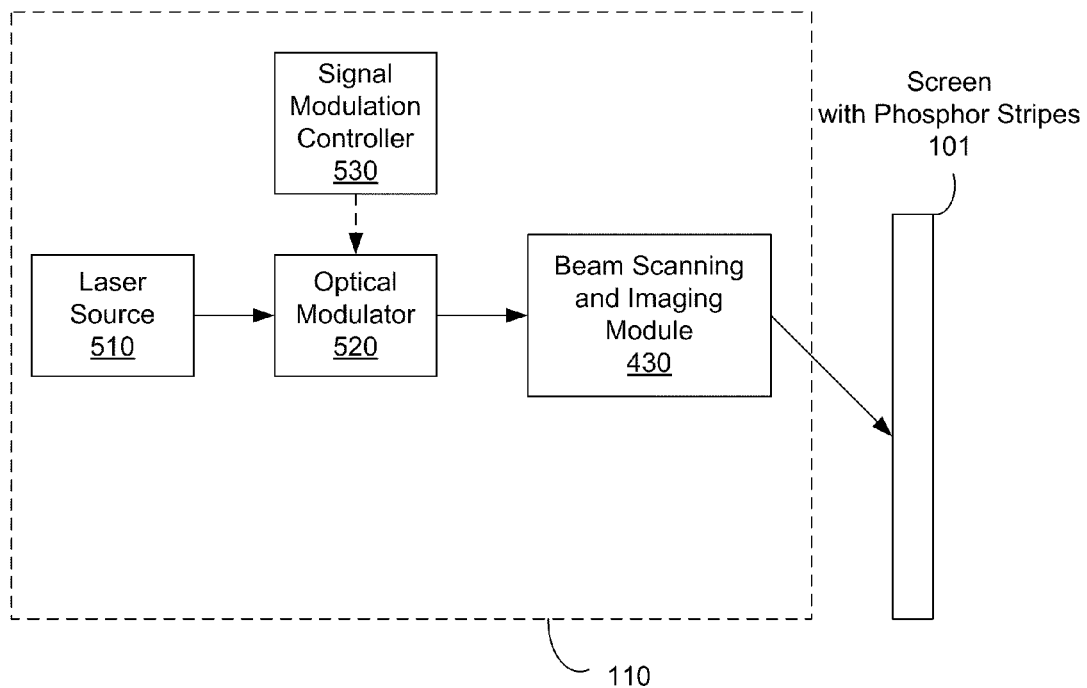

The optical modulation in the laser module 110 may be achieved in two different configurations. FIG. 4 shows an implementation of the display in FIG. 1 where a laser source 410 producing the laser beam 120 is directly modulated to carry the image signals in red, green and blue. The laser module 110 in this implementation includes a signal modulation controller 420 which modulates the laser source 410 directly. For example, the signal modulation controller 420 may control the driving current of a laser diode as the laser source 410. A beam scanning and imaging module 430 is then project the modulated beam 120 to the screen 101 to excite the color phosphors. Alternatively, FIG. 5 shows another implementation of the display in FIG. 1 where a laser source 510 is used to generate a CW unmodulated laser beam and an optical modulator 520 is used to modulate the laser beam with the image signals in red, green and blue. A signal modulation controller 530 is used to control the optical modulator 520. For example, an acousto-optic modulator or an electro-optic modulator may be used as the optical modulator 520. The modulated beam from the optical modulator 520 is then projected onto the screen 101 by the beam scanning and imaging module 430.

Figure 6:
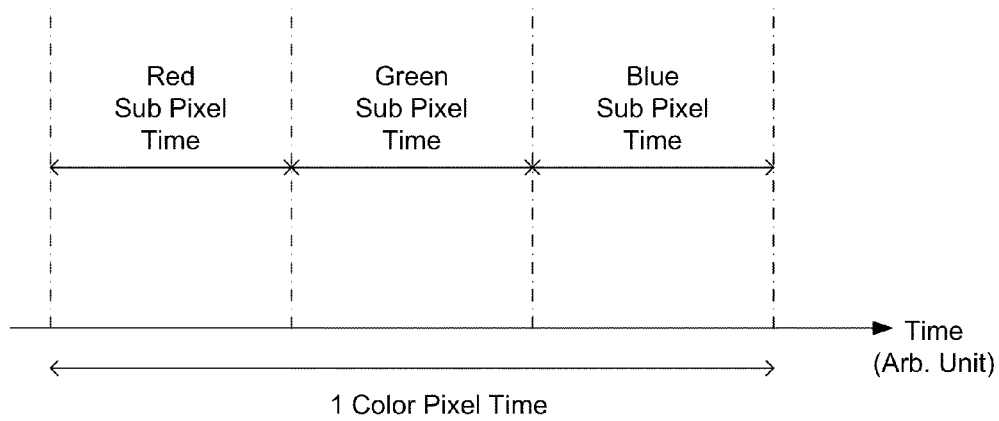
FIG. 6 shows time divisions of the scanning laser beam in the systems in FIGS. 1 and 2 where the screen uses red, green and blue light-emitting phosphor stripes for color pixels.

The laser beam 120 is scanned spatially across the screen 101 to hit different color pixels at different times. Accordingly, the modulated beam 120 carries the image signals for the red, green and blue for each pixel at different times and for different pixels at different times. Hence, the modulation of the beam 120 is coded with image information for different pixels at different times to map the timely coded image signals in the beam 120 to the spatial pixels on the screen 101 via the beam scanning. FIG. 6 shows one example for time division on the modulated laser beam 120 where each color pixel time is equally divided into three sequential time slots for the three color channels. The modulation of the beam 120 may use pulse modulation techniques to produce desired grey scales in each color, proper color combination in each pixel, and desired image brightness.

Figure 7:
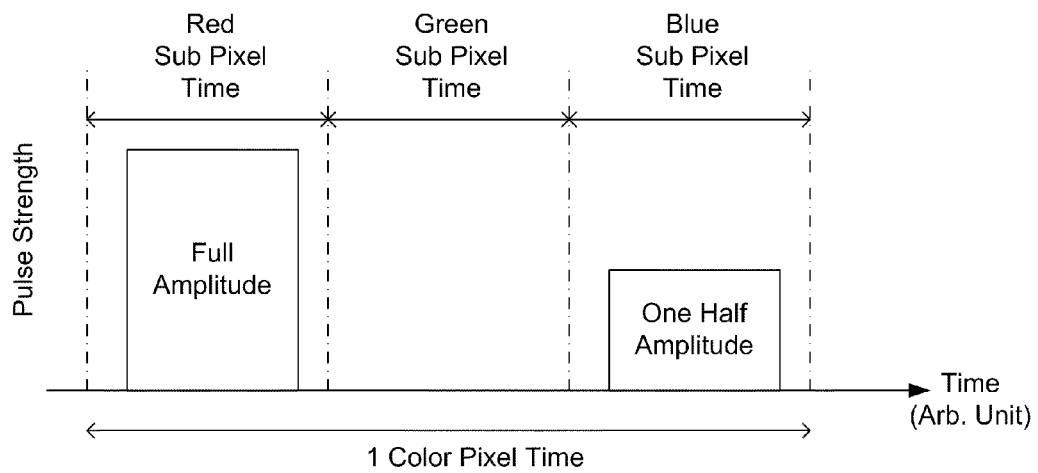
FIG. 7 shows an example of pulse amplitude modulation for modulating the scanning laser beam in the systems in FIGS. 1 and 2.

FIGS. 7, 8, 9, 10A and 10B illustrate examples of some pulse modulation techniques. FIG. 7 shows an example of a pulse amplitude modulation (PAM) where the amplitude of the optical pulse in each time slot produces the desired grey scale and color when combined with other two colors within the same pixel. In the illustrated example, the pulse during the red sub pixel time is at its full amplitude, the pulse during the green sub pixel time is zero, and the pulse during the blue sub pixel time is one half of the full amplitude. PAM is sensitive to noise. As an improvement to PAM, a pulse code modulation (PCM) may be used where the amplitude values of the pulse are digitized. PCM is widely used in various applications.

Figure 8:
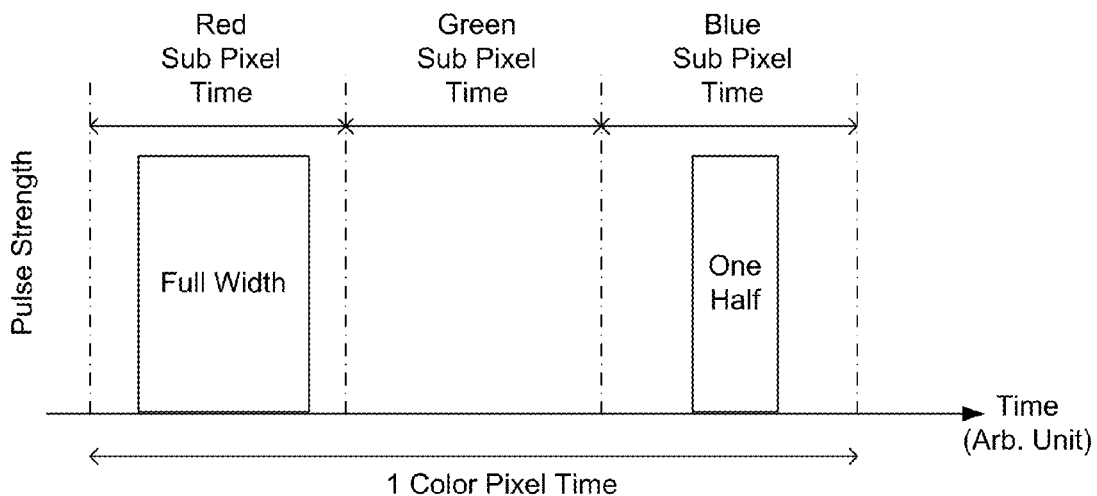
FIGS. 8 and 9 illustrate implementations of pulse width modulation for modulating the scanning laser beam in the systems in FIGS. 1 and 2.
Figure 9:
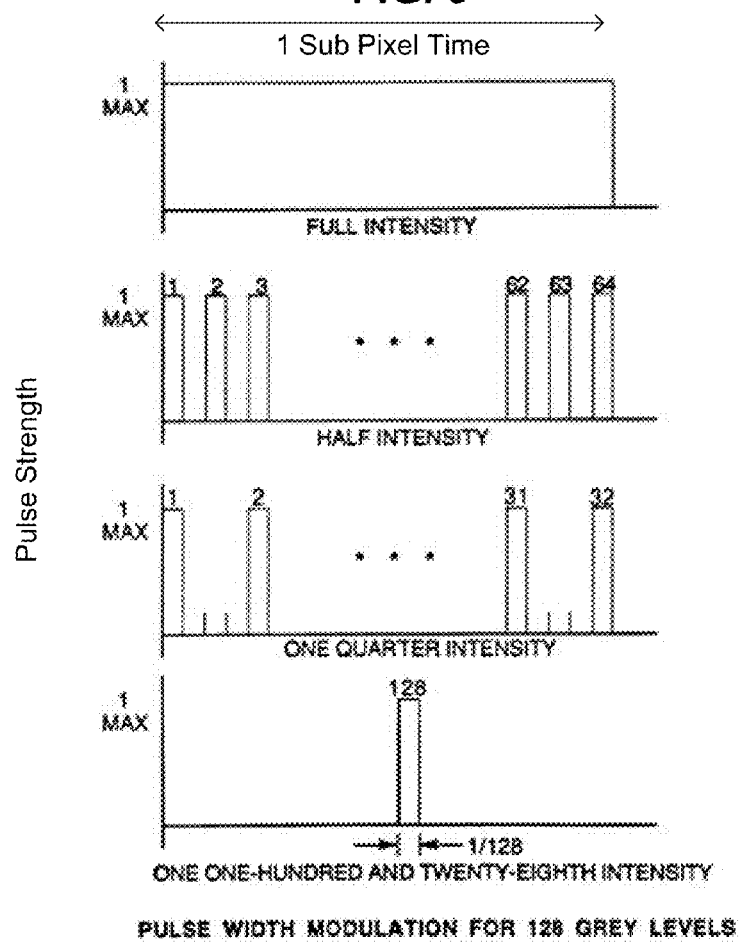

FIG. 8 shows another pulse modulation technique where each pulse is at a fixed amplitude but the pulse width or duration is changed or modulated to change the total energy of light in each color sub pixel. The illustrated example in FIG. 8 for the pulse width modulation (PWM) shows a full width pulse in red, no pulse in green and a pulse with one half of the full width in blue. FIG. 9 illustrates another example of the PWM for producing N (e.g., N=128) grey scales in each color sub pixel. Each pixel time is equally divided into N time slots. At the full intensity, a single pulse for the entire duration of the sub pixel time at the full amplitude is produced. To generate the one half intensity, only 64 pulses with the full amplitude in alternating time slots, 1, 3, 5, 7, . . . , 127 are generated with the sub pixel time. This method of using equally spaced pulses with a duration of 1/N of the sub pixel time can be used to generate a total of 128 different grey levels. For practical applications, the N may be set at 256 or greater to achieve higher grey levels.

Figure 10A:
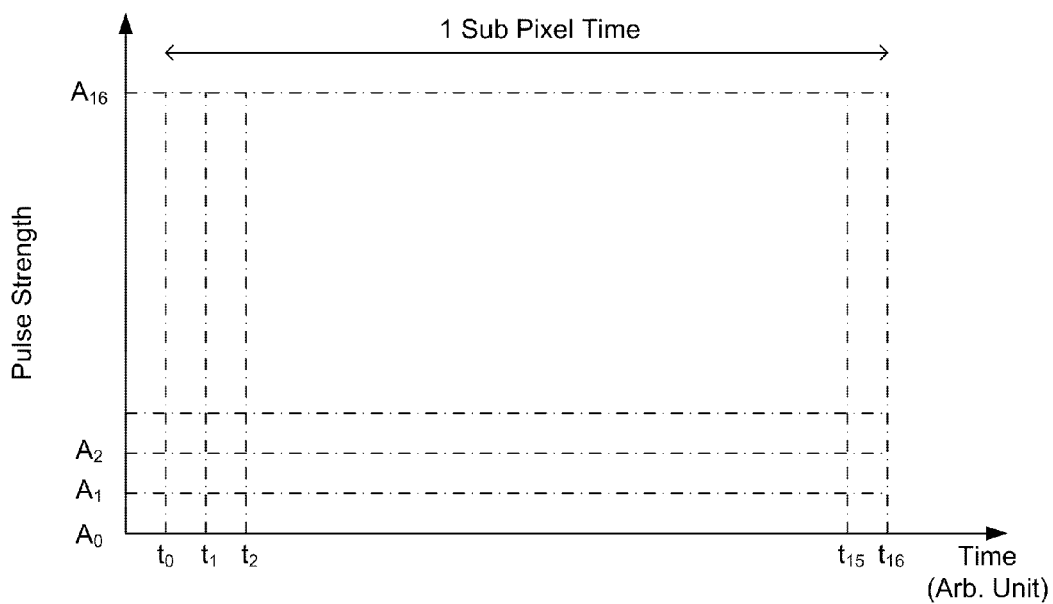
FIGS. 10A and 10B illustrate one implementation of combining pulse amplitude modulation and pulse width modulation for modulating the scanning laser beam in the systems in FIGS. 1 and 2.
Figure 10B:
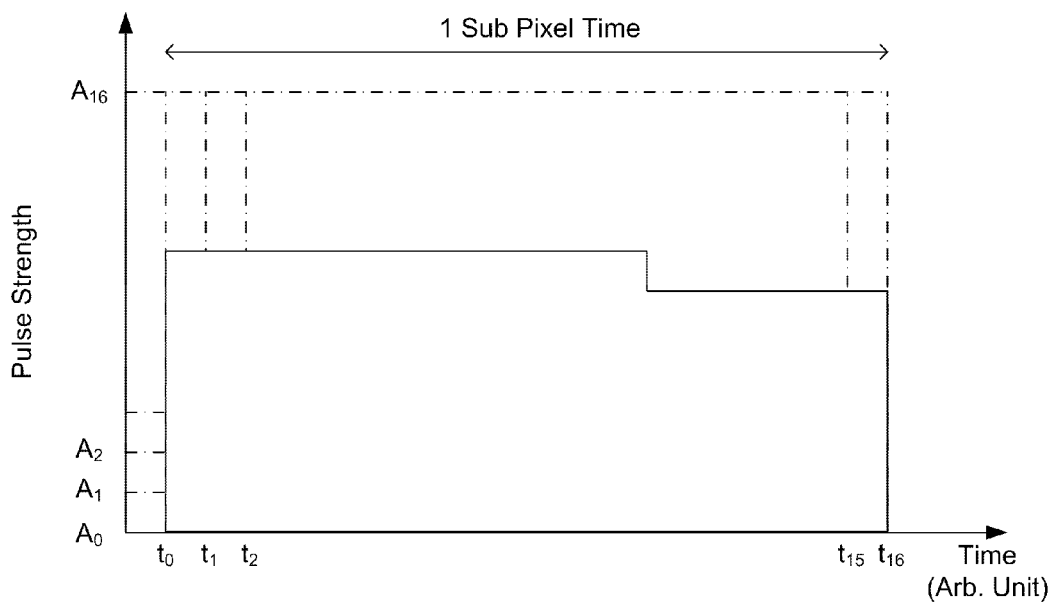

FIGS. 10A and 10B illustrate another example of a pulse modulation technique that combines both the PCM and PWM to produce N grey scales. In the PCM part of this modulation scheme, the full amplitude of the pulse is divided into M digital levels and the full sub pixel time is divided into M sub pulse durations. The combination of the PCM and PWD is N=M×M grey scales in each color sub pixel. As an example, FIG. 10A shows that a PCM with 16 digital levels and a PWM with 16 digital levels. In implementation, a grey scale may be achieved by first filling the pulse positions at the lowest amplitude level A1. When all 16 time slots are used up, the amplitude level is increased by one level to A2 and then the time slots sequentially filled up. FIG. 10B shows one example of a color sub pixel signal according to this hybrid modulation based on PCM and PWM. The above hybrid modulation has a number of advantages. For example, the total number of the grey levels is no longer limited by the operating speed of the electronics for PCM or PWM alone.

One important technical parameter for displays is the contrast ratio. The light level of the black color is usually the dominating factor for the contrast ratio. For a given system, the lower the light level of the black color the better the contrast of the display system. Many display systems can achieve a virtual black color by reducing the light levels in all three color sub pixels of a color pixel to their minimum levels without being able to completely shut off the light. The laser-based display systems described here, however, can be designed to completely shut off light in each color sub pixel to produce the true black color. This technique is now described with a specific reference to a diode laser as the light source as an example and it is understood that the technique can also be used in other laser sources.

Figure 11:
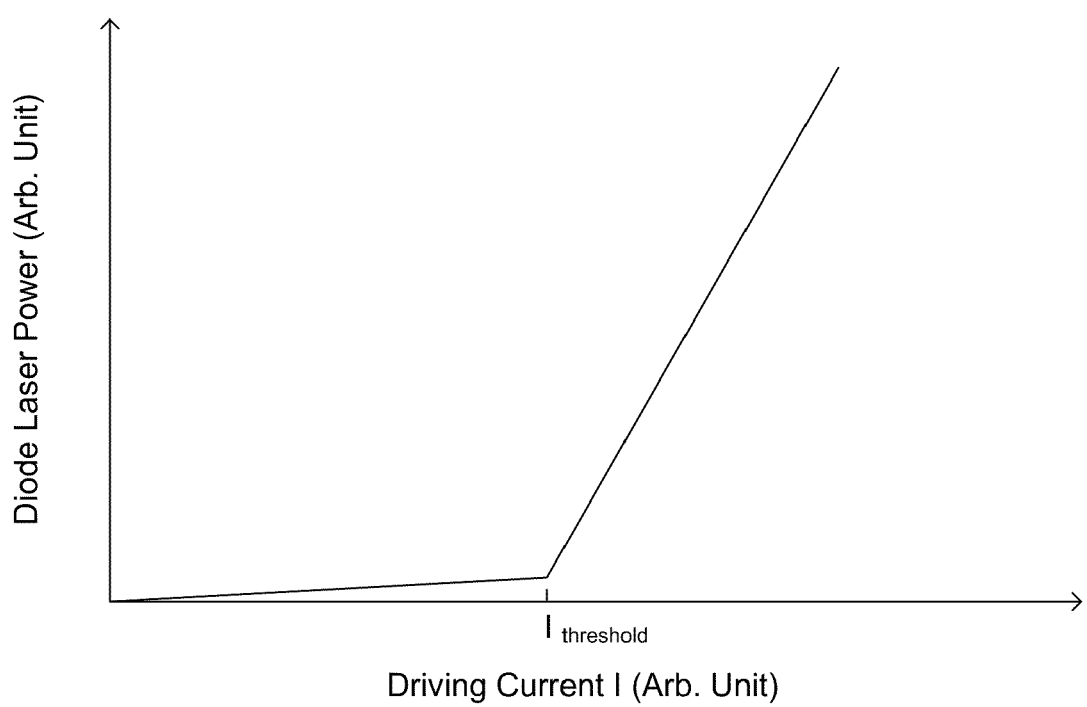
FIG. 11 illustrates an example of the diode laser output power as a function of the driving current of the diode laser with a threshold behavior.

A diode laser has a threshold behavior where the laser action starts when the forward driving current is greater than a threshold value and the diode laser emits spontaneously without lasing when the driving current is below the threshold. FIG. 11 shows an illustrative optical power as a function of the driving current to a typical diode laser. At a current just below the threshold current, the diode laser emits at a low light level. Hence, the diode laser can be operated at this current level just below the threshold current to produce a virtual black. When a true black is needed, the driving current to the diode laser can be shut off so no light is generated by the laser and no light is generated on the corresponding phosphor stripe in a pixel on the screen. Many diode lasers show a delay behavior where there is a time delay between the optical output and the driving current so that when the driving current is switched on to a value greater than the threshold value, the laser action lags behind the current for a delay time. This delay is essentially negligible if the initial current is biased just below the threshold current. Accordingly, the diode laser may be operated to produce either the virtual back or the true black depending on the black color distribution in a particular image frame.

When an image frame does not have contiguous black pixels in time less than the delay time of the diode laser, the diode laser is controlled to operate at a bias current just below the threshold current to produce a virtual black in these black pixels. When an image frame has contiguous black pixels in time greater than the delay time of the diode laser, the diode laser is turned off by shutting off the driving current at the beginning of the black pixels to produce the true black in these pixels. At the end of the this block of contiguous black pixels, the driving current of the diode laser is turned back on to a value just below the threshold current to produce the virtual black for the remaining black pixels so that the first non-black pixel following the block of the contiguous pixels can be timely generated. In this example, a part of the black pixels is true black and a part of the black pixels is virtual black. On average, the light level for the black pixels is better than the virtual black. For a diode laser with a delay time in tens of nanoseconds, two or more sequential black pixels with a pixel duration of 50 nsec would be sufficient to operate the diode laser to generate the true black.

Figure 12:
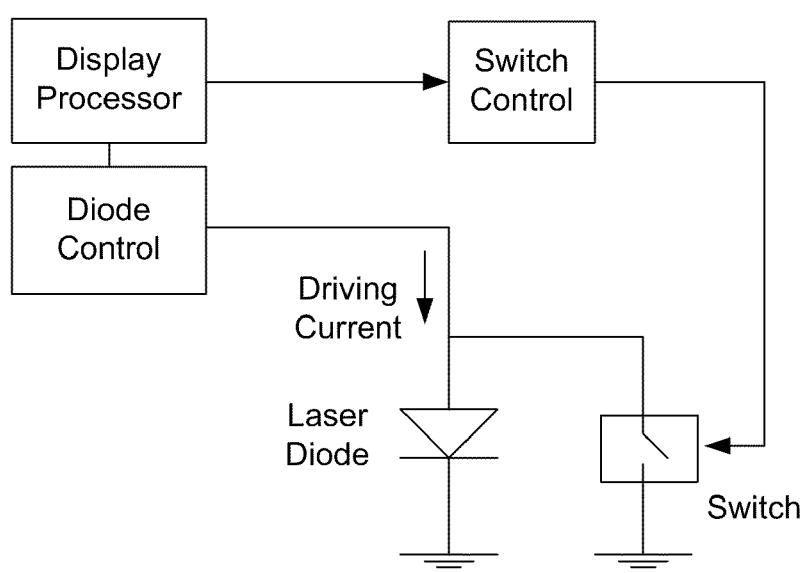
FIGS. 12 and 13 show an implementation of an image control mechanism for controlling a diode laser that generates the scanning laser beam in the systems in FIGS. 1 and 2 to produce true black pixels.

FIG. 12 shows a bypass current path for implementing the above technique for generating the true black. The bypass current path includes a switch which is normally open so all driving current flow into the laser diode. A diode control circuit generates the driving current. A display processor, which processes the image frames to be displayed and produces the proper control signals for driving the diode laser, sends the control signals based on he image frames to the diode control circuit. The display processor is further connected to a switch control which controls the switch in the current bypass path to turn on the switch when the driving current to the diode laser is to be shut off to generate a true black.

Figure 13:
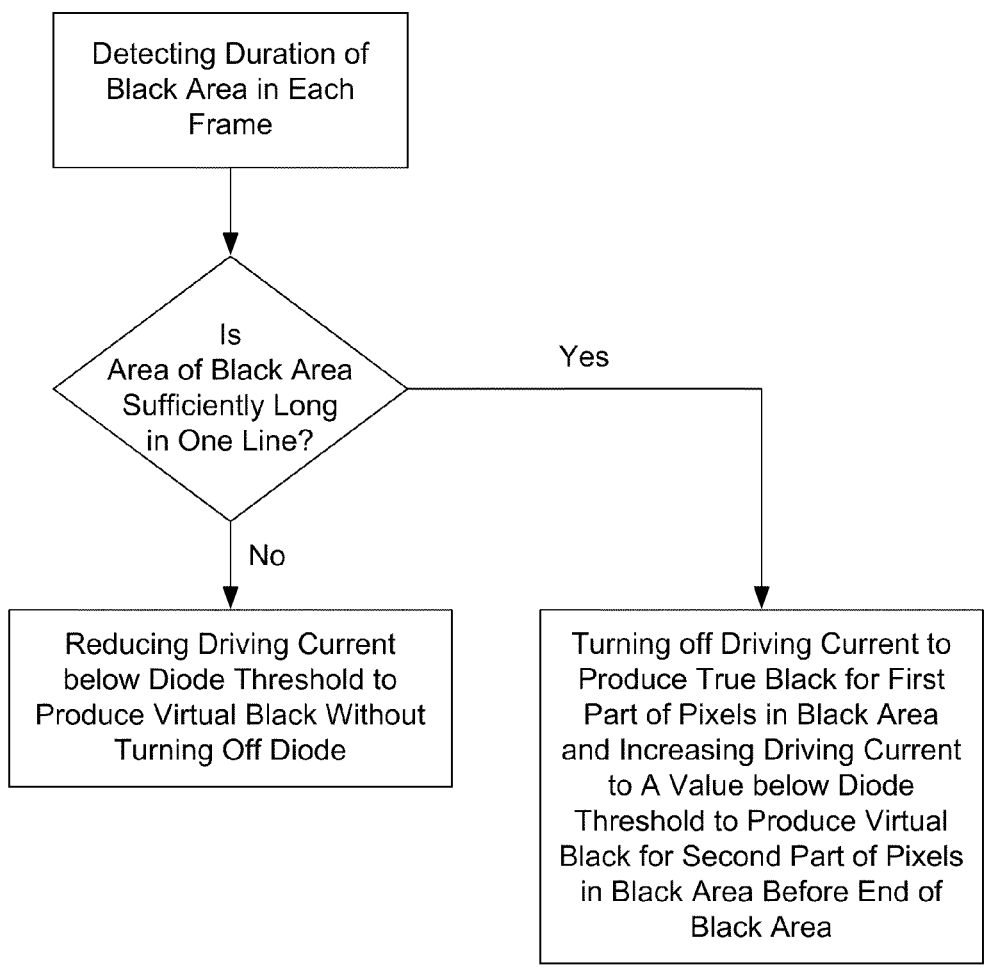

In operation, the display processor monitors the pixels in each image frame to be displayed. This monitoring process can be achieved in the digital domain where the data bits for the pixels in a memory buffer of the processor are monitored. Depending on the length of the contiguous black pixels in time to be displayed, the display processor operates to keep the switch open to produce the virtue black to close the switch to produce the true black. FIG. 13. shows the operation of the display processor.

Referring back to FIG. 1, the laser module 110 is fixed in position relative to the screen 101. More specifically, the relative position of the laser module 110 and the screen 101 is predetermined and pre-calibrated to achieve the pixel registration of the scanning positions of the laser beam 120 on the screen 101 and the pixel positions on the screen 101. This spatial alignment between the laser module 110 and the screen 101 may change. For the screen 101 with parallel color phosphor stripes perpendicular to the horizontal scanning direction, the alignment along the vertical direction is less important than the alignment along horizontal direction because the former shift the entire image frame without changing color registration and the latter, on the the contrary, changes the color registration and hence degrades the entire image.

Figure 14:
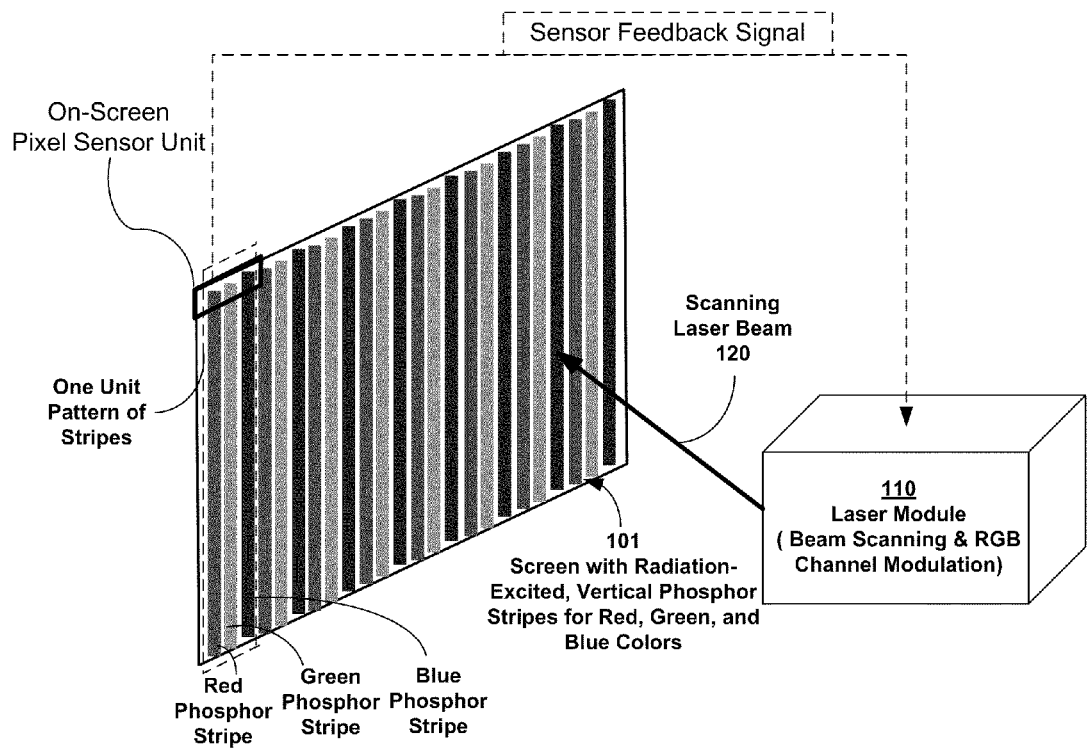
FIG. 14 shows an implementation of an on-screen pixel sensor unit and the associated sensor feedback for controlling timing of the image pulses in the scanning laser beam to correct a spatial misalignment of the scanning laser beam with respect to the colored phosphor stripes on the screen.

To mitigate this horizontal misalignment, a sensing mechanism may be built in the screen 101 as a pixel sensor unit to detect the horizontal misalignment and a feedback control may be used to correct the misalignment. FIG. 14 shows a display system with an on-screen sensing unit 1401 for optically measuring the responses of color pixels on the screen 101 to produce a sensor feedback signal 1402 to the laser module 110 and a feedback control to allow the laser module 110 to correct the misalignment in response to the feedback signal 1402 from the screen 101.

The on-screen pixel sensor unit 1401 may include three optical detectors PD1, PD2 and PD3 that are located on the screen 101 and are respectively configured to respond to red, green and blue light. Each optical detector is only responsive to its designated color and not to other colors. Hence, as an example, the red optical detector PD1 responds to the red light but is not responsive to green and blue light. This may be achieved by, e.g., using red, green and blue optical bandpass filters in front of the optical detectors PD1, PD2 and PD3, respectively. Assume the adjacent color phosphor stripes are arranged in the order of red, green and blue from the left to the right in the horizontal direction of the screen 101. If a red image is generated by the display processor in the laser module 110 but the red detector PD1 does not respond while either the blue detector PD3 or the green detector PD2 produces an output, the horizontal alignment is out of order by one sub pixel.

One way to correct this horizontal misalignment is to program the display processor in the laser module 110 to delay the modulated image signal carried by the modulated laser beam 120 by one sub color pixel time slot if the green detector PD2 has an output and red and blue detectors PD1 and PD3 have no output, or by two sub color pixel time slots if the blue detector PD3 has an output and red and green detectors PD1 and PD2 have no output. This correction by time delay may be achieved digitally within the display processor in the laser module 110. No physical adjustment in the optical scanning and imaging units in the laser module 110 is needed. Alternatively, the imaging unit in the laser module 110 may be adjusted to shift the laser position on the screen 101 horizontally to the left or right by, e.g., one sub pixel, to correct the horizontal misalignment as indicated by the sensor feedback signal 1402.

Figure 14A:
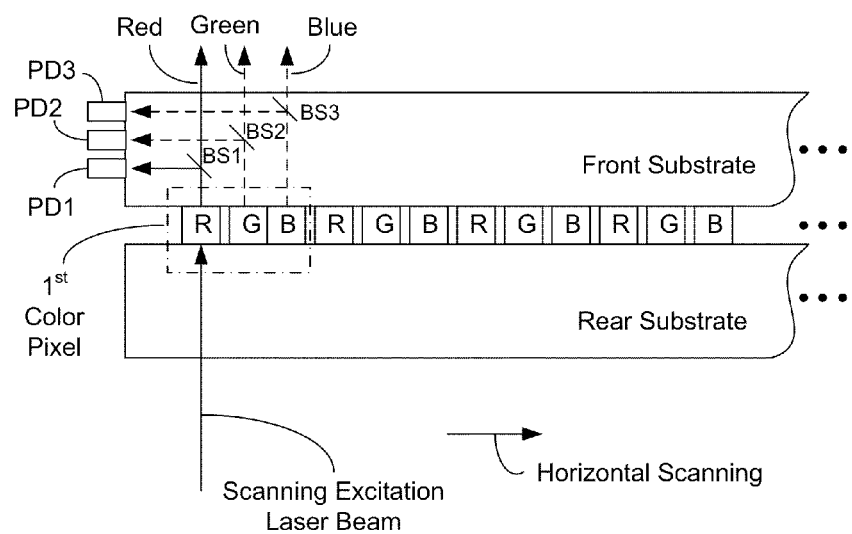
FIGS. 14A and 15 show the design and operation of one exemplary implementation of the on-screen pixel sensor unit and control in FIG. 14.

The above red, green and blue optical detectors PD1, PD2 and PD3 may be positioned to receive light from multiple pixels on the screen 101. A test pattern may be used to check the alignment. For example, a frame of one of the red, green and blue colors may be used as a test pattern to test the alignment. Alternatively, the red, green and blue optical detectors PD1, PD2 and PD3 may be embedded in the screen 101 to receive color light from different color sub pixels. FIG. 14A shows a design where three beam splitters BS1, BS2 and BS3 are used to split small fractions of red, green, and blue light beams from the color sub pixels of a color pixel to three detectors PD1, PD2 and PD3 formed on the front substrate of the screen 101. A testing bit pattern may be used to address that particular pixel to check the horizontal alignment.

Figure 15:
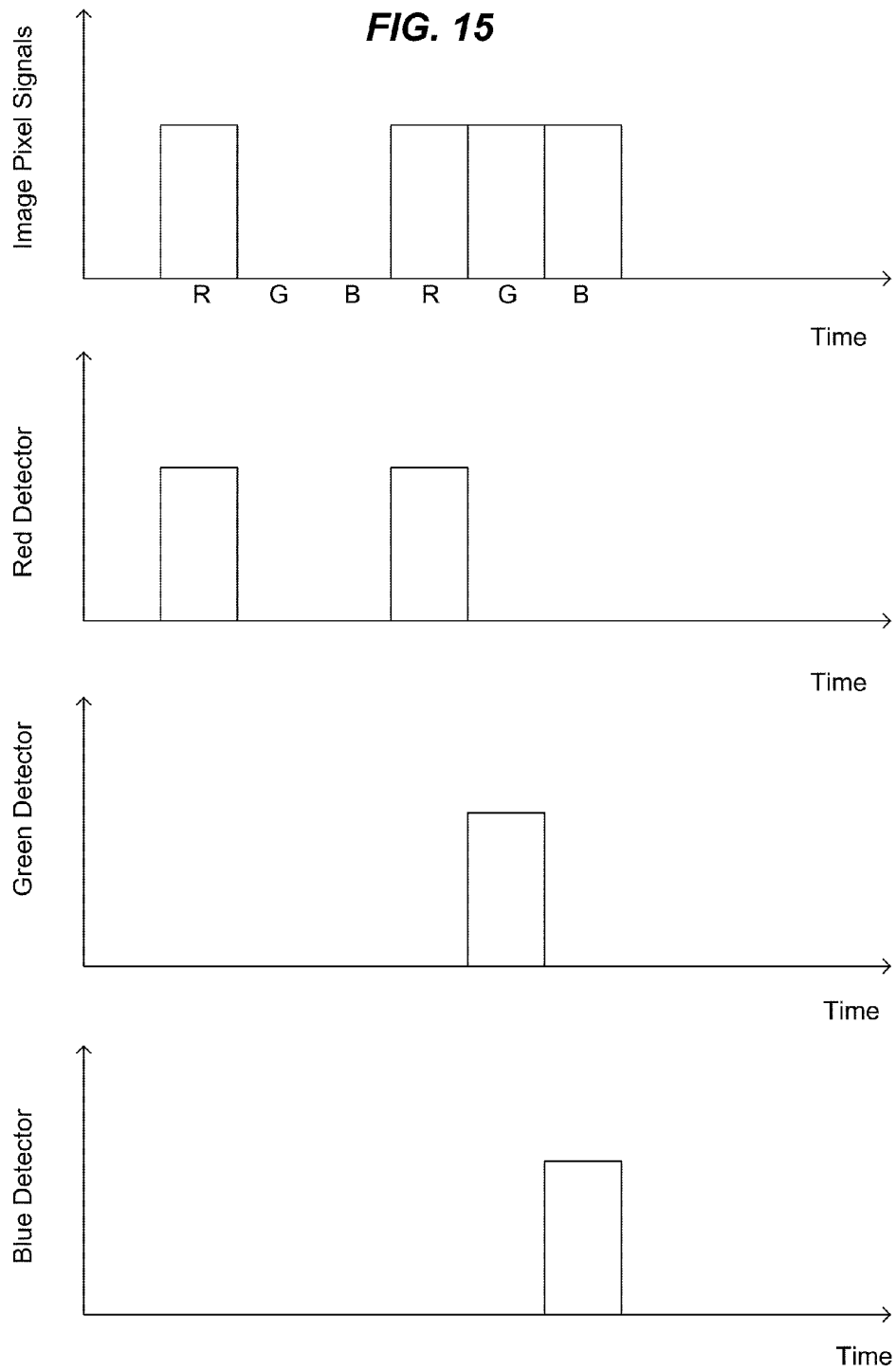

FIG. 15 shows a test pattern for the color pixel embedded with the detectors PD1, PD2 and PD3. When the horizontal alignment is proper, the responses of the three detectors PD1, PD2 and PD3 are shown as illustrated. Otherwise, different responses will be generated and the responses may be used to either use the time-delay technique or the adjustment of the beam imaging optics to correct the horizontal misalignment.

Figure 16:
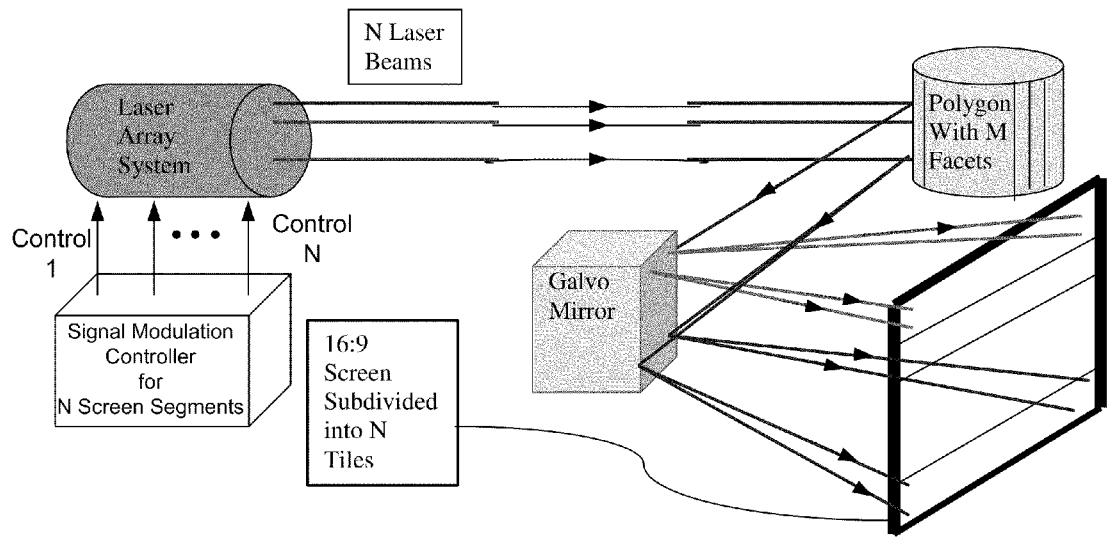
FIGS. 16 and 17 shows implementations of the laser display systems in FIGS. 4 and 5, respectively, that use a polygon and a galvo mirror as part of the laser scanning module and simultaneously scanning multiple screen segments with multiple scanning laser beams.
Figure 17:
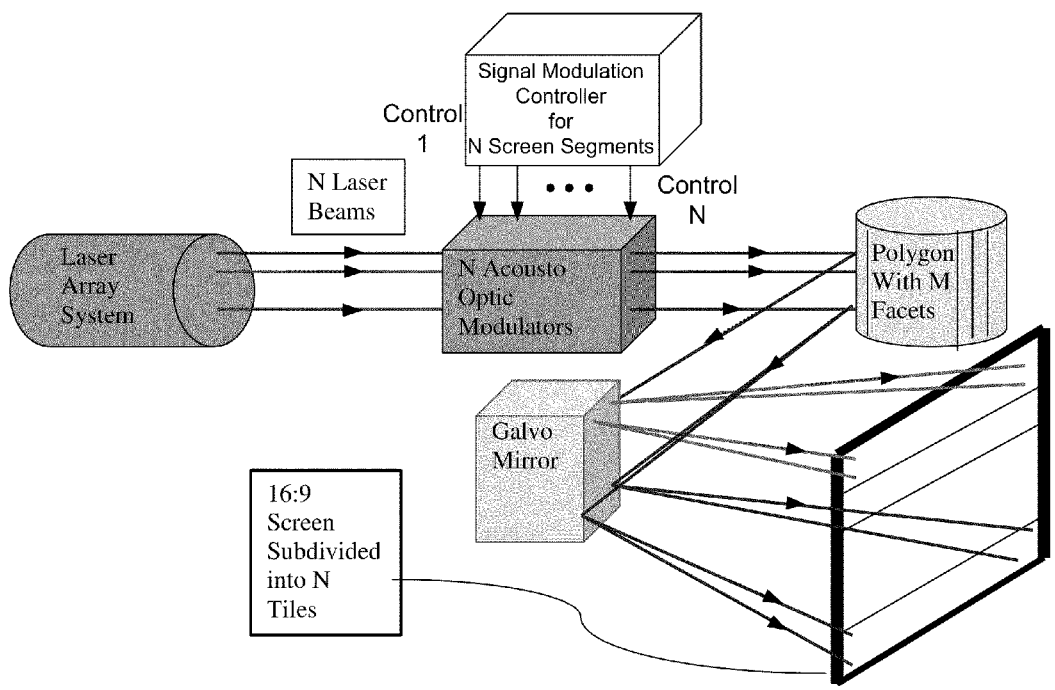

The present display systems may use a single scanning laser beam 120 to scan one horizontal line at a time to scan through the entire screen 101. Alternatively, multiple lasers may be used to produce multiple parallel scanning beams 120 to divide the screen 101 into N segments along the vertical direction so that one scanning beam 120 is designated to scan one segment and N scanning beams 120 are scanning N different segments at the same time. FIGS. 16 and 17 illustrate two display systems with different modulation methods based on the design in FIG. 1 that use multiple scanning laser beams to excite the color phosphor stripes on the screen.

As an example, the horizontal scanning may be achieved with a rotating polygon mirror with M facets and the vertical scanning may be achieved with a galvo mirror. For a screen for HDTV 16:9 aspect ratio, the angular ranges for horizontal and vertical scans are similar. For 16 degrees horizontal scan or +/−8 degrees, a mirror on the polygon needs to have a minimum subtended angle of 8 degrees. Therefore, the maximum number M of mirrors per 360 degrees is M=360/8=45 mirrors per revolution. Assuming 1080 interlaced lines or 540 odd lines followed by 540 even lines in 1/60 of a second, the number N of the scanning beams is equal to 540/M=12. Each beam scans 1/12 of the screen using a galvo mirror moving 9 degrees/12=0.75 degrees or 13 mrad. The segment of 1/12 of a screen is a sub-screen or a screen segment. Under this design, each sub-screen is traced in 1/60 of a second. The RPM of the disk is 3600 RPM with each mirror scan time equal to 1/60/45=370 usecs (ignoring retrace time). Each M facet moves at a speed of 370 usec. In each 370 usec slot the galvo mirror steps by increments of 0.75 degrees/45=0.3 mrad. Each sub-screen is scanned twice, one for odd lines and one for even lines in 1/60th second each, this means the galvo mirror moves by discrete steps of 0.3 mrad as shown below:

Line 1 odd is 0 mrad
Line 2 odd is 0.3 mrad
Line 3 odd is 0.6 mrad
. . .
Line 45 odd is 13 mrad
Flightback to Line 1 even at 0.15 mrad
Line 2 even at 0.45 mrad
. . .
Line 45 even at 13.15 mrad In this particular example, the video bandwidth can be determined as follows. Each horizontal scan takes 370 usec to complete. Time for each pixel=370 usec/1920=192 nsec or 5.2 Mhz. Typically one needs 3× the pixel time for proper video BW which means about 15 MHz 3 dB point. This type of modulation frequency is easily attained by AO modulation. A total of 12×3 UV diode lasers each at about 50-100 mW each may be used to generate the scanning beams.

Figure 18:
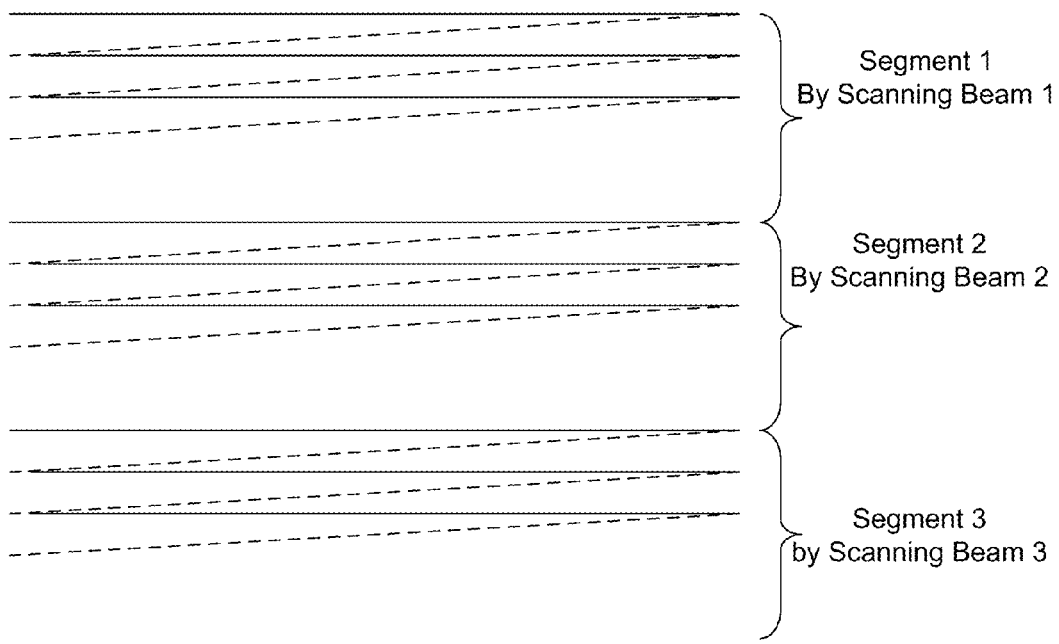
FIGS. 18 and 19 illustrate two exemplary implementations of the simultaneous scanning of multiple screen segments with multiple scanning laser beams.
Figure 19:
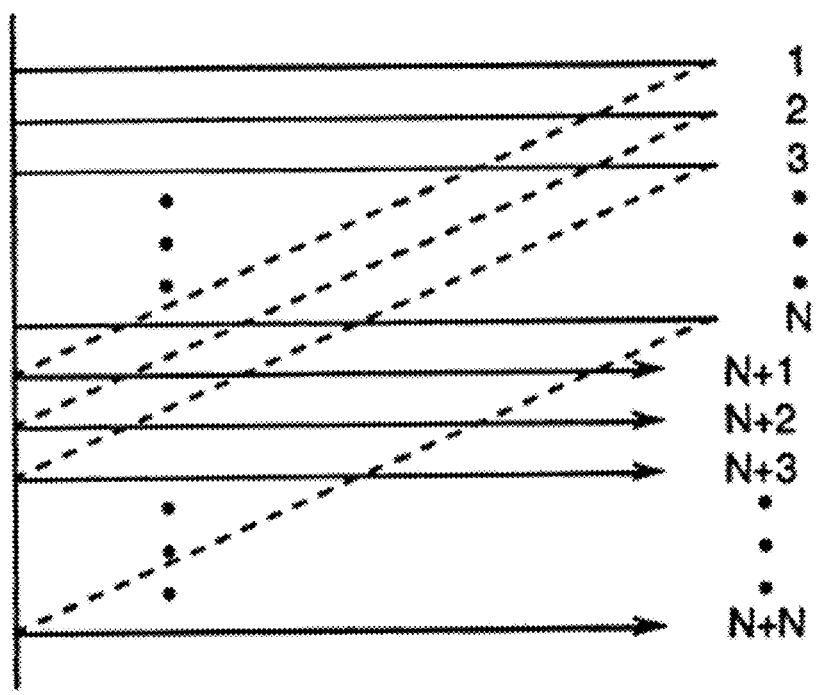

FIG. 18 shows one mode of simultaneous scanning of N segments or tiles. FIG. 19 shows an alternative scanning with N scanning laser beams that is described in the U.S. Pat. No. 5,920,361 and can be used with the present display systems. Polygons with reflective facets at different angles described in U.S. Pat. No. 5,920,361 can also be used in the present systems.

In implementing the above and other display designs, there can be a vertical misalignment between the multiple segments comprising the full screen. This misalignment can be digitally corrected with a means similar to that of the horizontal correction. Each segment of the screen can be driven with a scan engine capable of generating more horizontal lines than actually required for display in that segment (e.g., 4 extra lines). In perfectly aligned situation, there are an equal number of extra (unused) lines above and below the segment image. If vertical misalignment exists, the control electronics may shift the segment image upwards or downwards by utilizing these extra lines in place of normal lines. For example, if the image needs to be moved upwards one line, the controller moves each line upwards to the previous one, utilizing one of the extra lines above the normal image and adding an extra unused line at the bottom. If this adjustment is desired to take place automatically during startup or normal operation, a sensor is required to provide feedback in real time. Such a sensor could be a position sensing diode located to either side of the viewable area of the segment to be controlled. If desired, the line scans over the sensor. Alternatively a beam splitter could be used to provide feedback while scanning the viewable area of the segment.

One of the advantages of the above method is to reduce or simplify the requirement for accurate optical alignment because the electronic adjustment, when properly implemented, is simpler to implement and can reduce cost of the device.

The above described method allows adjustment with a resolution of only one line. To accomplish sub-line (sub-pixel) adjustment, the scan engine can be rotated slightly. This produces slightly diagonal horizontal scan lines. The adjacent screen segments would have scan engines slightly rotated on the opposite direction. Under this condition, to create a straight horizontal line, portions of at least two scan lines are used depending on the amount of rotation. This may provide a less noticeable junction between the screen segments.

Another method to reduce the visible junction artifact between two adjacent screen segments is to overlap the colors from each segment at the junction. For example the last blue line of segment #1 might be painted by one of the extra lines from the top of segment #2. Likewise, the first red line of segment #2 might be painted to be one of the extra lines at the bottom of segment #1. This could further visually spread any junction artifacts.

In the above display systems with color phosphor screens, the same scanning beam is used to address all three color sub pixels within each pixel on the screen. Alternatively, three different scanning beams may be used to respectively address the three color sub pixels in each color pixel. FIGS. 20A and 20B show one example of such a system.

More specifically, FIG. 20A shows that the screen 2001 with parallel vertical color phosphor stripes includes an array of cylindrical lenses 2002 that are respectively formed over the individual color phosphor stripes. A laser module 2010 produces three different scanning beams at the same wavelength to excite the phosphors on the screen 2001. The three laser beams can be directed to enter the screen 2001 with angular separations. Each cylindrical lens 2002 covers three adjacent phosphor stripes that respectively emit three different colors and focuses light of each scanning beam on a respective phosphor. Referring to FIG. 20B, the three separate scanning beams are directed at three different angles to address three different color sub pixels in each pixel via each of the cylindrical lenses 2002. The lenses 2002 at different horizontal positions may be tilted and such tilting may increase progressively from the center towards the edge of the screen to compensate for beam spot elongation that occurs with the increasing incidence angle of the input excitation light. The three scanning beams may be scanned together or independently to address all pixels. Three separate lasers may be used to generate the three scanning laser beams. In addition, N sets of the three laser beams may be used to simultaneously scan the screen 2001 in a similar manner as illustrated in FIGS. 16-19. Furthermore, red, green and blue optical sensors 2003R, 2003G and 2003B in an optical sensor module 2003 may be used to monitor the horizontal alignment between the scanning laser beams and the pixel positions on the screen and a feedback loop 2004 may be used to correct the misalignment via either the time delay technique or the adjustment of the imaging optics in the laser module 2010. The optical sensors 2003R, 2003G and 2003B may be wide area detectors and detect light emitted by the phosphors. One optical sensor is used to sense only one color of the three colors emitted by the screen 2001: the red optical sensor 2003R senses the red light, the green optical sensor 2003G senses the green light, and the blue optical sensor 2030B senses the blue light. The optical sensors 2003R, 2003G and 2003B are used in connection with the feedback loop 2003 and the laser module 2010 for closed-loop synchronization of the modulated laser beam to the phosphor stripes on the screen 2001.

Figure 21A:
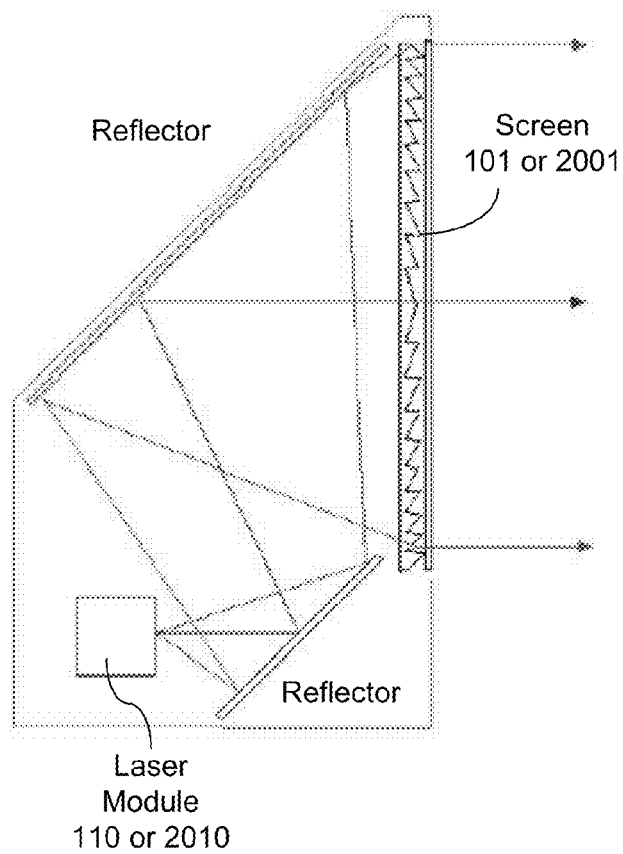
FIGS. 21A and 21B shows two examples of folded optical paths for directing a scanning laser beam to a screen with phosphors in rear projection configurations.
Figure 21B:
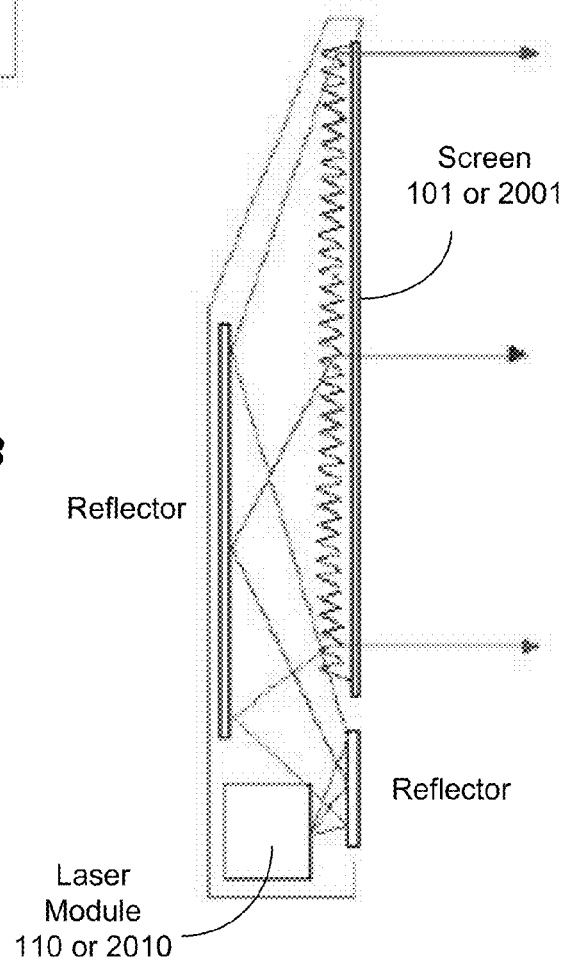

FIGS. 21A and 21B further show two folded optical designs that direct the output scanning laser beam from the laser module 110 or 2010 to a phosphor color screen in rear projection configurations. Such folded designs reduce the space of the systems.

As illustrated in FIGS. 16 and 17, laser scanning may be achieved by using a combination of a polygon for the horizontal scan and a galvo mirror for the vertical scan. A scanning device may be designed to integrate the functions of the polygon and the galvo mirror into a single device.

Figure 22:
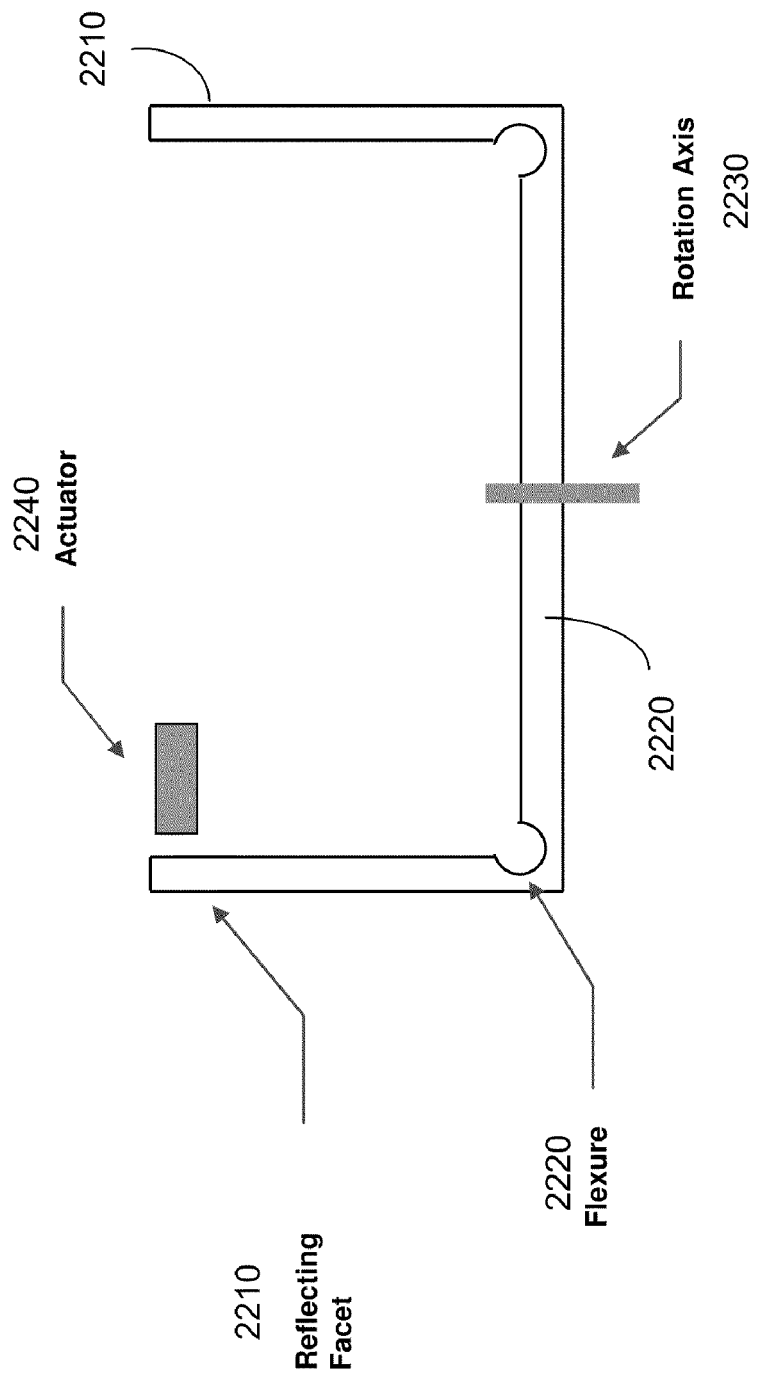
FIG. 22 shows an exemplary beam scanner with multiple reflecting facets for the laser display systems in FIGS. 1 and 2 where the reflecting facets are connected to a rotating platform via flexures to allow for adjustable tilting of the reflecting facets.

FIG. 22 shows one example of such an integrated scanner. The scanner includes multiple reflecting facets 2210 around a rotation axis 2230. Each facet 2210 is engaged to a base 2200 via a flexure joint 2220. An actuator 2240 is placed near the top end of each reflecting facet and rotates around the same axis 2230 with its corresponding reflecting facet. The actuator is controlled to apply an adjustable force onto the reflect facet to change its titling around the flexure 2220. The actuators 2240 and their corresponding reflecting facets 2210 can now individually controlled to scan the laser beam in the vertical direction while the reflecting facets 2210 rotating around the axis 2230 scan the laser beam in the horizontal direction. Two or more actuators 2240 may be provided for each reflecting facet and positioned at different heights along the reflecting surface to gradually tilt the reflecting facet in position for the vertical scanning.

In an alternative implementation, a single stationary actuator 2240 may be used to control tilting of different reflecting facets 2210. As each facet 2210 rotates around the axis 2230 and passes by the stationary actuator 2240, the facet is tilted by the operation of the actuator 2240 to perform the vertical scanning of the beam. Similarly, two or more stationary actuators may be used and placed at different heights of the facets.

The above scanning-laser display systems with screens having laser-excitable light-emitting materials may be used to form a monochromatic display module by having only one phosphor material on the screen. Hence, a red monochromatic display module based on this design can be implemented by replacing the green and blue phosphor stripes with red phosphor stripes on the screen 101 in FIG. 1. Accordingly, the scanning laser beam is modulated within the laser module 110 by a monochromatic image signal. As a result, the image on the screen is red. In comparison to the same screen with three color phosphor stripes, the display resolution of the monochromatic display is tripled. Such monochromatic displays can be used to form a color display by combining three monochromatic displays in red, green an blue and projecting the red, green, and blue images to a common screen to form the final color images. The stripes are used here to provide a spatial mask on the phosphor screen to avoid blooming between adjacent pixels. Other spatial patterns for the single color phosphor may also be used. In addition, the monochromatic screen may have a continuous layer of a single color phosphor and use an optional mask on top of the continuous phosphor layer.

Figure 23:
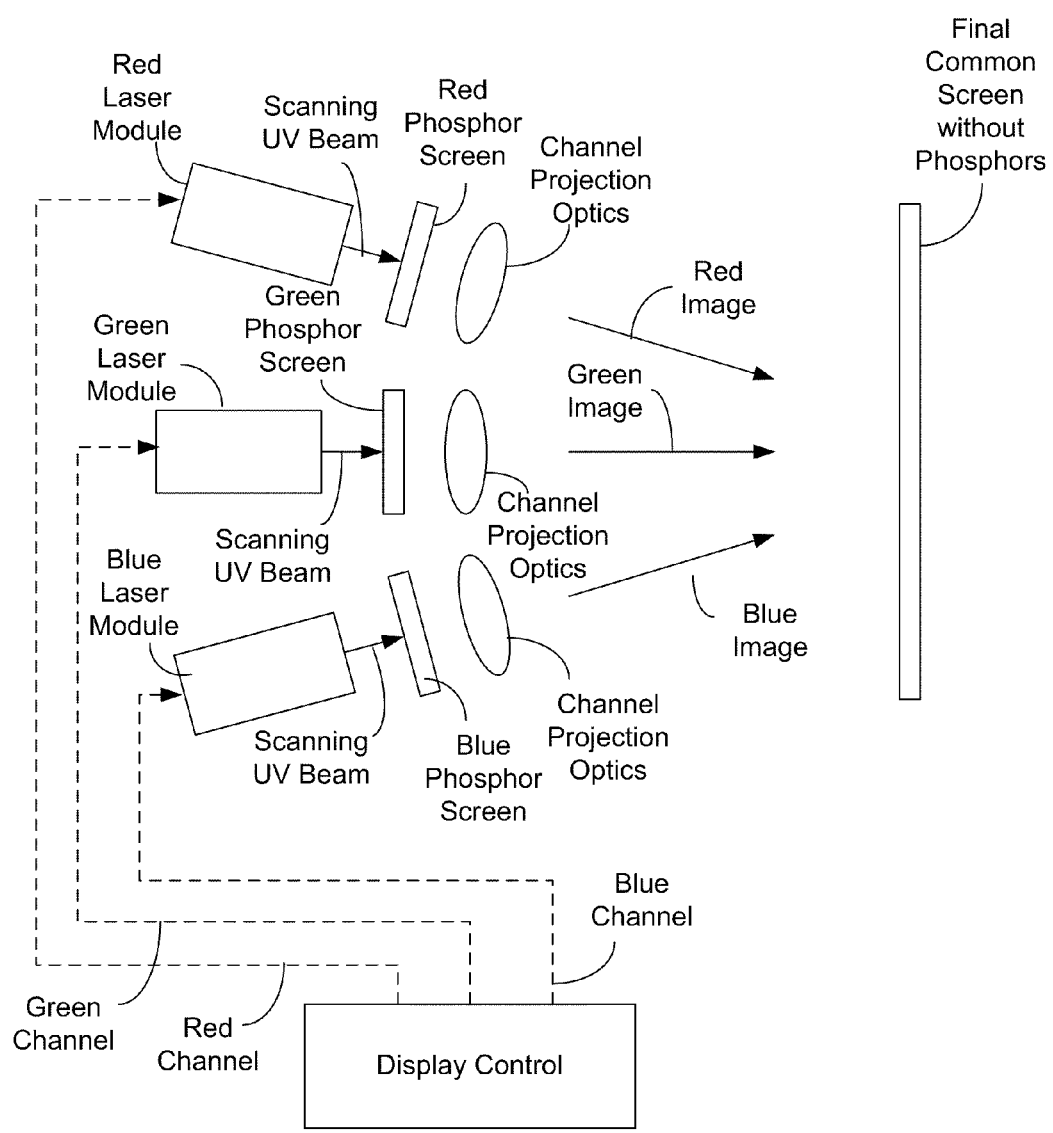
FIGS. 23, 24A and 24B show examples of laser display systems having three or more monochromatic projectors to project images of different colors on a common screen to produce a final color image via mixing of different colored images, where at least one monochromatic projector is based on the laser display system in FIG. 1 or 2 to create the monochromatic image from a projection screen with phosphor stripes.

FIG. 23 shows one example of a color laser projector based on the above design. Red, green, and blue monochromatic display modules are arranged to project red, green, and blue monochromatic images onto and overlap at a common display screen to produce the final color images. As illustrated, the optical axes of the red, green, and blue monochromatic display modules are arranged relative to one another to converge to the common display screen. Each monochromatic display module includes a laser module producing the UV laser beam, modulating the UV laser beam, and scanning the modulated UV laser beam on the corresponding monochromatic phosphor screen to produce images for that color channel. The designs in FIGS. 1 and 20A may be used. A channel projection optical module may be used to image of the monochromatic phosphor screen onto the common display screen. A display control is provided to produce the three color channel control signals to the three laser modules.

Figure 24A:
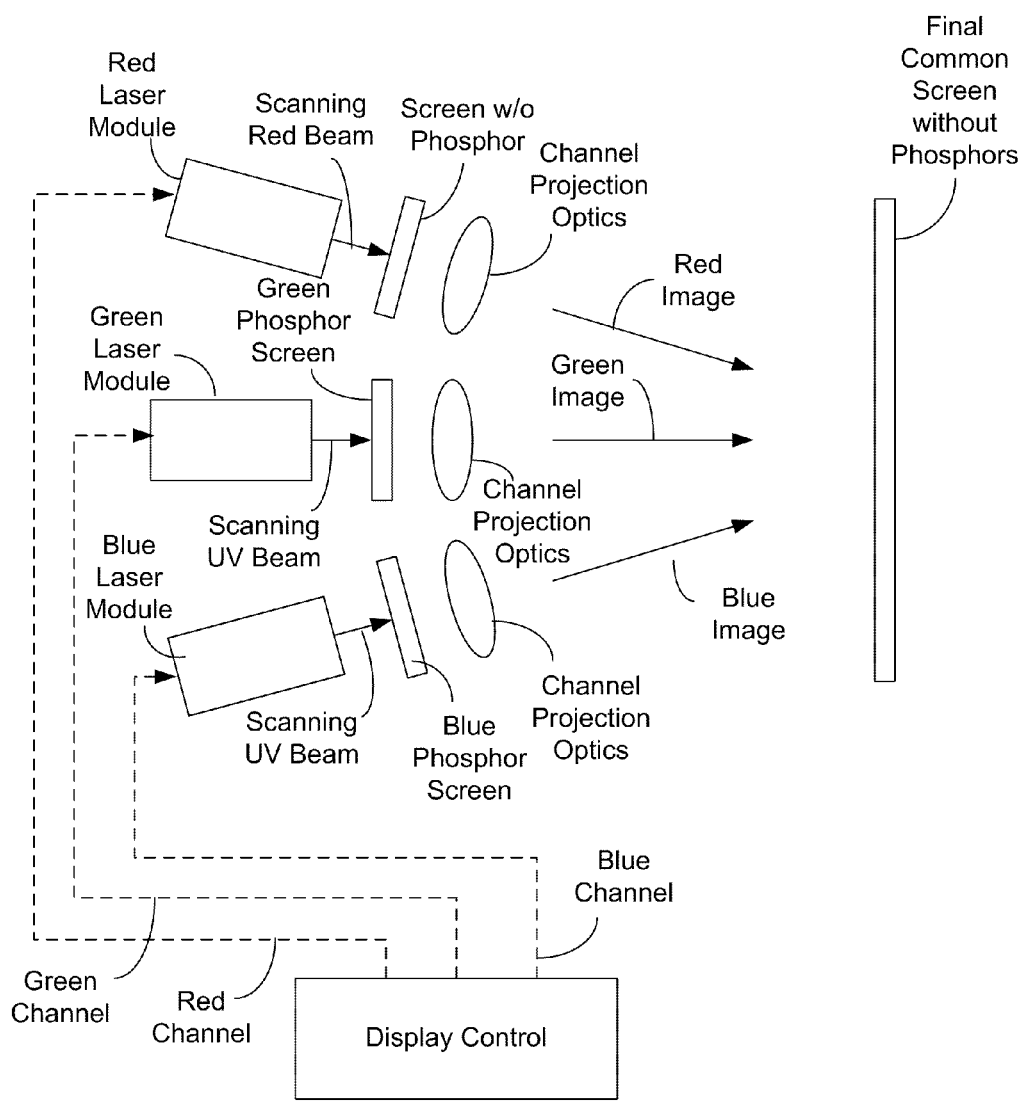

FIG. 24A shows another example of a color laser projector where only the green and blue monochromatic display modules are based on the scanning-laser display systems with screens having laser-excitable light-emitting fluorescent materials. The red display module, however, produces a modulated red laser beam or a red beam from a non-laser light source and directly scans the modulated red laser beam on a screen without the phosphor material. Hence, the red laser module is different from the green and blue laser modules in this design. Similar to the blue and green channels, the red image on the screen in the red display module is projected via its projection optics to the common display screen for displaying the final images. Therefore, the color images on the common display screen are results of mixing phosphor-generated blue and green images with direct red laser images. This design can be used to address the current lack of powerful, reliable, efficient, compact, and low cost green and blue solid-state lasers.

Figure 24B:
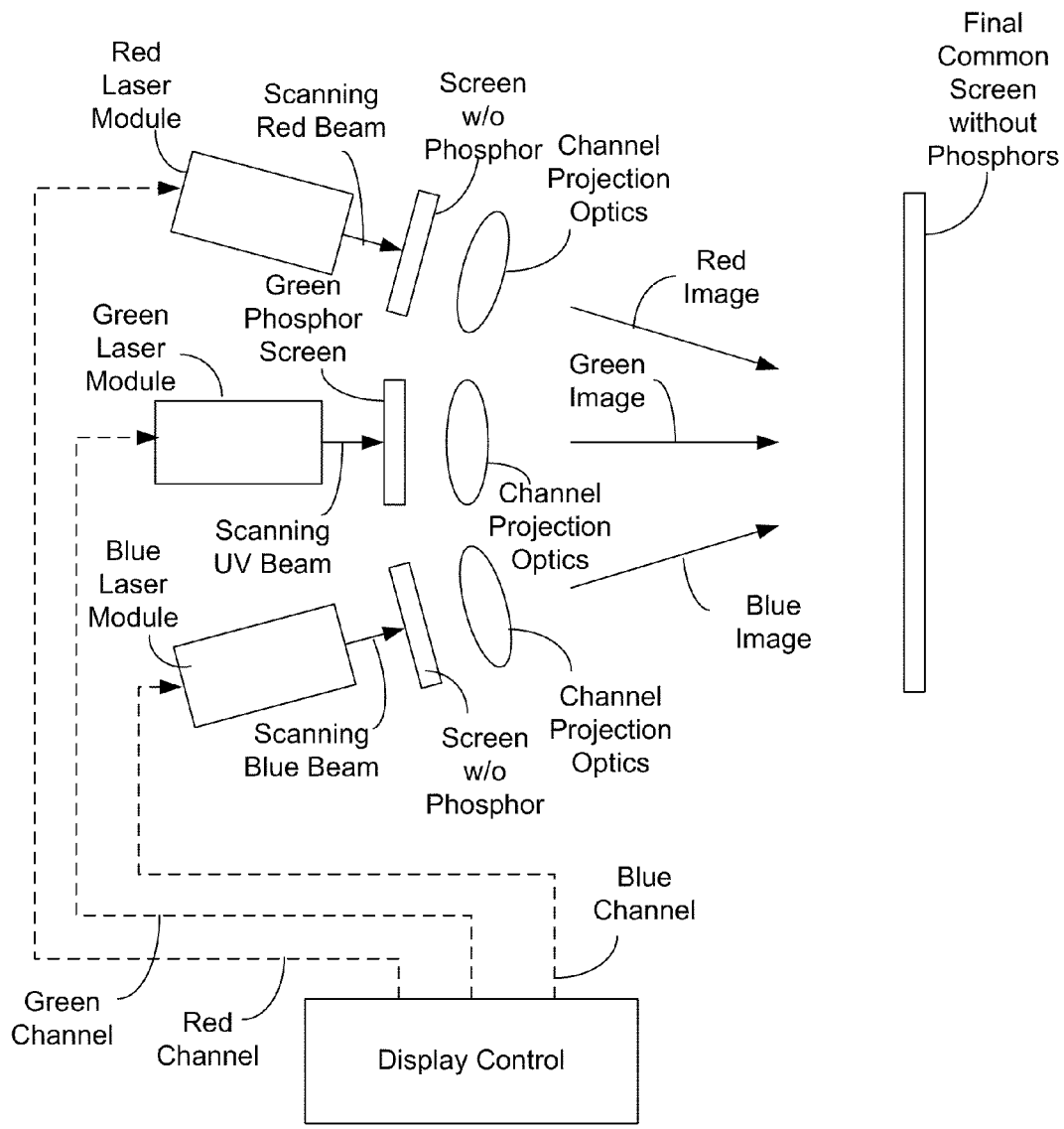

The above design of mixing phosphor-generated colors with direct laser colors can be applied to other color arrangements. FIG. 24B shows another example based on a 3-gun design where both the red and the blue display modules directly scan modulated red and blue laser beams, respectively, on their corresponding projection screens without phosphors to produce red and blue images to be projected onto the final common display screen and the green display module uses the scanning UV laser design with phosphor-based monochromatic screens based on the designs described in this application such as the examples shown in FIGS. 1 and 20A.

In addition, a monochromatic laser display module in the above color mixing designs may alternatively directly project its scanning laser beam at a desired color to the common display screen without the projection screen with the phosphor material. Accordingly, each projection screen without the phosphor material in FIGS. 24A and 24B can be eliminated. On the common display screen, one or more monochromatic images projected from one or more phosphor projection screens are mixed with one or more monochromatic images directly formed by one or more scanning laser beams at different colors to produce the final images.

Figure 25A:
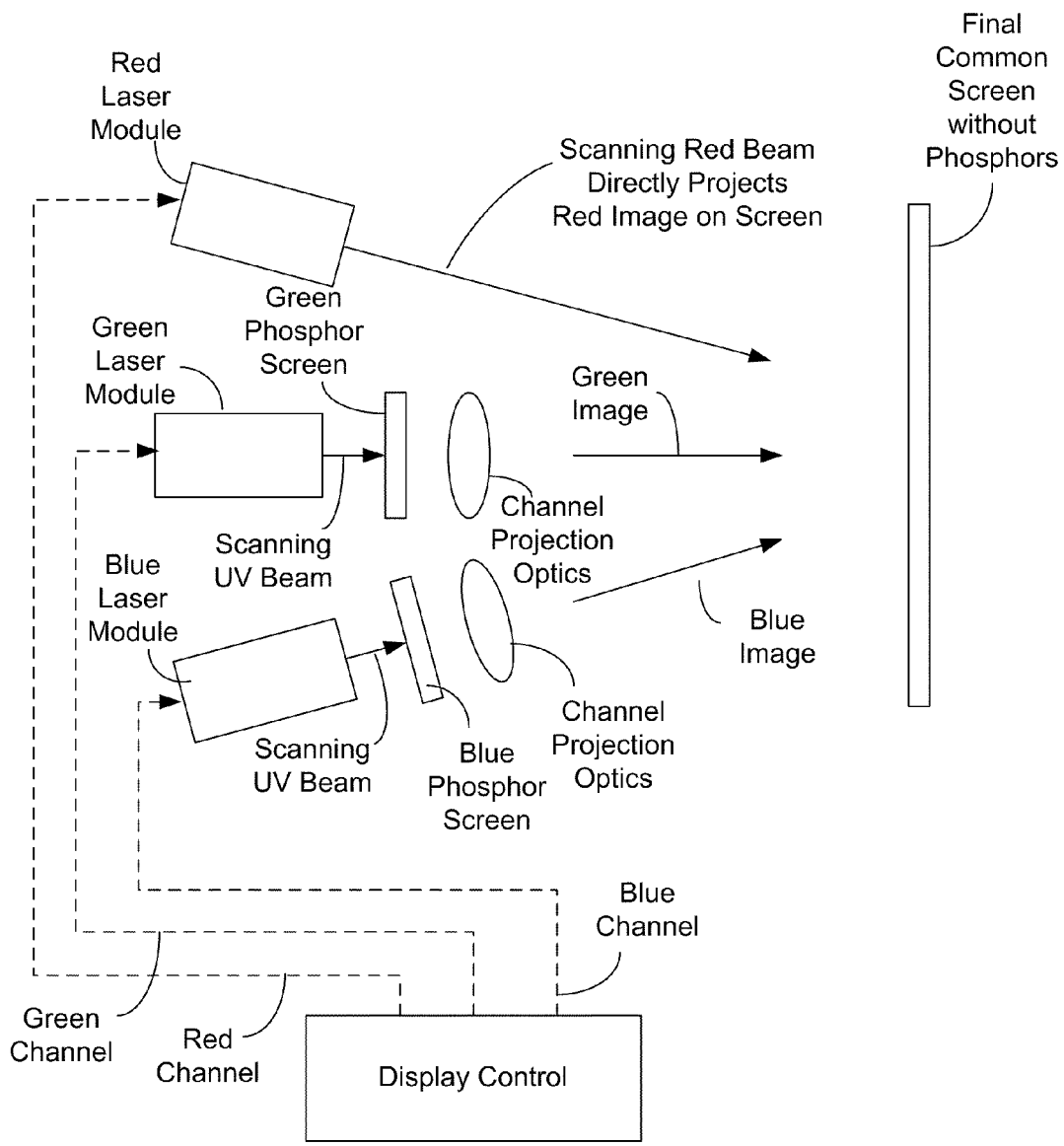
FIGS. 25A and 25B show two examples of laser displays that mix direct laser color with phosphor colors on a final display screen.
Figure 25B:
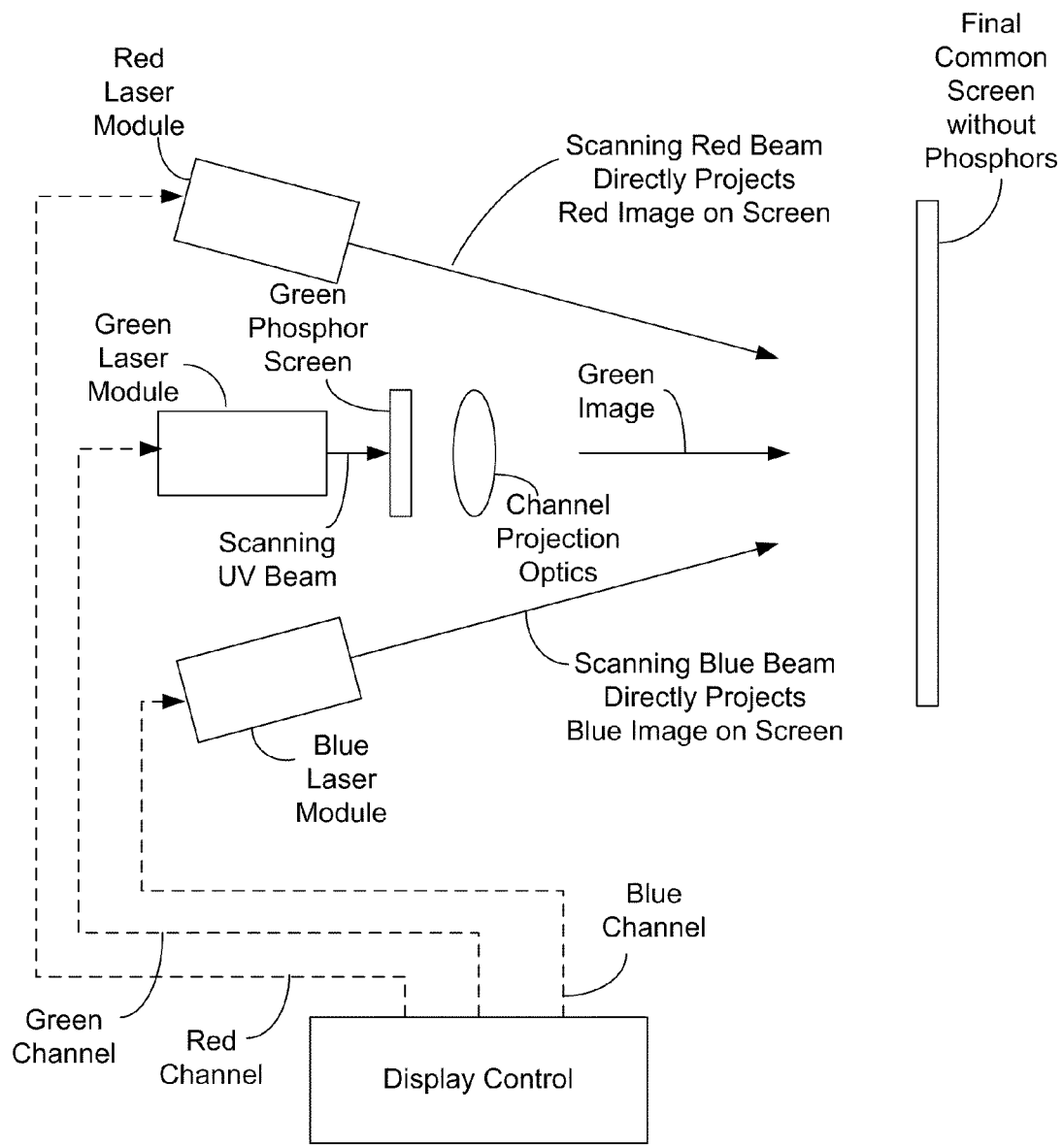

FIGS. 25A and 25B show two examples for this design by modifying the systems in FIGS. 24A and 24B, respectively. In FIG. 25A, a red scanning laser beam is directly produced and projected by the red laser module on to the common screen on which the red image scanned out by the red laser is mixed with green and blue images projected from the green and blue phosphor projection screens to produce the final images. In FIG. 25B, a red scanning laser beam is directly produced and projected by the red laser module onto the common screen and a blue scanning laser beam is directly produced and projected by the blue laser module on to the common screen. The green image projected from the green phosphor projection screen is mixed with the direct-scanning laser red and blue images to produce the final images on the common screen.

In the above designs, the final, common screen for displaying the final images produced from mixing a fluorescence-generated monochromatic image and a monochromatic image at a different color directly formed by a scanning colored beam is an optically "passive" screen in that the screen does not have any fluorescent material that emits light. A fluorescence-generated monochromatic image is generated by a phosphor projection screen which is excited by an excitation beam and the image is projected from the phosphor projection screen to the final optically "passive" screen where the mixing with images in other colors occurs. In some implementations, the separate projection screens and the final "passive" screen can be replaced by a single screen that generates one or more fluorescence-generated monochromatic images and mixes a fluorescence-generated monochromatic image and a monochromatic image directly formed on the screen by a scanning beam. Because at least one of monochromatic images that form the final image is directly formed on the screen by a scanning beam, the screen in such a design is "partially optically active" in that the screen has a fluorescent material that is excited by an optical excitation beam to produce one or more monochromatic images but does not generate all of the monochromatic images that form the final images on the screen. The screen may be designed to include parallel fluorescent stripes and non-fluorescent stripes on a substrate where each non-fluorescent stripe is to display a monochromatic image that is directly formed by light of a scanning beam without emitting fluorescent light.

For example, a display system based on this design may include a screen with at least two different florescent materials that absorb an excitation beam at an excitation wavelength and emit fluorescent light at two different colors. The excitation beam is at a visible color that is different from the colors of the light emitted by the fluorescent materials. In some implementations, the screen include an array of color pixels where each pixel includes subpixels for different colors: a non-fluorescent sub pixel without a fluorescent material to directly display the color and image of the excitation beam, and spatially separated fluorescent subpixels respectively with different fluorescent materials to emit different colors in response to the illumination of the excitation beam. In other implementations, the screen can have parallel stripe patterns in a period pattern where each period includes a non-fluorescent stripe that does not have a fluorescent material and directly displays the color and image of the excitation beam and adjacent different stripes formed of the different florescent materials for different colors. The visible monochromatic excitation beam scans through the screen in a direction perpendicular to the stripes to produce different monochromatic images at different colors that form the final colored images on the screen.

Figure 26A:
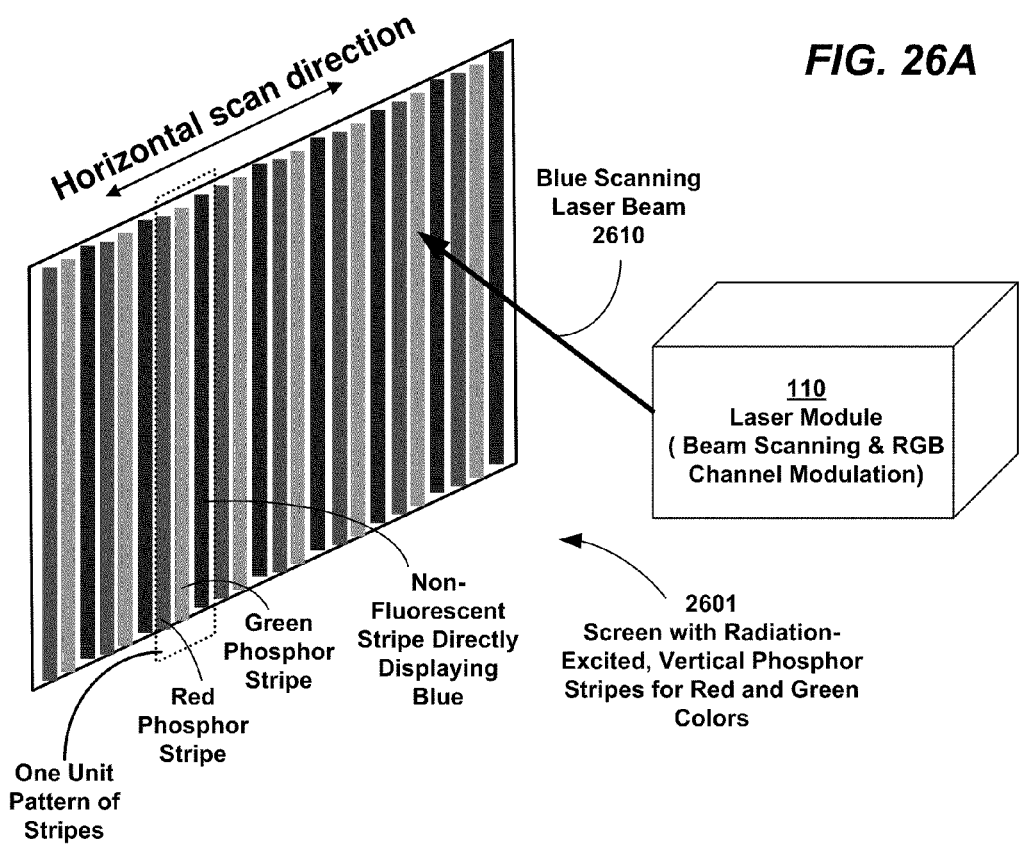
FIGS. 26A and 26B show two examples of display systems where the screens have florescent regions that emit fluorescent light at different colors and non-fluorescent regions that display images directly formed by a scanning beam.
Figure 26B:
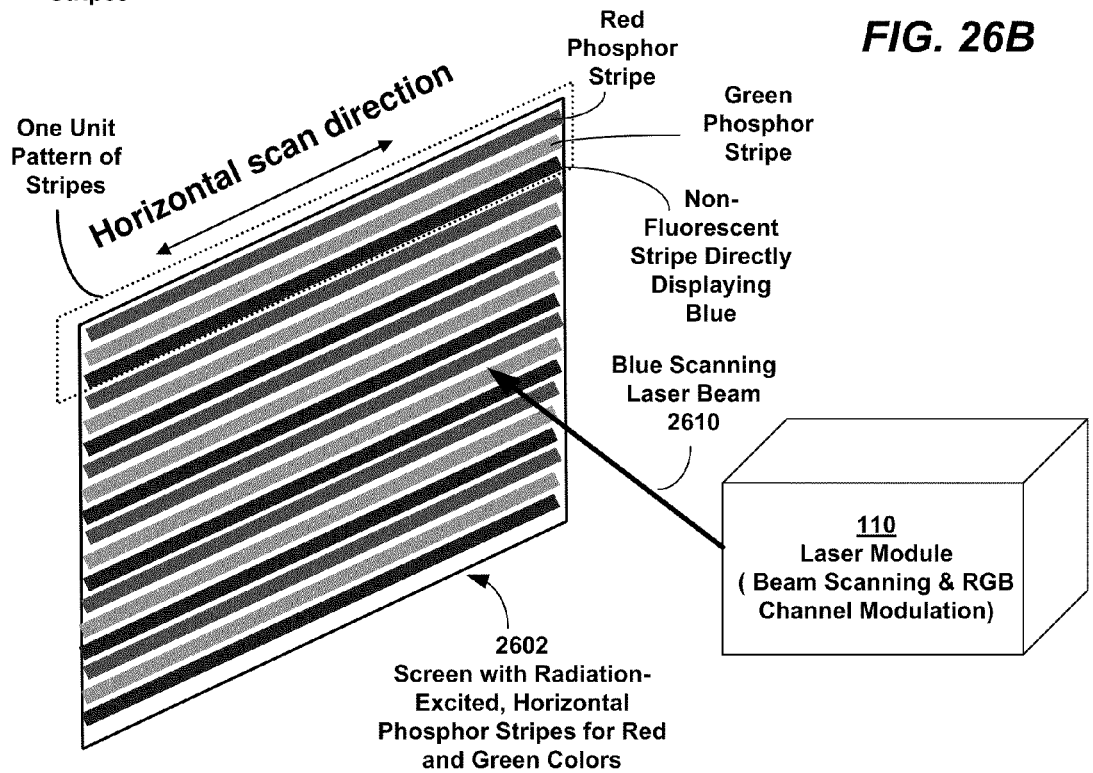

FIGS. 26A and 26B show two examples of display systems where the screens have florescent regions that emit fluorescent light at different colors and non-fluorescent regions that display images directly formed by a scanning beam. A light module 2601 produces a blue scanning beam 2610 to the screen 2601 or 2602. The blue beam 2610 is modulated to carry image information in blue and other color channels (e.g., the green and red). The image for the blue channel is directly displayed at a non-fluorescent region. The fluorescent regions are coated with fluorescent materials that absorb the light of the blue beam 2610 and emit light in other color channels to display the images in other color channels. The blue beam 2610, as an example, may be at a wavelength around or less than 470 nm. In the illustrated examples, each of the screens 2601 and 2602 includes parallel stripe patterns in a period pattern. Each period includes parallel stripes with two fluorescent stripes for the red phosphor and the green phosphor and one non-fluorescent stripe.

UV-excitable phosphors suitable of color or monochromatic screens described in this application may be implemented with various material compositions. Typically, such phosphors absorb excitation light such as UV light to emit photons in the visible range at wavelengths longer than the excitation light wavelength. For example, red, green, and blue fluorescent materials may be ZnCdS:Ag, ZnS:Cu, and ZnS:Ag, respectively.

TABLE 1

Examples of Phosphors

| Patent Publications # | Phosphor System(s) |
|---|---|
| WO 02/11173 A1 | MS:Eu; M = Ca, Sr, Ba, Mg, Zn<br>M*N*$_2$S$_4$:Eu, Ce; M* = Ca, Sr, Ba, Mg, Zn;<br>N* = Al, Ga, In, Y, La, Gd |
| U.S. Pat. No. 6,417,019B1 | (Sr$_{1-u-v-x}$Mg$_u$Ca$_v$Ba$_x$)<br>(Ga$_{2-y-z}$Al$_y$In$_z$S$_4$):Eu$^{2+}$ |
| US2002/0185965 | YAG:Gd, Ce, Pr, SrS, SrGa$_2$S$_4$ |
| WO 01/24229 A2 | CaS:Eu$^{2+}$/Ce$^{3+}$, SrS:Eu$^{2+}$/Ce$^{3+}$<br>SrGa$_2$S$_4$:Eu$^{2+}$/Ce$^{3+}$ |
| US Application 20040263074 | SrS:Eu$^{2+}$; CaS:Eu$^{2+}$;<br>CaS:Eu$^{2+}$, Mn$^{2+}$; (Zn, Cd) S:Ag$^+$;<br>Mg$_4$GeO$_{5.5}$F:Mn$^{4+}$; ZnS:Mn$^{2+}$. |

TABLE 1-continued

Examples of Phosphors

| Patent Publications # | Phosphor System(s) |
|---|---|
| WO 00/33389 | Ba$_2$MgSi$_2$O$_7$:Eu$^{2+}$; Ba$_2$SiO$_4$:Eu$^{2+}$;<br>(Sr, Ca, Ba) (Al, Ga)$_2$S$_4$:Eu$^{2+}$ |
| US20010050371 | (Li, K, Na, Ag)Eu$_{(1-x)}$ (Y, La, Gd;)$_x$<br>(W, Mo)$_2$O$_8$; Y$_x$Gd$_{3-x}$Al$_5$O$_{12}$: |
| U.S. Pat. No. 6,252,254 B1 | YBO$_3$:Ce$^{3+}$, Tb$^{3+}$; BaMgAl$_{10}$O$_{17}$:Eu$^{2+}$, Mn$^{2+}$;<br>(Sr, Ca, Ba) (Al, Ga)$_2$S$_4$:Eu$^{2+}$; Y$_3$Al$_5$O$_{12}$:Ce$^{3+}$<br>Y$_2$O$_2$S:Eu$^{3+}$, Bi$^{3+}$; YVO$_4$:Eu$^{3+}$, Bi$^{3+}$;<br>SrS:Eu$^{2+}$; SrY$_2$S$_4$:Eu$^{2+}$;<br>CaLa$_2$S$_4$:Ce$^{3+}$; (CaSr)S:Eu$^{2+}$ |
| US2002/0003233 | Y—Al—O; (Y, Ln)—Al—O;<br>(Y, Ln)—(Al, Ga)—O<br>SrGa$_2$S$_4$; SrS<br>M—Si—N<br>[Ce, Pr, Ho, Yb, Eu] |
| EP 1150361 A1 | (Sr, Ca, Ba)S:Eu$^{2+}$ (SrS:Eu$^{2+}$) |
| US 20020145685 | Display device using blue LED and red, green phosphors<br>SrS:Eu$^{2+}$ and SrGa$_2$S$_4$:Eu$^{2+}$ |
| US 20050001225 | (Li, Ca, Mg, Y)$_x$Si$_{12-(m+n)}$Al$_{(m+n)}$O$_n$N$_{16-n}$:Ce,<br>P, Eu, Tb, Yb, Er, Dy |
| U.S. Pat. No. 5,998,925 | (Y, Lu, Se, La, Gd, Sm) (Al, Ga)O:Ce |
| U.S. Pat. No. 6,765,237 | BaMg$_2$Al$_{16}$O$_{27}$:Eu$^{2+}$ (BAM) and (Tb$_{(1-x-y)}$<br>(Y, La, Gd, Sm)$_x$ (Ce, Nd, Sm, Eu, Gd, Dy,<br>Ho, Er, Tm, Yb, Lu)$_y$)$_3$ (Al, Ga, In)<br>(TAG) |
| US Application 20040227465 | Sr$_x$Ba$_y$Ca$_2$SiO$_4$:Eu$^{2+}$, Ce, Mn, Ti, Pb, Sn |
| US Application 20050023962 | ZnSe(x)S(1 − x):(Cu, Ag, Al, Ce,<br>Tb, Cl, I, Mg, Mn) |
| US Application 20050023963 | (Be, Mg, Ca, Sr, Ba, Zn) (Al, Ga, In,<br>Y, La, and Gd)$_2$(S$_x$Se$_y$)$_4$:Eu, Ce, Cu,<br>Ag, Al, Tb, Cl, Br, F, I, Mg, Pr,<br>Na, Mn |

TABLE 1 lists some examples of phosphors that emit visible color light when excited by excitation light in the wavelength range from 380 nm to 415 nm described in various published patent documents. Various phosphors listed in TABLE 1 can also be excited by light from 450 nm to 470 nm. These and other phosphors can be used to implement the phosphor-based laser displays described in this application.

The examples of phosphors described in the published PCT application Ser. No. WO 02/11173 A1 are "Type I" phosphors with compositions of Eu-doped photoluminescent metal sulfides in form of MS:Eu where M is at least one of Ca, Sr, Ba, Mg and Zn, and "Type II" phosphors with compositions of metal thiometallate photoluminescent materials in form of M*N*$_2$S$_4$:Eu,Ce where M* is at least one of Ca, Sr, Ba, Mg and Zn, and N* is at least one of Al, Ga, In, Y, La and Gd. A photoluminescent metal sulfide MS (Type I phosphor) may include at least one of Ba, Mg, and Zn alone or in combination with at least one of Sr and Ca. A metal thiometallate photoluminescent material M*N*$_2$S$_4$ (type II phosphor) may include at least one element selected from the group M*=Mg and Zn alone for M* or in combination with at least one of Ba, Sr and Ca and the element N* may be Al or Ga alone or in further combination with In, Y, La, Gd. A metal thiometallate photoluminescent material may be activated with at least one of europium (Eu) and cerium (Ce). Two or more of type I and type II phosphors may be combined, or one or more phosphors of type I and type II phosphors may be combined with other phosphors different from phosphors of type I and type II to form a phosphor blend to generate a color that may not be available from individual type I and type II phosphors.

Specific examples of the phosphor compositions for the type I phosphors for emitting red colors include $(Sr_{1-x-y}M_x\text{-}Eu_y)S$ with M is at least one of Ba, Mg, Zn alone or in combination with Ca and $0<x\leqq=0.5$ and $0<y\leqq=0.10$, $(Sr_{1-x-y}Ba_xEu_y)S$ with $x\leqq0.25$, $(Sr_{1-x-z-y}Ca_xBa_zEu_y)S$ with $x+y+z\leqq=0.35$ which exhibit a high quantum efficiency of 65-80%, high absorbance in the range from 370 nm to 470 nm of 60-80% and low loss, below 10%, of the luminescent lumen output from room temperature to 100° C. due to thermal quenching. Specific examples of type II phosphor compositions are $M^*N^*_2S_4$:Eu,Ce (type II phosphor) where $M^*$ is at least one of $M^*$=Mg, Zn alone or together with at least one of Ba, Sr, Ca, and $N^*$ is at least one of $N^*$=Al, Ga, alone or together with small amounts (below 20%) of In, Y, La, Gd. Such type II phosphors emit light in the blue, green or green-yellow spectral range of the visible spectrum. Specific compositions for the type II phosphors include $(M^{**}_{1-u}Mg_u)(Ga_{1-v}N^*_v)_2S_4$:Ce with $u\leqq0.75$ and $v\leqq0.10$, and $M^{}$ is at least one of $M^{}$=Ba, Sr, Ca, Zn, $(M^{**}_{1-s-t}Eu_sCe_t)(Ga_{1-v}N^*_v)_2 S_4$ with $M^{**}$ is at least one of=Mg, Zn alone or in combination with Sr, Ba, Ca, and $N^*$=Al, In, Y, La, Gd and $0<s\leqq=0.10$ and $0\leqq t:s<0.2$ with $v\leqq0.10$, $((Ba_{1-u}Mg_u)_{1-s-t}Eu_sCe_t)(Ga_{1-v}\ N^*_v)_2S_4$ with $u\leqq0.75$ and $v\leqq0.10$ and $0<s\leqq0.10$ and $0s\leqq t:s<0.2$, $(((Ba_{1-w}Ca_w)_{1-u}Mg_u)_{1-s-t}Eu_sCe_t)(Ga_{1-v}N^*_v)_2S_4$ with $u<0.75$ and $w\geqq0.10$ and $v<0.10$ and $0<s\leqq0.10$ and $0\leqq t:s<0.2$, $(((Ba_{1-r}Sr_r)_{1-u}Mg_u)_{1-s-t}Eu_sCe_t)(Ga_{1-v}N^*_v)_2S_4$ with $u<0.75$ and $r\geqq0.10$ and $v\leqq0.10$ and $0<s\leqq0.10$ and $0\leqq t:s<0.2$, $(((Sr_{1-w}Ca_w)_{1-u}Mg_u)_{1-s-t}Eu_sCe_t)(Ga_{1-v}N^*_v)_2S_4$ with $u\leqq0.75$ and $w\geqq0.10$ and $v\leqq0.10$ and $0<s\leqq0.10$ and $t:s<0.2$, and $(((Sr_{1-p}Zn_p)_{1-u}Mg_u)_{1-s-t}Eu_sCe_t)(Ga_{1-v}N^*_v)_2S_4$ with $u<0.75$ and $p\leqq0.35$ and $v\leqq0.10$ and $0<s\leqq0.10$ and $0\leqq t:s<0.2$.

The examples of phosphors described in U.S. Pat. No. 6,417,019 include $(Sr_{1-u-v-x}Mg_uCa_vBa_x)(Ga_{2-y-z}AlIn_zS_4):Eu^{2+}$, $(Sr_{1-u-v-x}Mg_uCa_vBa_x)(Ga.sub.2-y-zAl_yIn_zS_4):Eu^{2+}$. The phosphor particles may be dispersed in a host material which is selected from, for example, materials including but not limited to epoxies, acrylic polymers, polycarbonates, silicone polymers, optical glasses, and chalcogenide glasses. Alternatively, such phosphors may be deposited on substrate surfaces as phosphor films.

The examples of phosphors described in U.S. Patent Application Publication No. 2002/0185965 include the phosphor powder mixed with the conventional curable silicone composition is a powder of $(Y,Gd)_3Al_5O_{12}$:Ce (gadolinium and cerium doped yttrium aluminum garnet) particles available as product number QUMK58/F from Phosphor Technology Ltd., Nazeing, Essex, England. Particles of this phosphor material have a typical diameter of about 5 microns (μm), range from 1 to 10 μm, absorb light of wavelengths from about 430 nm to about 490 nm, and emit light in a broad band from about 510 nm to about 610 nm. The color of light emitted by an LED having a stenciled phosphor layer is determined, in part, by the concentration of phosphor particles in the luminescent stenciling composition. The phosphor particles may be mixed with the curable silicone polymer composition at concentrations ranging from about 20 grams of phosphor particles per 100 grams of silicone polymer composition to about 120 grams of phosphor particles per 100 grams of silicone polymer composition. In some implementations, the titanium dioxide particles may also be used as additives and dispersed in the silicone polymer composition at a concentration of about 1.5 grams of titanium dioxide per 100 grams of silicone polymer composition to about 5.0 grams of titanium dioxide per 100 grams of silicone polymer composition. The titanium dioxide particles, which are approximately the same size as the phosphor particles, increase the scattering of excitation light and thus increase the absorption of that light by the phosphor particles. Next, after the phosphor particles and optional titanium dioxide particles are mixed with the curable silicone composition, finely divided silica particles are dispersed in the mixture to form a thixotropic gel. A thixotropic gel exhibits thixotropy, i.e., an apparent drop in viscosity when subjected to shear and a return to the original viscosity level when the shear force is removed. Consequently, a thixotropic gel behaves as a fluid when shaken, stirred, or otherwise disturbed and sets again to a gel when allowed to stand. The silica particles may be, e.g., particles of fumed silica, a colloidal form of silica made by combustion of chlorosilanes in a hydrogen-oxygen furnace. Fumed silica is chemically and physically stable at temperatures exceeding 120° C., transparent to visible light, and will impart satisfactory thixotropic properties to the luminescent stenciling composition at comparatively low concentrations. The grade of fumed silica used is chosen to be compatible with non-polar materials. In one implementation, the fumed silica is M-5P grade CAB-O-SIL®. untreated amorphous fumed silica obtained from Cabot Corporation of Boston, Mass. This grade of fumed silica is hydrophobic and has an average surface area per unit mass of $200\pm15$ $m^2/g$. The M-5P grade fumed silica particles are dispersed in the mixture of phosphor particles and silicone polymer composition with a conventional three roll mill at concentrations of about 1.5 grams of fumed silica per 100 grams of silicone polymer composition to about 4.5 grams of fumed silica per 100 grams of silicone polymer composition. As the concentration of fumed silica is increased, the stenciling composition becomes more thixotropic, i.e., more solid-like as an undisturbed gel.

Other implementations use fumed silica having a surface area per unit mass either greater than or less than $200\pm15$ $m^2/g$. For fixed concentrations of fumed silica, stenciling compositions become more thixotropic as the surface area per unit mass of the fumed silica is increased. Thus, fumed silicas having lower surface area per unit mass must be used at higher concentrations. The required high concentrations of low surface area per unit mass fumed silicas can result in stenciling compositions having viscosities that are too high to be easily stenciled. Consequently, the fumed silica preferably has a surface area per unit mass greater than about 90 $m^2/g$. In contrast, as the surface area per unit mass of the fumed silica is increased, the required concentration of fumed silica decreases, but the fumed silica becomes more difficult to disperse in the silicone polymer composition.

The examples of phosphors described in the PCT Patent Application Publication No. WO 01/24229 include host materials and dopant ions. The host material may have an inorganic, ionic lattice structure (a "host lattice") in which the dopant ion replaces a lattice ion. The dopant is capable of emitting light upon absorbing excitation radiation. Suitable dopants strongly absorb excitation radiation and efficiently convert this energy into emitted radiation. As an example, the dopant may be a rare earth ion which absorbs and emits radiation via 4f-4f transitions, i.e. electronic transitions involving f-orbital energy levels. While f-f transitions are quantum-mechanically forbidden, resulting in weak emission intensities, it is known that certain rare earth ions, such as $Eu^{2+}$ or $Ce^{3+}$, strongly absorb radiation through allowed 4f-5df transitions (via d-orbital/f-orbital mixing) and consequently produce high emission intensities. The emissions of certain dopants can be shifted in energy depending on the host lattice in which the dopant ion resides. Certain rare earth dopants efficiently convert blue light to visible light when incorporated into an appropriate host material. In some implementations, the first and second phosphors comprise a host sulfide material, i.e. a lattice which includes sulfide ions. Examples of suitable host sulfide materials include CaS, SrS and a thiogallates such as $SrGa_2S_4$. A phosphor mixture may be formed by different rare earth ions that are excitable by one common blue energy source of a relatively narrow linewidth to emit light at two different energy ranges (e.g. red and green). As an example for such a phosphor mixture, the dopant is the same in the first and second phosphors with different host materials. The red and green emissions of the two phosphors can be tuned by selecting an appropriate host material. In one embodiment, the green phosphor is $SrGa_2S_4$:Eu. In another embodiment, the red phosphor is selected from the group consisting of SrS:Eu and CaS:Eu.

The examples of phosphors described in U.S. Patent Application Publication No. 2004/0263074 include particles which are characterized as being capable of down-conversion, that is, after being stimulated (excitation) by relatively shorter wavelength light, they produce longer wavelength light (emission). The phosphor composition comprises at least one, typically at least two (or three, or four) types of phosphor particles, which each have their own emission characteristics. In an embodiment having at least two different types of phosphor particles, the first type of phosphor particle emits red light upon excitation, and the second type of phosphor particle emits green light upon excitation. For red emission, typical phosphor particles suitable for use in the phosphor composition may comprise a material selected from $SrS:Eu^{2+}$, $CaS:Eu^{2+}$; $CaS:Eu^{2+},Mn^{2+}$; $(Zn,Cd)S:Ag^+$; $Mg_4GeO_{5.5}F:Mn^{4+}$; $Y_2O_2S:Eu^{2+}, ZnS:Mn^{2+}$, and other phosphor materials having emission spectra in the red region of the visible spectrum upon excitation. For green emission, typical phosphor particles suitable for use in the phosphor composition may comprise a material selected from $SrGa_2S_4:Eu^{2+}$; ZnS:Cu,Al and other phosphor materials having emission spectra in the green region of the visible spectrum upon excitation. In some implementations, blue emitting phosphor particles may be included in the phosphor composition in addition to the red- and green-emitting phosphors; suitable blue emitting phosphor particles may comprise, e.g. $BaMg_2Al_{16}O_{27}:Eu^{2+},Mg$ or other phosphor materials having emission spectra in the blue region of the visible spectrum upon excitation. In other implementations, the phosphor composition may comprise a type of phosphor particles that is selected to produce yellow light upon excitation. For yellow emission, phosphor particles suitable for use in the phosphor composition may include a material selected from $(Y,Gd)_3Al_5O_{12}:Ce,Pr$ and other phosphor materials having emission spectra in the yellow region of the visible spectrum upon excitation.

Some suitable red-emitting phosphor particles may have a peak emission wavelength in the range of about 590 nm to about 650 nm. In particular embodiments, the phosphor particles have a peak emission wavelength in the range of about 620 nm to about 650 nm, typically in the range of about 625 nm to about 645 nm, more typically in the range of about 630 nm to about 640 nm. In other embodiments, the phosphor particles have a peak emission wavelength in the range of about 590 nm to about 625 nm, typically in the range of about 600 nm to about 620 nm. In yet other embodiments, the phosphor particles may emit light having a wavelength in the range of about 600 nm to about 650 nm, typically in the range of about 610 nm to about 640 nm, more typically in the range of about 610 nm to about 630 nm.

Some suitable green-emitting phosphor particles may have a peak emission wavelength in the range of about 520 nm to about 550 nm. In particular embodiments, the phosphor particles have a peak emission wavelength in the range of about 530 nm to about 550 nm, typically in the range of about 535 nm to about 545 nm. In other embodiments, the phosphor particles have a peak emission wavelength in the range of about 520 nm to about 535 nm. In yet other embodiments, the phosphor particles emit light having a wavelength in the range of about 520 nm to about 550 nm, typically in the range of about 535 nm to about 550 nm, or in the range of about 520 nm to about 535 nm.

Some suitable blue-emitting phosphor particles typically have a peak emission wavelength in the range of about 440 nm to about 490 nm. In particular embodiments, the phosphor particles have a peak emission wavelength in the range of about 450 nm to about 470 nm, typically in the range of about 455 nm to about 465 nm. In other embodiments, the phosphor particles have a peak emission wavelength in the range of about 440 nm to about 450 nm, typically in the range of about 435 nm to about 445 nm. In yet other embodiments, the phosphor particles emit light having a wavelength in the range of about 440 nm to about 480 nm, typically in the range of about 450 nm to about 470 nm.

Some suitable yellow-emitting phosphor particles typically have a peak emission wavelength in the range of about 560 nm to about 580 nm. In particular embodiments, the phosphor particles have a peak emission wavelength in the range of about 565 nm to about 575 nm. In other embodiments, the phosphor particles have a peak emission wavelength in the range of about 575 nm to about 585 nm. In yet other embodiments, the phosphor particles emit light having a wavelength in the range of about 560 nm to about 580 nm, typically in the range of about 565 nm to about 575 nm.

The exact wavelength range for each of the above described type of phosphor particles may be determined by selection from available sources of phosphors, desired color attributes of the light emitting device (e.g. the 'correlated color temperature' of the emitted white light), choice of the excitation light such as the excitation wavelength, and the like. Useful phosphor materials and other information may be found in Mueller-Mach et al., "High Power Phosphor-Converted Light Emitting Diodes Based on III-Nitrides", IEEE J. Sel. Top. Quant. Elec. 8(2):339 (2002).

The examples of phosphors described in the published PCT application Ser. No. PCT/US99/28279 include $Ba_2MgSi_2O_7:Eu^{2+}$; $Ba_2SiO_4:Eu^{2+}$; and $(Sr,Ca,Ba)(Al,Ga)_2S_4:Eu^{2+}$, where the element following the colon represents an activator. The notation (A,B,C) signifies $(A_x,B_y,C_z)$ where $0 \leq x \leq 1$ and $0 \leq y \leq 1$ and $0 \leq z \leq 1$ and $x+y+z=1$. For example, (Sr,Ca,Ba) signifies $(Sr_x,Ca_y,Ba_z)$ where $0 \leq x \leq 1$ and $0 \leq y \leq 1$ and $0 \leq z \leq 1$ and $x+y+z=1$. Typically, x, y, and z are all nonzero. The notation (A,B) signifies $(A_x,B_y)$ where $0 \leq x \leq 1$ and $0 \leq y \leq 1$ $x+y=1$. Typically, x and y are both nonzero. Examples of green emitting phosphors may have peak emissions between about 500 nm and about 555 nm. For example, $Ba_2MgSi_2O_7:Eu^{2+}$ has a peak emission at about 495-505 nm, typically about 500 nm, $Ba_2SiO_4:Eu^{2+}$ has a peak emission at about 500-510 nm, typically about 505 nm, and $(Sr,Ca,Ba)(Al,Ga)_2S_4:Eu^{2+}$ has a peak emission at about 535-545 nm, typically about 540 nm.

The examples of phosphors described in U.S. Patent Application Publication No. 2001/0050371 include fluorescent materials that include a CaS phosphor activated by Eu, phosphors represented by $AEu_{(1-x)}Ln_xB_2O_8$ where A is an element selected from the group consisting of Li, K, Na and Ag; Ln is an element selected from the group consisting of Y, La and Gd; and B is W or Mo; and x is number equal to or larger than 0, but smaller than 1. A CaS phosphor activated by Eu or a phorsphor of $AEu_{(1-x)}Ln_xB_2O_8$ may be mixed with a base polymer to form a transparent resin. As an example, a red phosphor that emits red light may be CaS activated by Eu or a compound expressed by a general formula $AEu_{(1-x)}Ln_xB_2O_8$. CaS activated by Eu is excited by light of 420 to 600 nm and emits light of 570 to 690 nm which peaks at 630 nm. $AEu_{(1-x)}Ln_xB_2O_8$ is a phosphor which emits light near 614 nm by $^5D_0$-$^7F_2$ transition of $Eu^{3+}$ ions. Although an excitation wavelength and an emission wavelength differ depending on the kinds of elements A and B of the phosphor, the red phosphors can be excited by light near 470 nm (blue) and or 540 nm (green) and can emit light near 620 nm (red). When x is zero, the phosphor $AEuB_2O_8$ is formed and exhibits the highest emission intensity near 615 nm (red). $AEu_{(1-x)}Ln_xB_2O_8$ (A=Li, K, Na, Ag; Ln=Y, La, Gd; B=W, Mo) may be obtained by mixing oxides, carbonate and the like of elements which constitute the phosphor at a desired stoichiometric ratio. In addition to the above red phosphors, a yttrium aluminate phosphor (so-called YAG) can be a stable oxide having a garnet structure in which Y-atoms of $Y_3Al_5O_{12}$ are substituted by Gd at part of their positions, particularly a phosphor which is excited by blue light (400 to 530 nm) to emit light of yellow to green region centering 550 nm. Activating elements to be added to the yttrium aluminate phosphor include, for example, cerium, europium, manganese, samarium, terbium, tin, chromium, etc. For example, $Y_xGd_{3-x}Al_5O_{12}$ activated by Ce may be used. In implementations, one, two or more kinds of such YAG phosphors may be mixed together to form a desired phosphor material.

The examples of phosphors described in U.S. Pat. No. 6,252,254 include $YBO_3:Ce^{3+},Tb^{3+}$; $BaMgAl_{10}O_{17}:Eu^{2+}$, $Mn^{2+}$; $(Sr,Ca,Ba)(Al,Ga)_2S_4:Eu^{2+}$; and $Y_3Al_5O_{12}:Ce^{3+}$; and at least one of: $Y_2O_2S:Eu^{3+},Bi^{3+}$; $YVO_4:Eu^{3+},Bi^{3+}$; $SrS:Eu^{2+}$; $SrY_2S_4:Eu^{2+}$; $SrS:Eu^{2+},Ce^{3+},K^+$; $(Ca,Sr)S:Eu^{2+}$; and $CaLa_2S_4:Ce^{3+}$, where the element following the colon represents an activator. As an example, the $SrS:EU^{2+},Ce^{3+},K^+$ phosphor, when excited by blue light, emits a broadband spectrum including red light and green light. These phosphor compositions can be used to produce white light with pleasing characteristics, such as a color temperature of 3000-4100° K., a color rendering index of greater than 70, typically greater than 80, for example about 83-87, and a device luminous efficacy of about 10-20 lumens per watt of input electric power when blue LED is used as the excitation source.

The examples of phosphors described in U.S. Patent Application Publication No. 2002/0003233 include a single crystal Cerium-doped Yttrium-Aluminum-Garnet $(Y_3Al_5O_{12}:Ce^{3+})$ compound as a yellowish-light-emitting phosphor. Yttrium-Aluminum-Oxides which do not have garnet structures, such as monoklinic YalO and YalO-perovskite, may also be used as the host materials for the phosphors. Several lanthanides (Ln) may partly replace the Yttrium, such as in (Y,Ln)AlO, (Y,Ln)(Al,Ga)O. The lanthanide may be, for example Lutethium (Lu). These host materials may be doped with single dopants such as Cerium (Ce), Praseodymium (Pr), Holmium (Ho), Ytterbium (Yb), and Europium (Eu), or with double dopants such as (Ce,Pr), (Ce,Ho), and (Eu,Pr) to form various phosphors. $Y_3Al_5O_{12}:Ho^{3+}$, and $Y_3Al_5O_{12}:Pr^{3+}$ are examples of single crystal phosphor materials. In one embodiment, a phosphor listed above emits yellowish light by absorbing either bluish light or ultraviolet light having a wavelength that is shorter than or equal to about 460 nm. In one example, a YAG substrate doped with 4 mol % Cerium $(Ce^{3+})$ can absorb light having a wavelength of about 410-460 nm and emit yellowish light having a peak wavelength of about 550-570 μm. any. Part of the Yttrium in YAG may be substituted by a lanthanide element such as Gadolinium (Gd). For example, a phosphor may be $(Y_{0.75}Gd_{0.25})AG:Ce$.

The examples of phosphors described in European Patent Application No. 1,150,361 include a resin comprising a phosphor selected from the phosphor family chemically identified as $(Sr,Ca,Ba)S:Eu^{2+}$. One phosphor selected from this family is strontium sulfide doped with europium, which is chemically defined as $SrS:Eu^{2+}$ and has a peak emission at 610 nm. Rather than using phosphor-converting resins, dyes or epoxies, other types of phosphor converting elements may also be used, including phosphor-converting thin films, phosphor-converting substrates, or various combinations of these elements.

The examples of phosphors described in U.S. Patent Application Publication No. 2002/0145685 include a red phosphor $SrS:Eu^{2+}$ and a green phosphor $SrGa_2S_4:Eu^{2+}$. These phosphors are excitable by the 460 nm blue light.

The examples of phosphors described in U.S. Patent Application Publication No. 2005/0001225 include rare-earth element doped oxide nitride phosphor or cerium ion doped lanthanum silicon nitride phosphor. A rare-earth element doped oxide nitride in the following examples is a crystalline material, not including a glass material such as oxynitride glass. However, it may include a small amount of glass phase (e.g., less than 5%). A cerium ion doped lanthanum silicon nitride in the following examples is a crystalline material, not including a glass material.

One example of a first phosphor is single-phase α-sialon phosphor that is represented by: $Me_xSi_{12-(m+n)}Al_{(m+n)}O_nN_{16-n}:Re1_yRe2_z$. Part or all of metal (Me) (Me is one or more of Li, Ca, Mg, Y and lanthanide metals except for La and Ce) dissolved into the α-sialon is replaced by lanthanide metal (Re1) (Re1 is one or more of Ce, Pr, Eu, Tb, Yb and Er) as luminescence center or lanthanide metal (Re1) and lanthanide metal (Re2) (Re2 is Dy) co-activator. In this case, Me may be one or more of Ca, Y and lanthanide metals except for La and Ce. In some implementations, Me may be Ca or Nd. The lanthanide metal (Re1) used for replacing may be Ce, Eu or Yb. In case of using two kinds of metals for replacing, for example, a combination of Eu and Er may be used. In case of using three kinds of metals for replacing, for example, a combination of Eu, Er and Yb may be used.

Also, the metal (Me) may be replaced by lanthanide metal Re1 and lanthanide metal Re2 as co-activator. The lanthanide metal Re2 is dysprosium (Dy). In this case, the lanthanide metal Re1 may be Eu. Meanwhile, if part or all of metal (Me) replaced by one or more of Ce, Pr, Eu, Tb. Yb and Er (lanthanide metal (Re1)), or one or more of Ce, Pr, Eu, Tb, Yb and Er (lanthanide metal (Me) (Re1)) and Dy (lanthanide metal (Re2)), then the metal is not necessarily added and may be replaced by another metal.

A-sialon (α-sialon) has a higher nitrogen content than oxynitride glass and is represented by: $N_xSi_{12-(m-n)}Al_{(m+n-)}O_nN_{16-n}$ where x is a value obtained dividing (m) by a valence of metal (M). Meanwhile, oxynitride glass is as described in prior art 3, such a phosphor that serves to shift the position of excitation/emission peak of conventional oxide system phosphors to the longer wavelength side by replacing oxygen atom surrounding the rare-metal element as luminescence center by nitrogen atom to relax the influence of surrounding atoms to electron of rare-metal element, and that has an excitation spectrum extending until visible region (≦500 μm).

Also, in the single-phase α-sialon phosphor, the metal (Me) is dissolved in the range of, at the minimum, one per three unit cells of α-sialon including four mass weights of $(Si,Al)_3(N,O)_4$ to, at the maximum, one per one unit cell thereof. The solid solubility limit is generally, in case of bivalent metal (Me), $0.6<m<3.0$ and $0\leqq n<1.5$ in the above formula and, in case of trivalent metal (Me), $0.9<m<4.5$ and $0\leqq n<1.5$. It is estimated that, in a region except for those regions, single-phase α-sialon phosphor is not obtained.

The interionic distance of lanthanide metal Re1 as luminescence center to replace part or all of metal (Me) and to serve as activator is about 5 angstroms at the minimum. It is significantly greater than 3 to 4 angstroms in phosphor known thus far. Therefore, it can prevent a significant reduction in emission intensity due to concentration quenching generated when a high concentration of lanthanide metal as luminescence center is included in matrix material.

Further in the single-phase α-sialon phosphor, the metal (Me) is replaced by lanthanide metal (Re2) as α-activator as well as lanthanide metal (Re1) as luminescence center. It is assumed that lanthanide metal (Re2) has two co-activation effects. One is sensitizer function and the other is to newly generate a carrier trap level to develop or improve the long persistence or to improve the thermal luminescence. Since the lanthanide metal Re2 is co-activator, it is suitable that the replacement amount thereof is generally $0.0\leqq z<0.1$ in the earlier formula.

The single-phase α-sialon phosphor has α-sialon as a matrix material, and is essentially different in composition and crystal structure from a phosphor having β-sialon as matrix material.

Namely, β-sialon is represented by: $Si_{6-z}Al_zO_zN_{8-z}$ ($0<z<0.2$), and it is solid solution of β-type silicon nitride where part of Si sites is replaced by Al and part of N sites is replaced by O. In contrast, α-sialon is represented by: $Me_xSi_{12-(m+n)}Al_{(m+n)}O_nN_{16-n}$, and it is a solid solution of α-type silicon nitride, where part of Si—N bonds is replaced by Al—N bond and a specific metal (Me) (Me is one or more of Li, Ca, Mg, Y and lanthanide metals except for La and Ce) invades between lattices and is dissolved therein. Thus, both are different in state of solid solution and, therefore, the β-sialon has a high oxygen content and the α-sialon has a high nitrogen content. So, if a phosphor is synthesized using β-sialon as matrix material and adding one or more of rare-earth oxides of Ce, Pr, Eu, Tb, Yb and Er as luminescence center, it becomes a mixed material that has a compound including a rare-earth metal between β-sialon particles since the β-sialon does not dissolve metal.

In contrast, if α-sialon is used as matrix material, the metal (Me) (Me is one or more of Li, Ca, Mg, Y and lanthanide metals except for La and Ce) is taken and dissolved in the crystal structure and the metal (Me) is replaced by rare-earth metal, Ce, Pr, Eu, Tb, Yb and Er as luminescence center. Therefore, the oxide nitride phosphor composed of single-phase α-sialon structure can be obtained.

Accordingly, the composition and crystal structure of phosphor drastically changes by whether to use β-sialon or α-sialon as matrix material. This is reflected in emission characteristics of phosphor.

In case of using β-sialon as matrix material, for example, a phosphor that is synthesized adding Er oxide to β-sialon radiates a blue luminescent light (410-440 nm). In α-sialon, as described later, rare-earth element doped oxide nitride phosphor radiates orange to red light (570-590 nm) due to the activation of Er. Viewing from this phenomenon it is assumed that Er is taken in the crystal structure of α-sialon and, thereby, Er is influenced by nitrogen atom composing the crystal and, therefore, the elongation of light source wavelength, which is very difficult to realize in phosphor with oxide as matrix material, can be easily generated.

In case of using α-sialon as matrix material, the rare-earth element doped oxide nitride phosphor also has the advantages of matrix material, α-sialon. Namely, α-sialon has excellent thermal and mechanical properties and can prevent the thermal relaxation phenomenon that causes a loss in excitation energy. Therefore, in the rare-earth element doped oxide nitride phosphor, a ratio of reduction in emission intensity according to rise of temperature becomes small. Thus, the temperature range available can be broadened as compared to the conventional phosphor.

Furthermore, α-sialon has an excellent chemical stability. Therefore, the phosphor has an excellent heat resistance. The rare-earth element doped oxide nitride phosphor can be excited by ultraviolet rays to X-rays further electron beam, according to O/N ratio in its composition, selection of lanthanide metal Re1 to replace metal (Me), and existence of lanthanide metal Re2 as α-activator.

Especially, of rare-earth element doped oxide nitride phosphor, in $Me_xSi_{9.75}Al_{2.25}O_{0.75}N_{15.25}:Re1_yRe2_z$ (m=1.5, n=0.75), one that satisfies $0.3<x+y<0.75$ and $0.01<y+z<0.7$ (where $y>0.01$, $0.0\leqq z<0.1$) or $0.3<x+y+z<1.5$, $0.01<y<0.7$ and $0.0\leqq z<0.1$, and metal (Me) is Ca offers an excellent emission characteristic and can have great potential in applications not only as ultraviolet-visible light excitation phosphor but also as electron beam excitation phosphor.

Different from the above first phosphor, an example of a second phosphor is a rare-earth element doped oxide nitride phosphor that contains α-sialon as main component (hereinafter referred to as mixture α-sialon phosphor). This second phosphor includes α-sialon, which dissolves a rare-earth element allowing an increase in brightness of a white LED using blue LED chip as light source, β-sialon, and unreacted silicon nitride. As the result of researching a composition with high emission efficiency, a mixture material with a property equal to single-phase α-sialon phosphor is found that is composed of α-sialon that part of Ca site in α-sialon stabilized by Ca is replaced by one or more of rare-earth metal (M) (where M is Ce, Pr, Eu, Tb, Yb or Er), β-sialon and unreacted silicon nitride. In some implementations, M is preferably Ce, Eu or Yb and further preferably Ce or Eu.

The mixture α-sialon phosphor can be produced adding less rare-earth element than the single-phase α-sialon phosphor. Thus, the material cost can be reduced. Further, since the mixture α-sialon phosphor also has α-sialon as matrix material like the single-phase α-sialon phosphor, it can have the advantages of matrix material α-sialon, i.e. good chemical, mechanical and thermal properties. Thus, it offers a stable and long-lifetime phosphor material. Due to these properties, it can suppress thermal relaxation phenomenon causing a loss in excitation energy. Therefore, in α-sialon with dissolved rare-earth element as well as Ca in this embodiment, a ratio of reduction in emission intensity according to rise of temperature becomes small. Thus, the temperature range available can be broadened as compared to the conventional phosphor.

Furthermore, the mixture α-sialon phosphor can be excited by ultraviolet rays to X-rays further electron beam, according to O/N ratio in its composition and selection of metal (M).

The mixture α-sialon phosphor offers a material that has an emission property equal to the single-phase α-sialon phosphor even when reducing the amount of rare-earth metal added. In order to stabilize the α-sialon structure, it is necessary to dissolve more than a certain amount of element. When amounts of Ca and trivalent metal dissolved are given x and y, respectively, a value of (x+y) is needed to be greater than 0.3 in thermodynamic equilibrium.

The mixture α-sialon phosphor includes an organ with β-sialon and unreacted silicon nitride remained other than single-phase α-sialon phosphor because of less addition amount and not reaching the thermodynamic equilibrium.

The amount of added metal in the mixture α-sialon phosphor is in the range of $0.05<(x+y)<0.3$, $0.02<x<0.27$ and $0.03<y<0.3$ in chemical composition of powder. If the amount of added metal is less than the lower limit, the amount of α-sialon lowers and the emission intensity lowers. If the amount of added metal is greater than the upper limit, only α-sialon remains. Therefore, the object of high brightness can be completed. In the range defined above, the mixture α-sialon phosphor can be obtained that is composed of: α-sialon of 40 weight % or more and 90 weight % or less; β-sialon of 5 weight % or more and 40 weight % or less; and unreacted silicon nitride of 5 weight % or more and 30 weight % or less. The reason why the emission intensity is high even with the unreacted silicon nitride included is that α-sialon epitaxially grows on unreacted silicon nitride and its surface portion mainly responds to excitation light to offer an emission property substantially equal to only α-sialon.

The range may be $0.15<(x+y)<0.3$, $0.10<x<0.25$ and $0.05<y<0.15$. In this range, the mixture α-sialon phosphor can be obtained that is composed of: α-sialon of 50 weight % or more and 90 weight % or less; β-sialon of 5 weight % or more and 30 weight % or less; and unreacted silicon nitride of 5 weight % or more and 20 weight % or less.

The mixture α-sialon phosphor can be obtained by, e.g., heating $Si_3N_4$-$M_2O_3$—CaO—AlN—$Al_2O_3$ system mixed powder at 1650 to 1900° C. in inert gas atmosphere to get a sintered body, then powdering it. Since CaO is so instable that it easily reacts with moisture vapor in the air, it is generally obtained by adding in the form of calcium carbonate or calcium hydroxide, then making it CaO in the process of heating at high temperature.

The chemical composition of mixture α-sialon phosphor can be defined using the composition range of M-α-sialon, Ca-α-sialon and β-sialon. Namely, in the range of three composition lines of $Si_3N_4$-$a(M_2O_3.9AlN)$, $Si_3N_4$-$b(CaO.3AlN)$ and $Si_3N_4$-$c(AlN.Al_2O_3)$, it is defined $4 \times 10^{-3}<a<4 \times 10^{-2}$, $8 \times 10^{-3}<b<8 \times 10^{-2}$ and $10^{-2}<c<8 \times 10^{-1}$.

An example of a third phosphor is a cerium ion doped lanthanum silicon nitride phosphor: $La_{1-x}Si_3N_5$:xCe (doping amount x is $0<x<1$), where lanthanum site is replaced in solid dissolution by cerium ion activator. If the doping amount is $0.1<x<0.5$, it is ultraviolet light excitation phosphor and, if the doping amount is $0.0<x<0.2$, it is electron beam excitation phosphor.

Lanthanum silicon nitride ($LaSi_3N_5$) has an excellent thermal stability and serves to suppress the thermal relaxation phenomenon in the process of phosphor emission. Therefore, a loss in excitation energy can be reduced and a ratio of reduction in emission intensity according to rise of temperature becomes small. Thus, in the cerium ion doped lanthanum silicon nitride phosphor, the temperature range available can be broadened as compared to the conventional phosphor. Also, the lanthanum silicon nitride ($Lasi_3N_5$) has excellent chemical stability and is light resistance.

The cerium ion doped lanthanum silicon nitride phosphor satisfies a blue chromaticity value and has excellent thermal stability, mechanical property and chemical stability. Therefore, it can have great potential in applications for fluorescent character display tube (VFD), field emission display (FED) etc. that may be used in severe environment.

The examples of phosphors described in U.S. Pat. No. 5,998,925 include a garnet fluorescent material comprising 1) at least one element selected from the group consisting of Y, Lu, Sc, La, Gd and Sm, and 2) at least one element selected from the group consisting of Al, Ga and In, and being activated with cerium. $Y_3Al_5O_{12}$:Ce and $Gd_3In_5O_{12}$:Ce are two examples. The presence of Y and Al enables a phosphoer to increase the luminance. For example, in a yttrium-aluminum-garnet fluorescent material, part of Al may be substituted by Ga so that the proportion of Ga:Al is within the range from 1:1 to 4:6 and part of Y is substituted by Gd so that the proportion of Y:Gd is within the range from 4:1 to 2:3. Other examples of phosphor include $(Re_{1-r}Sm_r)_3(Al_{1-s}Ga_s)_5O_{12}$:Ce, where $0 \leq r<1$ and $0 \leq s \leq 1$ and Re is at least one selected from Y and Gd, $(Y_{1-p-q-r}Gd_pCe_qSm_r)_3(Al_{1-s}Ga_s)_tO_{12}$ as the phosphor, where $0 \leq p \leq 0.8$, $0.003 \leq q \leq 0.2$, $0.0003 \leq r \leq 0.08$ and $0 \leq s \leq 1$. In some implementations, a phosphor may include two or more yttrium-aluminum-garnet fluorescent materials, activated with cerium, of different compositions including Y and Al to control the emission spectrum of the phosphor. In other implementations, a phosphor may include a first fluorescent material represented by general formula $Y_3(Al_{1-s}Ga_s)_5O_{12}$:Ce and a second fluorescent material represented by the formula $Re_3Al_5O_{12}$:Ce, where $0 \leq s \leq 1$ and Re is at least one selected from Y, Ga and La. In addition, two or more fluorescent materials of different compositions represented by a general formula $(Re_{1-r}Sm_r)_3(Al_{1-s}Ga_s)_5O_{12}$:Ce, where $0 \leq r<1$ and $0 \leq s \leq 1$ and Re is at least one selected from Y and Gd may be used as the phosphor in order to control the emitted light to a desired wavelength.

The examples of phosphors described in U.S. Pat. No. 6,765,237 include phosphors that absorb UV light from about 380 to about 420 nm and emit visible light of different colors. For example, a phosphor blend may include a first phosphor comprising $BaMg_2Al_{16}O_{27}$:$Eu^{2+}$(BAM) and a second phosphor comprising $(Tb_{1-x-y}A_xRE_y)_3D_zO_{12}$(TAG), where A is a member selected from the group consisting of Y, La, Gd, and Sm; RE is a member selected from the group consisting of Ce, Pr, Nd, Sm, Eu, Gd, Dy, Ho, Er, Tm, Yb, and Lu; D is a member selected from the group consisting of Al, Ga, and In; x is in the range from 0 to about 0.5, y is in the range from about 0 to about 0.2, and z is in the range from about 4 to about 5. As another example, a phosphor blend may include a first phosphor comprising $Tb_3Al_{4.9}O_{12}$:Ce and a second phosphor selected from the group consisting of $BaMg_2Al_{16}O_{27}$:$Eu^{2+}$ (BAM) and $(Sr,Ba,Ca,Mg)_5(PO_4)_3Cl$:$Eu^{2+}$ The phosphors described in U.S. Patent Application Publication No. 2004/0227465 include various phosphor compositions as follows:

1. A rare earth element activated complex halide phosphor represented by the formula: $BaF_2.aBaX_2.bMgF_2.cBeF_2.dMe^{II}F_2$:eLn, where X is at least one halogen selected from the group consisting of chlorine, bromine and iodine; $Me^{II}$ is at least one divalent metal selected from the group consisting of: calcium and strontium; Ln is at least one rare earth element selected from the group consisting of: divalent europium ($Eu^{2+}$), cerium ($Ce^{3+}$) and terbium ($Tb^{3+}$), and a is in the range between 0.90 and 1.05, b is in the range of 0 to 1.2; c is in the range of between 0 and 1.2, and d is defined by the sum of c+d being in the range of between 0 and 1.2, and $BeF_2$ is present in an amount sufficient to effect a phosphor exhibiting a higher luminance than said phosphor absent $BeF_2$ when stimulated by light of a wavelength ranging from 450 to 800 nm after exposure to X-rays. See U.S. Pat. No. 4,512,911 for additional details.

2. A cerium activated rare earth halophosphate phosphor having the formula: $LnPO_4.aLnX_3$:$xCe^{3+}$ in which Ln is at least one rare earth element selected from the group consisting of Y, La, Gd and Lu; X is at least one halogen selected from the group consisting of F, Cl, Br and I; and a and x are numbers satisfying the conditions of $0.1<a<10.0$ and $0<x<0.2$, respectively and exhibiting a higher stimulated emission upon excitation with a He—Ne laser of a wavelength 632.8 nm after exposure to X-rays at 80 KVp, than the phosphor wherein a is less than 0.1. See U.S. Pat. No. 4,661,419 for additional details.

3. A mixed single-phase strontium and lanthanide oxide with a magnetolead type crystalline structure having the formula (I): $Sr_xLn1_{y1}Ln2_{y2}Ln3_{y3}M_zA_aB_bO_{19-k(I)}$ in which Ln1 represents at least one trivalent element selected from lanthanum, gadolinium and yttrium; Ln2 represents at least one trivalent element selected from neodymium, praseodymium, erbium, holmium and thulium; Ln3 represents an element selected from bivalent europium or trivalent cerium with retention of electric neutrality by virtue of oxygen holes; M represents at least one bivalent metal selected from magnesium, manganese, and zinc; A represents at least one trivalent metal selected from aluminum and gallium; B represents at least one trivalent transition metal selected from chromium and titanium; x, y1, y2, y3, z, a, b and k represent numbers so that $0<x<1$, $0<y1<1$, $0<y2<1$, $0<y3<1$, $0<z<1$, $10.5<a<12$, $0<b<0.5$ and $0<k<1$ provided that $0<x+y1+y2+y3<1$ and that $11<z+a+b<12$. See U.S. Pat. No. 5,140,604 for additional details.

4. A divalent europium activated alkaline earth metal halide phosphor having the formula: $M''X_2 \cdot aM''X'_2 \cdot bSiO:xEu^{2+}$ in which $M''$ is at least one alkaline earth metal selected from the group consisting of Ba, Sr and Ca; each of X and X' is at least one halogen selected from the group consisting of Cl, Br and I, and X is not the same as X'; a and x are numbers satisfying the conditions of $0.1<a<10.0$ and $0<x<0.2$, respectively; and b is a number satisfying the condition of $0<b<3 \times 10^{-2}$. See U.S. Pat. No. 5,198,679 for additional details.

5. A bright, short wavelength blue-violet phosphor for electro luminescent displays comprising an alkaline-based halide as a host material and a rare earth as a dopant. See U.S. Pat. No. 5,602,445. The host alkaline chloride can be chosen from the group II alkaline elements, particularly $SrCl_2$ or $CaCl_2$, which, with a europium or cerium rare earth dopant, electroluminesces at a peak wavelength of 404 and 367 nanometers respectively. The resulting emissions have CIE chromaticity coordinates which lie at the boundary of the visible range for the human eye thereby allowing a greater range of colors for full color flat panel electroluminescent displays.

6. An inorganic thin film electroluminescent device, comprising an inorganic light emission layer, a pair of electrodes and a pair of insulating layers, at least one of the electrodes being optically transparent, the light emission layer being positioned between the pair of insulating layers, each insulating layer being formed on an opposite side of the light emission layer, the pair of insulating layers being positioned between a light emission layer and the pair of electrodes, the light emission layer consisting essentially of inorganic material comprising a matrix of lanthanum fluoride doped with at least one member selected from the group consisting of: rare earth element metals and compounds thereof. See U.S. Pat. No. 5,648,181 for additional details.

7. A radiographic phosphor screen comprising a support and, coated on the support, at least one layer forming a luminescent portion and an overcoat layer, the luminescent portion and overcoat layer including a binder that is transparent to X-radiation and emitted light and said luminescent portion including phosphor particles in a weight ratio of phosphor particles to binder of 7:1 to 25:1. The phosphor comprises oxygen and a combination of species characterized by the relationship: $(Ba_{1-q}M_q)(Hf_{1-z-e}Zr_zMg_e):yT$ wherein M is selected from the group consisting of Ca and Sr and combinations thereof; T is Cu; q is from 0 to 0.15; z is from 0 to 1; e is from 0 to 0.10; z+e is from 0 to 1; an y is from $1\times10^{-6}$ to 0.02. See U.S. Pat. No. 5,698,857 for additional details.

8. A garnet fluorescent material comprising: 1) at least one element selected from the group consisting of Y, Lu, Se, La, Gd and Sm; and 2) at least one element selected from the group consisting of Al, Ga and In, and being activated with cerium. One example is cerium-doped yttrium aluminum garnet $Y_3Al_5O_{12}$:Ce (YAG:Ce) and its derivative phosphors. See U.S. Pat. No. 5,998,925 for additional details.

9. A wavelength-converting casting composition, for converting a wavelength of ultraviolet, blue or green light emitted by an electroluminescent component, comprising: a) a transparent epoxy casting resin; b) an inorganic luminous substance pigment powder dispersed in the transparent epoxy resin, the pigment powder comprising luminous substance pigments from a phosphorus group having the general formula: $A_3B_5X_{12}$:M, where A is an element selected from the group consisting of Y, Ca, Sr; B is an element selected from the group consisting of Al, Ga, Si; X is an element selected from the group consisting of O and S; and M is an element selected from the group consisting of Ce and Tb. The luminous substance pigments have grain sizes <20 μm and a mean grain diameter $d_{50}$<5 μm. See U.S. Pat. No. 6,066,861 for additional details.

10. Phosphors $Ba_2(Mg,Zn)Si_2O_7$:$Eu^{2+}$ and $(Ba_{1-x-y-z},Ca_x,Sr_y,Eu_z)_2(Mg_{1-w}Zn_w)Si_2O_7$, where X+Y+Z=1; Z>0; and 0.05<W<0.50 in some implementations. In other implementations, X+Y+Z=1; $0.01 \leq Z \leq 0.1$; and $0.1 \leq W<0.50$. X and Y can be zero or a non-zero number. Examples of UV-excitable phosphors for emitting green, red, and blue colors are $Ca_8Mg(SiO_4)_4Cl_2$:$Eu^{2+}$,$Mn^{2+}$; $Y_2O_3$:$Eu^{3+}$,$Bi^{3+}$; and $Ba_2(Sr,Ba,Ca)_5(PO_4)_3Cl$:$Eu^{2+}$(or $BaMg_2Al_{16}O_{27}$:$Eu^{2+}$); respectively. See U.S. Pat. No. 6,255,670 for additional details.

The U.S. Patent Application Publication No. 2004/0227465 also discloses phosphors represented by $Sr_xBa_yCa_zSiO_4$:$Eu^{2+}$ in which x, y, and z are each independently any value between 0 and 2, including 0 and 2. In some implementations, divalent Eu, which serves as an activator, is present in any amount between 0.0001% and about 5% in mole percent based on the total molar weight of said composition. Thus, the activator, Eu, may be present in any amount between 0.0001% and 5.00% in mole percent based on the total molar weight of the composition, including every thousandth percentage therebetween. In other implementations, the parameters x, y and z are $0.5 \leq x \leq 1.5$; $0 \leq y \leq 0.5$; and $0.5 \leq z \leq 1.5$ in the above formula. In yet other implementations, the parameters x, y and z are $1.5 \leq x \leq 2.5$; $0 \leq y \leq 0.5$; and $0 \leq z \leq 0.5$ in the above formula. The parameters x, y and z may also be $1.0 \leq x \leq 2.0$; $0 \leq y \leq 1.0$; and $0 \leq z \leq 0.5$ in the above formula.

The above phosphor $Sr_xBa_yCa_zSiO_4$:$Eu^{2+}$ may further include at least one additional element selected from the group consisting of: Ce, Mn, Ti, Pb, and Sn. In some implementations, such an additional element is present in the phosphor in any amount between 0.0001% and 5.00% in mole percent based upon the total molar weight of the phosphor.

The examples of phosphors described in U.S. Patent Application Publication No. 2005/0023962 include $ZnS_xSe_y$:Cu,A in which x and y are each independently any value between 0 and 1 and A is at least one of Ag, Al, Ce, Tb, Cl, I, Mg, Mn. The monovalent Cu, which serves as the main activator, may be present in any amount between 0.0001% and about 5% in mole percent based on the total molar weight of said composition. Thus, the activator, Cu, may be present in any amount between 0.0001% and 5.00% in mole percent based on the total molar weight of the composition, including every thousandth percentage therebetween. In some implementations, the parameters x, y and z are $0.5 \leq x \leq 1$ and $0 \leq y \leq 0.5$ in the above formula. In other implementations, the parameters x, y and z are $0 \leq x \leq 0.5$ and $0 \leq y \leq 0.5$ in the above formula. The parameters x, y and z may also be $0 \leq x \leq 0.5$ and $0.5 \leq y \leq 1.0$ in the above formula.

The examples of phosphors described in U.S. Patent Application Publication No. 2005/023963 include thioselenide and/or selenide-based fluorescent materials which are capable of absorbing with high efficiency blue, violet, or ultraviolet (UV) light and emitting light of a wavelength longer than that absorbed from the light source. Such phosphor materials may be manufactured to emit broad color spectra that can be tuned from blue to green to yellow and red emissions. Two or more phosphors may be mixed in order to achieve a specific, desired white color performance. One example is $MA_2(S_xSe_y)_4$:B in which x and y are each independently any value between about 0.01 and about 1; M is at least one of Be, Mg, Ca, Sr, Ba, Zn; and A is at least one of Al, Ga, In, Y, La, and Gd; and the activator B is at least one of Eu, Ce, Cu, Ag, Al, Tb, Cl, F, Br, I, Pr, Na, K, Mg, and Mn. The divalent Eu, which can serve as the main activator, may be present in any amount between 0.0001% and about 10% in mole percent based on the total molar weight of said composition. Thus, the activator, Eu, may be present in any amount between 0.0001% and 10.00% in mole percent based on the total molar weight of the composition, including every thousandth percentage therebetween. In some implementations, the parameters x, y, and z are $0.5 \leq x \leq 1$ and $0 \leq y \leq 0.5$ in the above formula. In other implementations, the parameter x, y and z are $0 \leq x \leq 0.5$ and $0.5 \leq y \leq 1.0$ in the above formula. In yet other implementations, x is about 0 and y is about 1 in the above formula, or x is about 1 and y is about 0 in the above formula.

Another example is $M_2A_4(S_xSe_y)_7$:B in which x and y are each independently any value between about 0.01 and about 1, M is at least one of Be, Mg, Ca, Sr, Ba, Zn; and A is at least one of Al, Ga, In, Y, La, and Gd; and B is at least one of Eu, Ce, Cu, Ag, Al, Tb, Cl, Br, F, I, Pr, K, Na, Mg, and Mn. The divalent Eu, which can serve as the main activator, may be present in any amount between 0.0001% and about 10% in mole percent based on the total molar weight of said composition. Thus, the activator, Eu, may be present in any amount between 0.0001% and 10.00% in mole percent based on the total molar weight of the composition, including every thousandth percentage there between. In some implementations, the parameters x and y are $0.5 \leq x \leq 1$ and $0 \leq y \leq 0.5$ in the above formula. In other implementations, the parameters x and y are $0 \leq x \leq 0.5$ and $0 \leq y \leq 0.5$ in the above formula. In yet other implementations, x is about 1 and y is about 0 in the above formula, or x is about 0 and y=1 in the above formula, or $0 \leq x \leq 0.5$ and $0.5 \leq y \leq 1.0$ in the above formula, or x is about 0.75 and y is about 0.25 in the above formula.

Yet another example described in U.S. Patent Application Publication No. 2005/023963 is $(M1)_m(M2)_nA_2(S_xSe_y)_4$:B in which: M1 comprises an element selected from the group consisting of: Be, Mg, Ca, Sr, Ba, Zn; M2 comprises an element selected from the group consisting of: Be, Mg, Ca, Sr, Ba, Zn; A comprises one or more elements selected from the group consisting of: Al, Ga, In, Y, La, and Gd; and B comprises one or more elements selected from the group consisting of: Eu, Ce, Cu, Ag, Al, Tb, Cl, Br, F, I, Mg, Pr, K, Na, and Mn. B may be present in any amount between 0.0001% and about 10% in mole percent based on the total molar weight of said composition, and wherein x and y are each independently any value between 0 and 1, subject to the provisos that the sum of x and y is equal to any number in the range of between about 0.75 and about 1.25, the sum of m and n is about 1, and M1 is different than M2. In some implementations, the parameters x and y are $0.5 \leq x \leq 1$ and $0 \leq y \leq 0.5$ in the above formula. In other implementations, the parameters x and y are $0 \leq x \leq 0.5$ and $0 \leq y \leq 0.5$, or $0 \leq x \leq 0.5$ and $0.5 \leq y \leq 1.0$, or x is about 0.75 and y is about 0.25, or x is about 0 and y is about 1, or x is about 1 and y is about 0 in the above formula.

Yet another example described in U.S. Patent Application Publication No. 2005/023963 is: $(M1)_m(M2)_nA_4(S_xSe_y)_7$:B in which M1 comprises an element selected from the group consisting of: Be, Mg, Ca, Sr, Ba, Zn; M2 comprises an element selected from the group consisting of: Be, Mg, Ca, Sr, Ba, Zn; A comprises one or more elements selected from the group consisting of: Al, Ga, In, Y, La, and Gd; and B comprises one or more elements selected from the group consisting of: Eu, Ce, Cu, Ag, Al, Th, Cl, Br, F, I, Mg, Pr, K, Na, and Mn. B may be present in any amount between 0.0001% and about 10% in mole percent based on the total molar weight of said composition, and wherein x and y are each independently any value between 0 and 1, subject to the provisos that the sum of x and y is equal to any number in the range of between about 0.75 and about 1.25, the sum of m and n is about 2, and M1 is different than M2. In some implementations, the parameters x and y are $0.5 \leq x \leq 1$ and $0 \leq y \leq 0.5$ in the above formula. In other implementations, the parameters are $0 \leq x \leq 0.5$ and $0 \leq y \leq 0.5$, or $0 \leq x \leq 0.5$ and $0.5 \leq y \leq 1.0$, or x is about 0.75 and y is about 0.25, or x is about 0 and y is about 1, or x is about 1 and y is about 0 in the above formula.

In the above examples, the color generation is based on mixing of three primary colors of red, green, and blue. The described devices, systems, and techniques, however, may use mixing of four or more colors to generate the desired colors. For example, four different colors may be used. Accordingly, the screens shown in FIGS. 1 and 2 use four different color phosphor stripes and each color pixel includes four sub color pixels. The display systems in FIGS. 23-25 under this 4-color scheme can use four monochromatic laser display modules in four different colors to produce the final color images on the common display screen.

A phosphor screen, which may be used as either a projection screen as shown in FIGS. 23-26B or a final viewing screen as shown in FIGS. 1-5, 14, 20A, 20B, 21A and 21B, may be fabricated by various techniques. Examples of fabrication techniques include, among others, the following: ink-jet printing, painting, gravity settling, settling with compression, slurry, slurry with segregation, dusting, photo-tacky dusting, thin screen evaporation and sputtering, screen printing, pressed printing, pulsed laser deposition, centrifugal deposition, electrophoretic deposition, spraying, electrostatic dusting, tape transfer, reactive deposition, reactive evaporation, RF sputtering with ion implantation of activators, metal organic chemical vapor deposition (MOCVD), and atomic layer epitaxy.

1. Painting

The painting techniques apply luminescent paints on a substrate, such as fluorescent, phosphorescent and self-luminous painting materials. Paints can be organic or inorganic in nature and are used with a vehicle such as lacquers or oils. Paints can be applied with a brush, roller or a spraying device. Stencils may be used to obtain detailed spatial patterns. Paints can also be applied via off-set printing methods. These fluorescence and phosphorescent paints can be excited via IR, visible or UV radiation. In the self luminous paints the source of the excitation is a radioactive material (ex. Radium) mixed with the paint.

2. Settling by Gravity

Settling is a well known method and is documented in the literature. See, e.g., Pringsheim & Vogel, Luminescence of Liquids and Solids, Interscience Publishers, 1946, NY, pp 144& 145; Hopkinson R. G., An Examination of Cathode Ray tube characteristics, Journal of the Institute of Electrical Engineers, Vol. 13, Part IIIa, No. 5 1946, pp. 779-794; Donofrio & Rehkopf, Screen Weight Optimization, Journal of the Electrochemical Society, Vol. 126, No. 9, September 1979, pp. 1563-1567; and Technical Information Booklet CM-9045, Method of Settling Phosphor Slides, GTE Sylvania, 3/82. For example, settling of phosphor slides may be achieved with a mixture of phosphor, a 1% barium acetate solution (in water), PS-6 potassium silicate and deionized water in a settling chamber. One recipe is to add 34 ml of the 1% barium acetate to the settling chamber. N. Yocom in the 1996 SID Seminar on Phosphor Screening discussed nine steps for settling and aluminizing a phosphor screen which are 1. settle phosphor on a face plate, 2. a liquid cushion is decanted and siphoned off, 3. dry the settled screen, 4. bake the screen, 5. rewet the screen, 6. apply a filming material on top of water, 7. remove water, 8. evacuate and evaporate the aluminum layer, 9. bake the screen.

3. Slurry

The slurry methods use a phosphor-containing slurry to form a phosphor layer over a screen surface. See, e.g., Tatayama, Yamazaki, Kato & Tashima, European Patent Application #86302192.9, filed Mar. 25, 1986 by Sony. One of his recipes is to use 100 g of phosphor, 0.6 g of Aerosil, with 5 g of PVA and 0.5 g of ADC (ammonium dichromate) and 100 g of water to form the slurry. This slurry is then deposited near the center of the face of a CRT screen panel and the panel is rotated and tilted to spread the slurry over the inside of the face plate. A cascaded slurry system may be used an aging effect where the silicate concentration is set to be higher on the glass substrate side than that on the electron gun side.

4. Dusting

Various dusting methods are known for forming phosphor screens. Hopkinson R. G. in "An Examination of Cathode Ray tube characteristics," Journal of the Institute of Electrical Engineers, Vol. 13, Part IIIa, No. 5 1946, pp. 779-794 describes a dusting method where the phosphor is sprayed into a wet or dry binder. In another implementation, dusting can be done by allowing the phosphor to fall on or to be projected on a prepared surface. In yet another implementation of the dusting approach, the phosphor material may be agitated through a sieve or muslin gauze upon the screen plate coated with a suitable binder such as sodium silicate. The U.S. Pat. No. 3,025,161 entitled "Method of Forming Patterns" and issued Mar. 13, 1962 discloses a dusting method where the phosphor is dusted more vigorously via a dry powder spray system onto a wet photo-resist prior to exposure. In addition, phosphors are dusted on photo-tacky, coated dry surface and are exposed UV to allow the coating to become tacky. This tacky nature of the surface coating causes the phosphor in the exposed areas to be attached to the surface. See, Nonogaki, Tomita, Nishizawa, Akagi & Kohasji, "Dry Process for Phosphor Screen Fabrication of Multicolored Cathode Ray Tubes," Research & Development in Japan, 1984, pp. 50-55.

5. Settling with Compression

Phosphor screens can also be made by settling the phosphors with compression. See, e.g., Oki K. & Ozawa L., A phosphor screen for high-resolution CRTs, Journal of the SID, Vol. 3, No. 2, September 1995, pp. 51-57 which describes settling with normal sedimentation techniques and a use of a mechanical press machine to reduce the voids in the screen for high resolution uses.

6. Thin Film Screens Evaporation or Sputtering

High resolution screens can be made by evaporating or sputtering the phosphor on the substrate. For example, magnetron sputtering of $ZnGa_2O_4$ onto $BaTiO_3$ ceramic sheets have been used in thin film Electro-luminescent devices. Vacuum evaporation methods have been used to deposit a thin layer of phosphor on a substrate such as a SrS:Ce, Cl, Ag, Mn layer.

7. Screen Printing

Phosphor screens can also be made by screen printing techniques. In some implementations, a tight but spring-like cloth or metal mesh is used with areas blocked by a lacquer and aligned above a substrate to be coated. The slurry mix is then mechanically pressed through the selected areas of the mesh on to the substrate and the mesh springs back to its original position after the phosphor paste is applied. By photographic printing of patterns on a mesh, very fine patterns can be screen printed. In 1992 Morikawa et al discussed a method to achieve a smoother and better aging screen using a printing method plus screen compression. This compression method allows the manufacturer to achieve higher packing densities. See, Morikawa, Seko, Kamogawa & Shimojo, Study to Improve Flood Beam CRT for Giant Screen Display, Japan Display '92, pp 385-388.

8. Pulsed Laser Deposition

Laser pulses can be directed to target materials and deposit the target materials on a screen. Greer et al in 1994 reported a Pulsed Laser Deposition (PLD) of phosphor screens used in helmet mounted displays (HMD). See, Greer, J. A. et al., P-53 Thin Film Phosphors Prepared by Pulsed—Laser Deposition, SID 94 Digest, pp. 827-830. A rastered laser with a wavelength of 248 nm was used to scan targets of Yttrium Aluminum Gallium Garnet phosphors and to deposit these materials on to sapphire substrates by ablation. A screen growth rate of one micron per hour and screens of a thickness up to 8 microns were reported.

9. Centrifugal Deposition

A phosphor suspension in a solution can be deposited on a screen by using a centrifugal action. See, e.g., Mezner, L. Z., Zumer, M., Nemanic, V., Centrifugal Settling of High Resolution 1-in CRT Screens, SID Digest 1994, pp 520-522. CRT screens have been made by this method where a stable phosphor suspension is made with a fine grain (less than 5 micron particle size) phosphor, a binder, electrolyte and in some cases a dispersing agent. In some implementations, the settling in the centrifuge may be set at 3000 rpm for 2 minutes to 4000 rpm for 3 minutes. Screens of optimum screen weight of about 0.6 $mg/cm^2$ for 5 KV electrons was found using P20 phosphor with an average particle size of 1.9 microns. In a publication entitled "Preparation of P43 Suspension and Screen-Quality Evaluation in CRTs" (SID '97 vol 28, pp 440-443), it is reported that a suspension containing (1.8 micron) P43 phosphor, Barium Acetate, Potassium silicate and a surfactant was used in a centrifugal deposition process to achieve good electron aging with a screen weight of 1.0 $mg/cm^2$ at a screen thickness of approximately five particle diameters and an anode voltage of 5 KV.

10. Electrophoretic and Cataphoretic Coating

Electrophoretic or Cataphoretic phosphor coatings can be used to make high resolution phosphor screens. Schesinger described an electrophoretic coating process where a conductive coated glass face plate is put in a solution of a phosphor and electrolyte and a metallic anode (situated about two inches from the face plate). Sclesinger et al., Design Development and Fabrication of Ultra High-Resolution Cathode Ray tube. Technical Report ECOM-00476-February 1969, pp 64-72. When a DC electric current of 20 ma is passed through the solution the phosphor screen is deposited on the cathode. In May 1997, Schermerhorn, Sweeney & Wang from Electro Plasma and Park, Park and Kim from Samsung discussed the use of electrophoretic deposition of color phosphors for Plasma Display screens through the use of metalized recessed regions or cavities. J. M. Kim et al. Development of 4-in. Full Color FED, Devices SID97 Digest, pp 56-59; J. D. Schemerhorn et al. A Groved Structure for a Large High, Resolution Color ACPDP SID97 Digest, pp 229-232.

11. Spraying

Wet or dry phosphors can be sprayed on a substrate to form a phosphor screen. The nozzle of the spray gun can be changed to spray at various spray, angles depending on the distance from the substrate and other constraints. A pressure pot is used as in various spray systems to keep the pressure constant to the spray gun. In the dry system, the dry phosphor is sprayed on the screen face whose surface is coated with an adhesive binder. wet binders and dry binders can be used. In wet spraying, an organic binder such as nitrocellulose or PVA may be used. A binder which becomes tacky under UV radiation bombardment may also be used.

11. Electrostatic Spray/Dust

Phosphor screens can also be made by using a phosphor spray or dusting process in which the phosphor is charged and blown against a charged screen surface. The phosphors are then fixed to allow further processing. The U.S. Pat. No. 5,477,285 entitled "CRT developing apparatus" and issued Dec. 19, 1995 describes a process where a tribo-electric gun is used to charge the phosphor, and the phosphor is fed to the panel using a hopper, an auger to transfer the material from the hopper to the venturi chamber. The venturi chamber dispenses the charged phosphor to the latent image on the panel.

12. Transfer Tape

In a transfer tape method, the phosphor is coated on a tape base with a layer to contain phosphor. Under the phosphor layer is a release layer and the phosphor and binder are pressed onto a substrate. The base tape is removed leaving the phosphor and binder. See, N. Yocom—1996 SID Seminar on Phosphor Screening.

13. Reactive Deposition

Vapor reaction processes can be used for fabricating phosphor layers such as ZnS phosphor layers. See, e.g., D. A. Cusano, Cathodo-, Photo-, and D.C-, Electro-luminescence in Zinc Sulfide Layers. Luminescence of Organic and Inorganic Materials Edited by Kallman & Spruch Wiley & Sons 1962, pp 494-522. The substrate to be coated can be heated to temperatures from 400-700 deg C. For example, in making the phosphor screen based on ZnS:Mn, materials Zn, $ZnCl_2$, $MnCl_2, H_2S$ are continuously present during the formation of the phosphor layer. This process can also be used for fabricating electroluminescent screens.

14. Reactive Evaporation

Reactive evaporation methods have been reported for making screens. Transparent thin films of $Y_2O_2S$:Eu have been formed by a reactive evaporation process where the Yttrium metal is evaporated onto a substrate using an electron beam gun and excited $SO_2$ is introduced while simultaneously heating a crucible of $EuCl_2$ powder. Daud, Futaki, Ohmi, Tanaki & Kobayashi, Transparent $Y_2O_2O_2S$:Eu 3+ phosphor thin films grown by reactive evaporation and their luminescent properties, Journal of the Society for Information Display (SID), Vol 4, No 3 1996, pp 193-196.

15. RF Sputtering and Ion Implantation

In RF sputtering and ion implantation for forming phosphor screens, the activator ion is implanted. In N. M. Kalkhoran et al., Luminescence Study of Ion-Implanted, $ZnGa_2O_4$ Thin Films on Flexible Organic Substrates, SID '97 Digest, pp 623-626, RF sputtering was used to form thin film electroluminescent screens where $ZnGa_2O_4$ thin films were implanted on a flexible polyimide substrate with Mn, Eu to get green and red phosphor screens. The un-doped host material was used for the blue screen.

16. Metal Organic Chemical Vapor Deposition

Metal Organic Chemical Vapor Deposition (MOCVD) can be used to fabricate phosphor screens. As an example, a MOCVD process for fabricatingscreens with the $CaGa_2S_4$:Ce phosphor was reported by Smith et. Al., in "Crystalline-As-Deposited CaGa2S4:Ce via Low Temperature Metal Organic Chemical Vapor Deposition":SID Digest 1995, Vol. XXVI pp 728-731. Calcium metal-organics were used in the form of $Ca(2,2,6,6-tetramethyl-3,5-heptanedionate)_2$ called $Ca(thd)_2$. The CaS was deposited using Ca(thd)2 in an argon carrier gas and $H_2S$. with reactor pressures from 1 to 10 Torr. Substrates were glass, silicon and coated EL substrates at temperatures from 400-600 deg C. The $Ga_2S_3$ and CaS formation was combined with the use of $Ce(thd)_4$ to obtain the $CaGa_2S_4$:Ce phosphor.

17. Atomic Layer Epitaxy

Atomic layer epitaxy has been used to form luminescent screens for alternating current thin film electroluminescent displays. See, Lindsay McDonald and Anthony Lowe, Display Systems, Publisher John Wiley & Sons 1997 pp. 195 & 196. A substrate was heated to a high temperature (500° C.)and was exposed to low pressure chemical precursors for forming the screen layers. As an example, Zn and Mn can be used as part of the precursors for forming a ZnS:Mn layer. The reactor is evacuated and Sulfur is introduced. The epitaxy cycle is then started to form the layers.

The phosphor materials used for screens described in this application may be prepared as phosphor nanoscale powders where in the phosphor materials are nanoscale particles or grains of 500 nm or less to produce enhanced optical conversion efficiency. Such phosphor nanoscale powders may be prepared by forming a solution or slurry which comprises phosphor precursors and then firing the solid residue of the solution or slurry which comprises the phosphor precursors. The phosphor precursors in the form of nano-sized particles or grains have a dimension less than 500 nm, preferably 200 nm or less, more preferably 100 nm or less, even more preferably 50 nm or less, and most preferably 10 nm or less. Thus, the nano-sized particles may have an average particle size of in the range from 1 nm to 500 nm, preferably 2 nm to 200 nm, more preferably 2 nm to 100 nm, even more preferably 2 nm to 50 nm, most preferably 3 nm to 10 nm. The nano-sized particles of the precursor will also preferably have a uniform size distribution with a variation within a range, e.g., 10% or less. U.S. Pat. No. 6,576,156, which is incorporated by reference in its entirety as part of this application, describes examples of phosphor nanoscale powders and fabrication techniques. In one implementation, phosphor nanoscale powders may be prepared by (1) forming a solution or slurry which contains nanosized particles of the phosphor precursors, (2) drying the solution or slurry to obtain a residue; and (3) firing the residue to form a phosphor nanoscale powder.

A screen suitable for use in the devices of this application may include one or more fluorescent materials to form a fluorescent layer sandwiched between two dichroic layers D1 and D2 to receive excitation laser light through the first dichroic layer D1 and the emitted colored light from the fluorescent layer exits the screen via the second dichroic layer D2. The first dichroic layer D1 transmits the excitation laser light, e.g., UV light, and reflects visible light. The second dichroic layer D2 is complementary to the layer D1: transmits visible light and reflects the excitation laser light, e.g., UV light. This screen design with the two dichroic layers D1 and D2 can effectively confine the excitation light such as UV light in the fluorescent layer and allows the emitted visible light, which originally tends to be in all directions, to be directed towards the other side the screen to be viewed by a viewer.

FIGS. 27A and 27B illustrate two examples based on the above screen design. A substrate can be provided to support the dichroic layers D1, D2 and the fluorescent layer. FIG. 27A shows an example in a surface incident configuration where the substrate is on the side of the D2 layer and the emitted light exits the screen through the substrate. This configuration provides better transmission properties for UV light, a minimum back reflection into the laser, and allows the substrate side to act as a shield from user interface side. FIG. 27B shows an example in a substrate incident configuration where the substrate is on the side of the D1 layer and the incident excitation laser light enters the screen through the substrate. In one example, the UV laser light may be at around 405 nm. The D1 layer reflects visible light with a wavelength greater than 430 nm and transmits UV light with a wavelength shorter than 415 nm or even less than 400 nm. In this example, the D2 layer reflects UV light with a wavelength shorter than 415 nm or even less than 400 nm and transmits visible light with a wavelength greater than 430 nm. Anti-reflection (AR) coatings may be used to further enhance the efficiency of the screen. The substrate incident configuration allows the substrate to be treated to form an optical diffractive or "power" element (e.g., a Fresnel lens), and provides better transmission of color light (although another hard surface maybe needed on user side for protection).

In FIGS. 27A and 27B, a black matrix may be formed in the phosphor layer to improve the contrast and reduces the "smearing" of adjacent pixels. The phosphor area may be surrounded by an absorptive or reflective wall in order to confine the light from spreading into neighboring pixels. Such pixelation can be accomplished by spin coating a photo resist on the substrate and etch away the desired sub-pixel geometry which is filled via screen printing by the corresponding phosphor. The black matrix can be implemented in vertical only shape or square shaped (i.e. both vertical and horizontal lines).

The excitation laser light in the above described systems, such as a laser vector scanner display and a laser video display, may enter the fluorescent layer of the screen at an angle due to the scanning action of a beam scanning module to scan the beam across the screen. This incident angle varies with the entry position of the laser light. The direction of the laser light should be as close to the normal direction to the fluorescent layer as possible to improve the image quality. Hence, an optical mechanism may be implemented at the entry to the screen to direct the incident laser beam to be normal or approximately normal to the screen. One exemplary way to implement this optical mechanism is to use a Fresnel lens, which is constructed as a layer of the screen, to make the incident laser light approximately normal to the screen.

Figure 28:
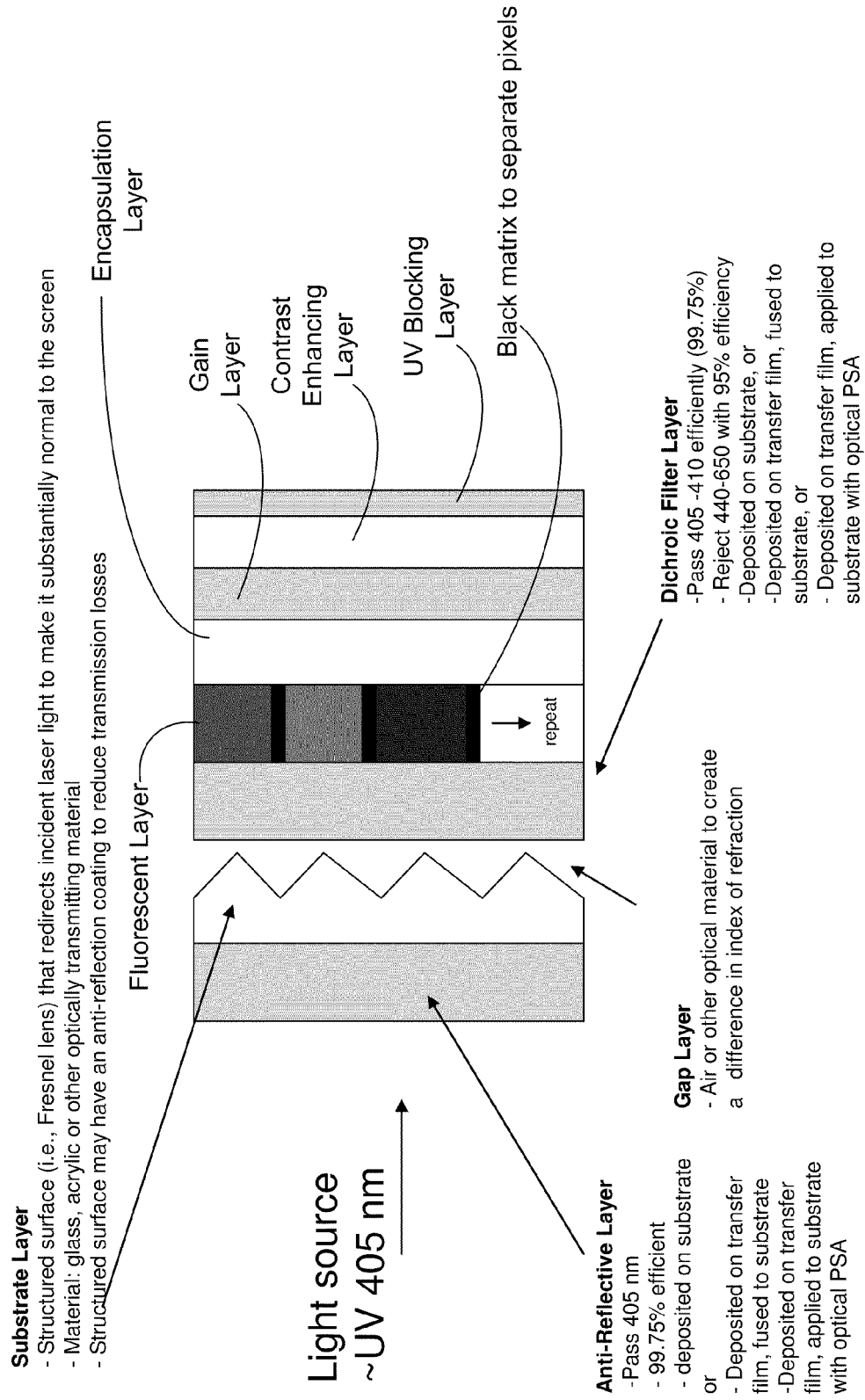

FIG. 28 shows an example of a screen with a Fresnel lens layer formed in the entry side of the fluorescent layer of the screen. Other layers may also be formed in the screen, such as an anti-reflection layer at the entrance surface of the screen for receiving the excitation laser light, and a dichroic filter layer D1 on the laser-entry side of the fluorescent layer. In addition, an encapsulation layer, a gain layer, a contrast enhancing layer, and a second dichroic layer D2 (a UV blocker) may also be used.

Figure 29:
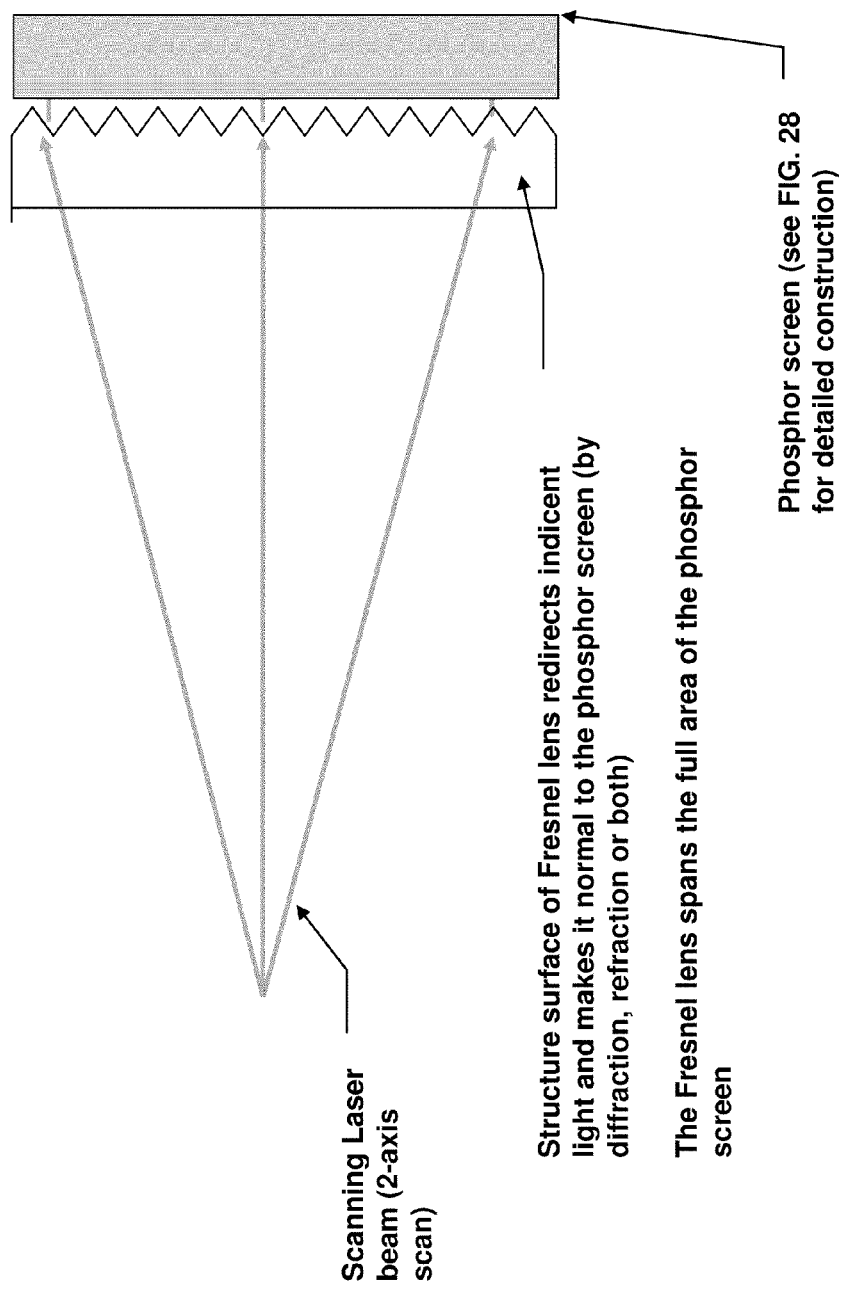

FIG. 29 illustrates the operation of the Fresnel lens layer in FIG. 28. The Fresnel lens has Fresnel rings and can be configured to redirect the incident laser light via optical diffraction, refraction or both. The Fresnel lens can be in a telecentric configuration for the incident scanning laser light. Since the Fresnel lens is to redirect the incident laser light at any

TABLE 2

| CONSTRUCTION TYPE | 1st Surface | 2nd Surface | 3$^{rd}$ Surface | 4$^{th}$ Surface | 5th Surface | 6$^{th}$ Surface |
|---|---|---|---|---|---|---|
| Surface Incident | D1 | Phosphor | D2 | S | AR | |
| Surface Incident | L | D1 | Phosphor | D2 | S | AR |
| Substrate Incident | AR | S | D1 | Phosphor | D2 | L |
| Substrate Incident | AR | S | D1 | Phosphor | D2 | AR |

TABLE 2 shows the examples of 6-layer screens where S represents the substrate, one or more phosphors are used to form the fluorescent layer and a lacquer layer (L) or other capsulation layer is used to protect the overall screen structure from handling and environmental conditions. The substrate may be made out of plastic or glass and is capable of transmitting light in the spectral range of, e.g., 400-800 nm.

Figure 27C:
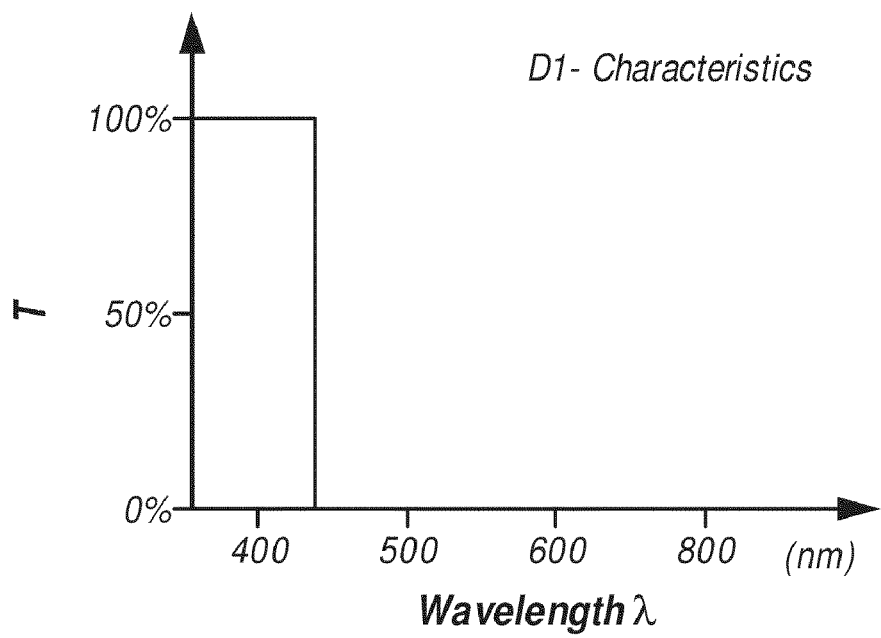
FIGS. 27A through 31 show examples of screen designs and structures with dichroic layers on two opposite sides of the phosphor layer to enhance the optical efficiency of the screens.
Figure 27D:
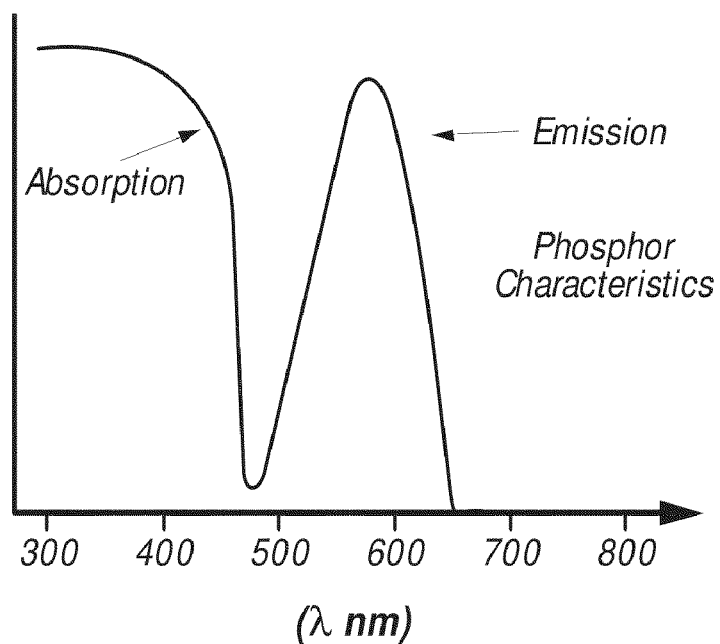
Figure 27E:
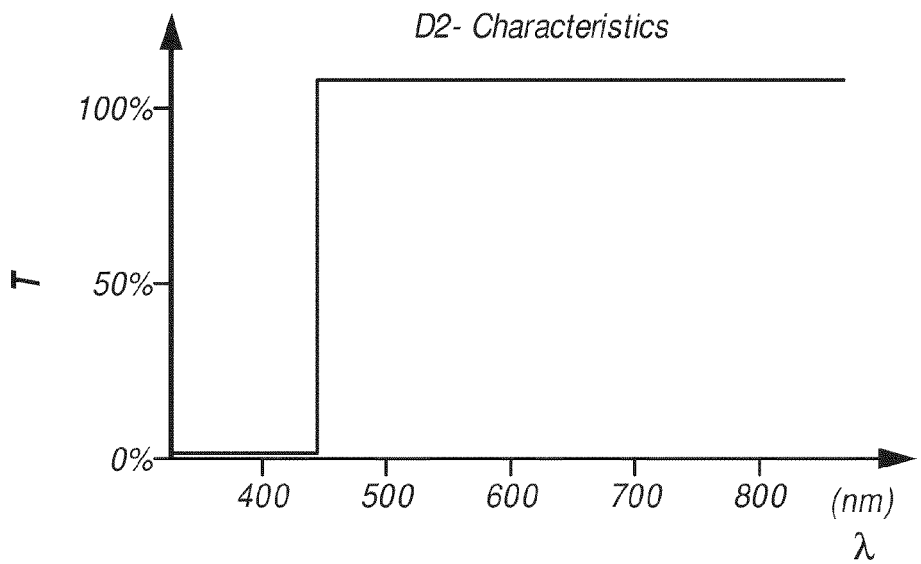
Figure 27F:
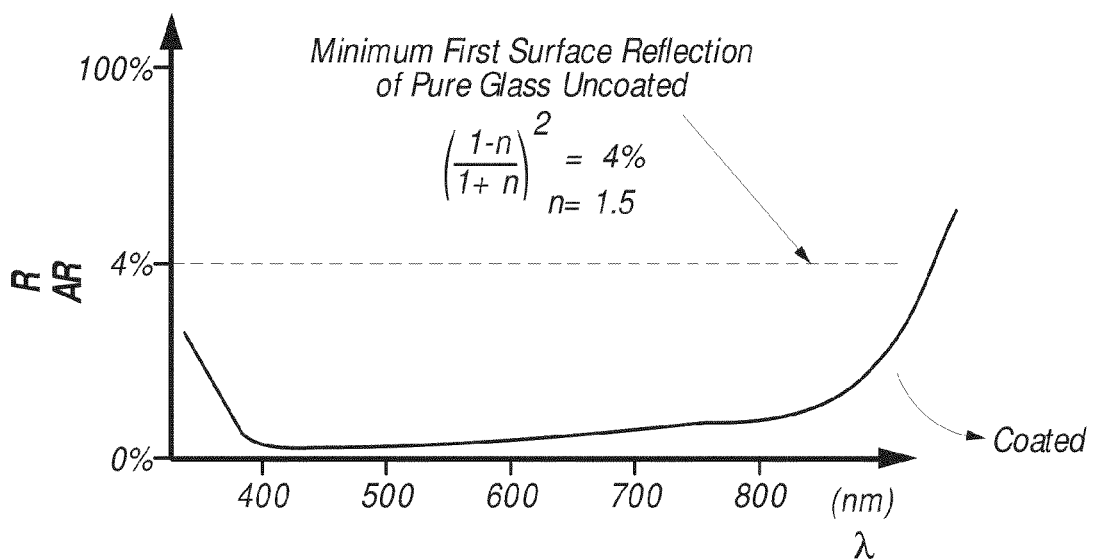

FIG. 27C shows an exemplary transmission spectrum of the D1 layer. FIG. 27D shows the absorption and emission spectra of a phosphor which can be used as part of the fluorescent layer. The phosphor layer may be a striped phosphor capable of fluorescing when excited by a violet or UV-source. FIG. 27E shows the transmission spectrum of the layer D2. FIG. 27F further shows the reflective spectrum of the AR coating capable of improving the transmission of light between 400-800 nm.

entry angle to be approximately normal to the screen, the Fresnel lens can be placed at different layer positions on the laser-entry side of the fluorescent layer of the screen.

Figure 30:
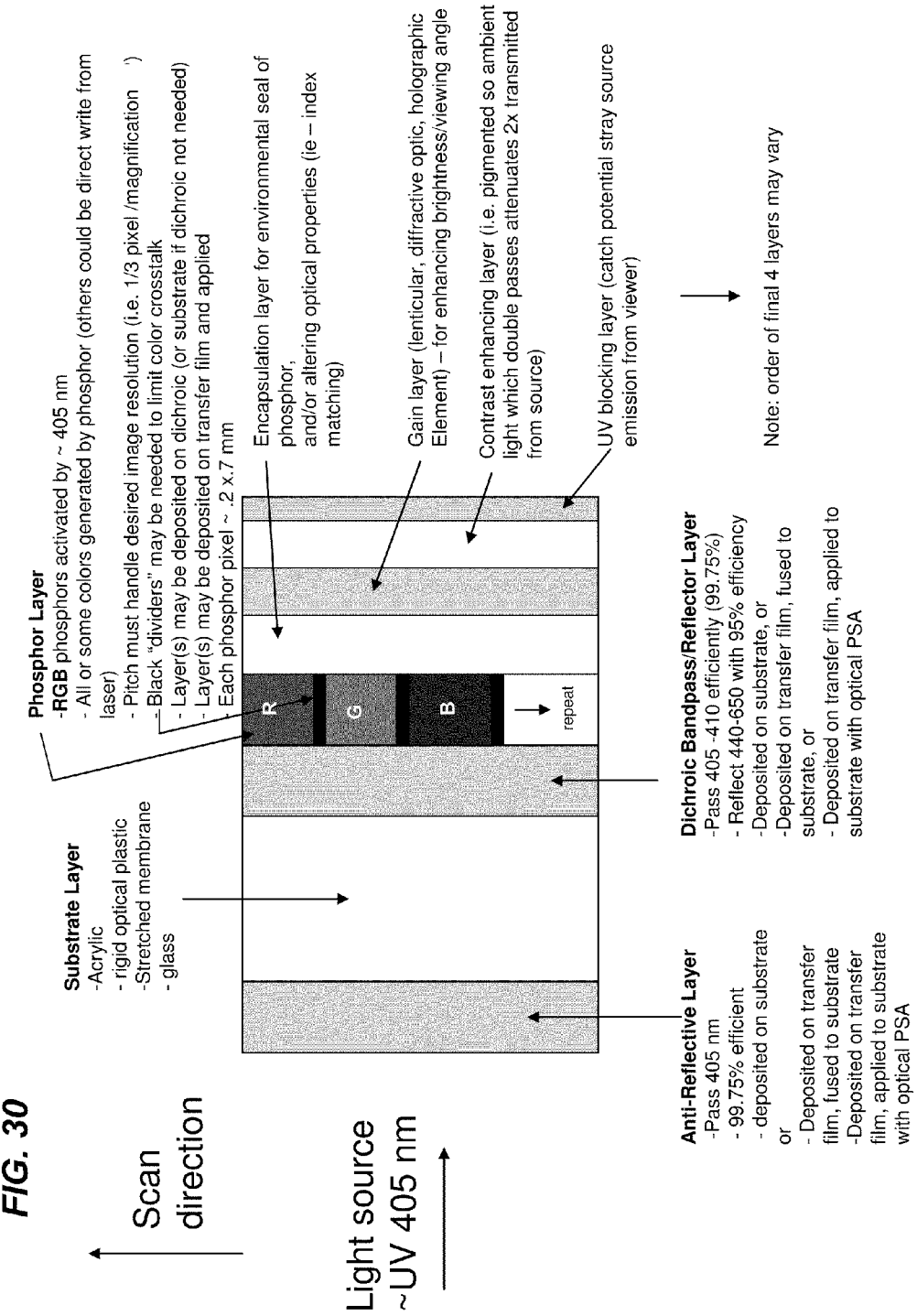

FIG. 30 shows an example of a screen based on the design in FIG. 28 with additional details on the various layers such as the black matrix layer with "black" dividers between different phosphor sub pixels to reduce the color mixing or cross talk, a gain layer for enhancing the brightness and increasing the viewing angle, and a contrast enhancing layer to reduce the reflection of the ambient light to the viewer. The "black" dividers between different fluorescent regions are used to in part to separate mixing of adjacent fluorescent regions and may be implemented in various configurations. In one example, the dividers may be optically reflective to reflect emitted colored light at large angles within a fluorescent region and therefore such dividers can act as a "light pipe" to improve directionality of each emitting fluorescent region. The dividers may also be optically absorbent to absorb the emitted colored light at large angles.

Figure 31:
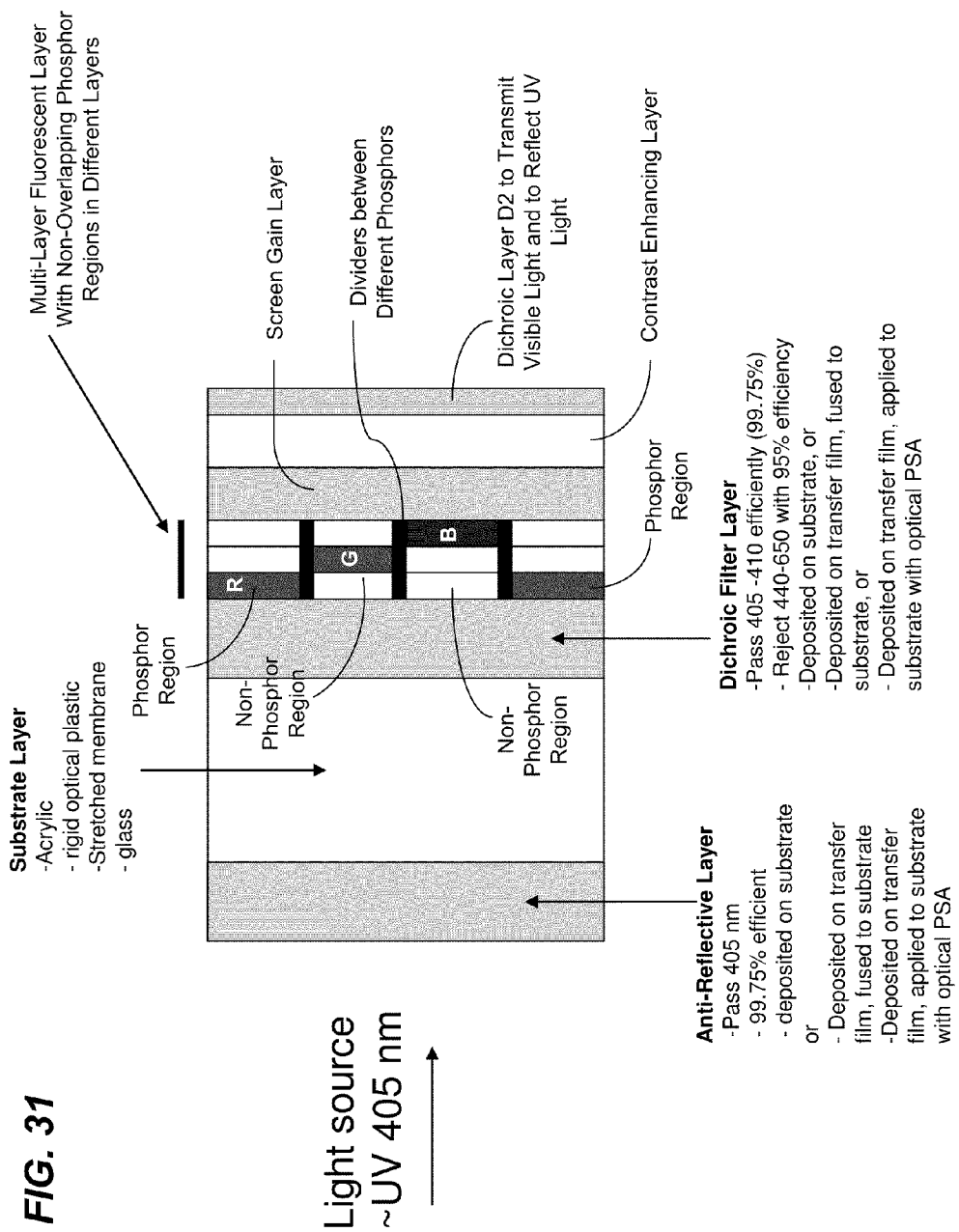

FIG. 31 further shows an example of a screen with two dichroic layers in which different phosphors for different colors are formed at different layers and do not overlap with one another. This design of the phosphor layers allows different phosphor layers to be individually fabricated and laminated together by, e.g., using a suitable optical adhesive or an optical pressure-sensitive film. The dividers for reducing color crosstalk may be physically printed with color phosphors, or contained in separate layers.

Figure 32:
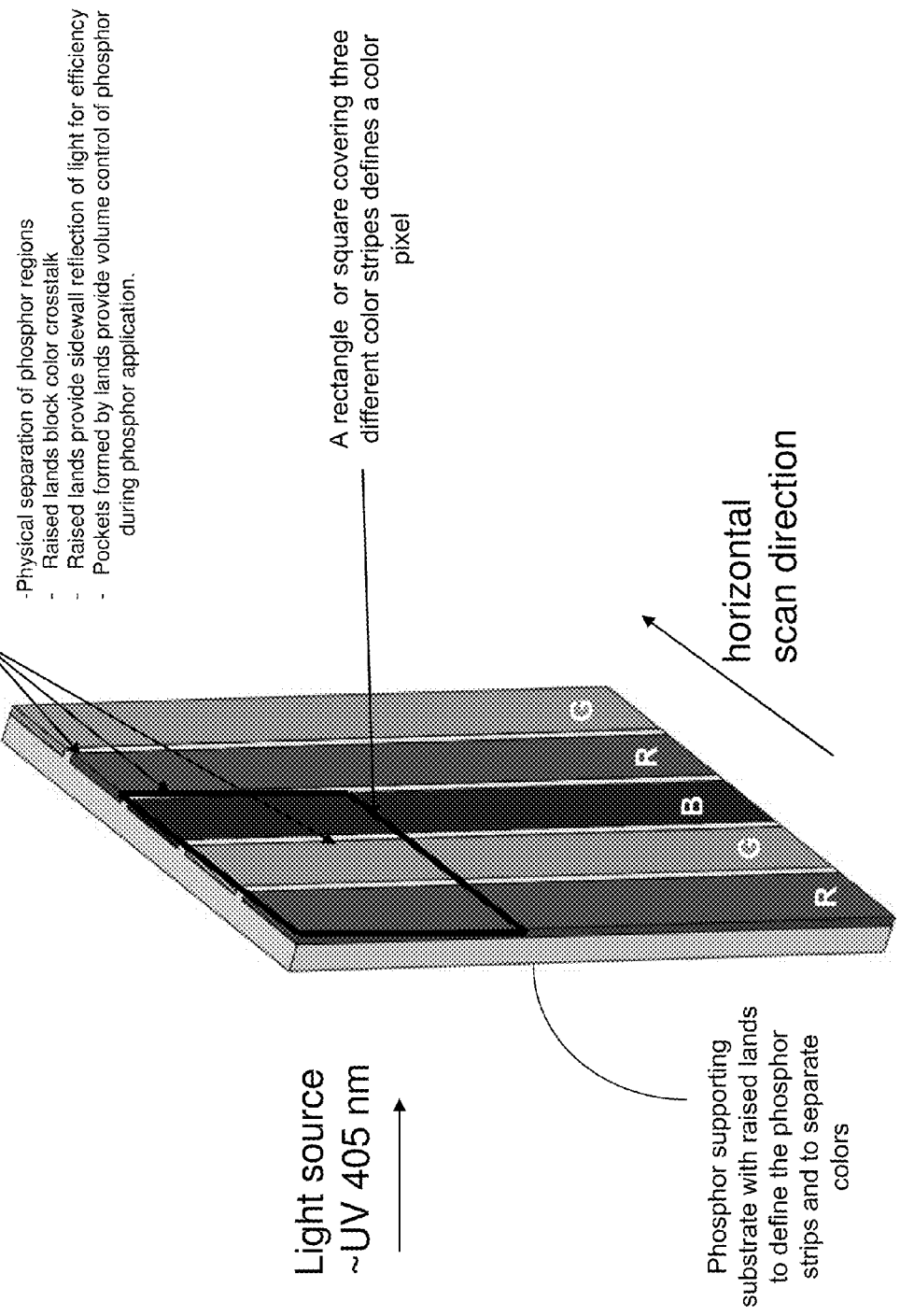
FIG. 32 shows phosphor dividers in the phosphor layer to optically separate different phosphors for different colors.

FIG. 32 shows sidewall reflector stripes formed between different phosphor stripes to physically separate the different phosphor stripes so that light of different colors emitted by different phosphors can be optically separated to reduce color mixing or cross talk.

Each of the above dichroic layers used in the screens may be implemented in various configurations. For large format displays, it may be desirable that such a dichroic layer be made of relatively inexpensive materials and be relatively easy to manufacture. Multiple dielectric layers can be designed to construct various wavelength-selective optical filters by controlling the refractive indices and the physical thickness values of the layers. For example, multiple layers of alternating high and low index dielectric layers may be designed to achieve desired wavelength-selective reflection and transmission spectra. In implementations, two different multi-layer sheet materials may be used as the D1 and D2 dichroic layers for the UV-phosphor color screens described in this application, e.g., the designs in FIGS. 27A through 32.

More specifically, multiple sheets of films with different refractive indices may be laminated or fused together to contruct a composite sheet as the D1 or D2 dichroic layer. In some implementations, multiple layers of two different materials with different indices may be used to form a composite film stack as D1 or D2 by placing the two materials in an alternating manner. In other implementations, three or more different materials with different indices may be stacked together to form the composite film stack as D1 or D2. Such a composite sheet for the D1 layer is essentially an optical interference reflector that transmits the excitation light (e.g., UV light) that excites the phosphor materials which emit colored visible light and reflects the colored visible light. A composite sheet for the D2 layer may be complementary to the D1 layer: transmitting the colored visible light emitted by the phosphors and reflecting the excitation light (e.g., UV light). Such composite sheets may be formed of organic, inorganic or a combination of organic and inorganic materials. The multiple-layer composite sheet may be rigid or flexible. A flexible multi-layer composite sheet may be formed from polymeric, non-polymeric materials, or polymeric and non-polymeric materials. Exemplary films including a polymeric and non-polymeric material are disclosed in U.S. Pat. Nos. 6,010,751 and 6,172,810 which are incorporated by reference in their entirety as part of the specification of this application. An all-polymer construction for such composite sheets may offer manufacturing and cost benefits. If high temperature polymers with high optical transmission and large index differentials are utilized in the of an interference filter, then an environmentally stable filter that is both thin and very flexible can be manufactured to meet the optical needs of short-pass (SP) and (LP) filters. In particular, coextruded multilayer interference filters as taught in U.S. Pat. No. 6,531,230 can provide precise wavelength selection as well as large area, cost effective manufacturing. The entire disclosure of U.S. Pat. No. 6,531,230 is incorporated by reference as part of the specification of this application. The use of polymer pairs having high index differentials allows the construction of very thin, highly reflective mirrors that are freestanding, i.e. have no substrate but are still easily processed for constructing large screens. Such a composite sheet is functionally a piece of multi-layer optical film (MOF) and includes, e.g., alternating layers of PET and co-PMMA to exhibit a normal-incidence reflection band suitable for the screen applications of this application. As an example, an enhanced specular reflector (ESR) made out of a multilayer polyester-based film from 3M Corporation may be configured to produce the desired dichroic reflection and transmission bands for the present application. Examples for various features of multi-layer films are described in U.S. Pat. Nos. 5,976,424, 5,080,467 and 6,905,220, all of which are incorporated by reference as part of the specification of this application.

The dichroic layer D1 on the laser entry side of the screen in FIGS. 27A and 27B may be replaced by an layer of focusing cylindrical lenses respectively formed on different phosphor stripes. The surface of each lens facing the phosphor layer is coated with an optical reflector but with a narrow opening or slit aperture in the center of the lens to allow the excitation laser light to pass through and to enter the phosphor layer. The combined operation of the cylindrical lenses and the opening slits allows the excitation laser light to transmit to the phosphor layer while reflecting majority of the light coming from the phosphor layer back to the phosphor layer. The reflected light includes the excitation laser light and light emitted by the phosphor layer.

Figure 33:
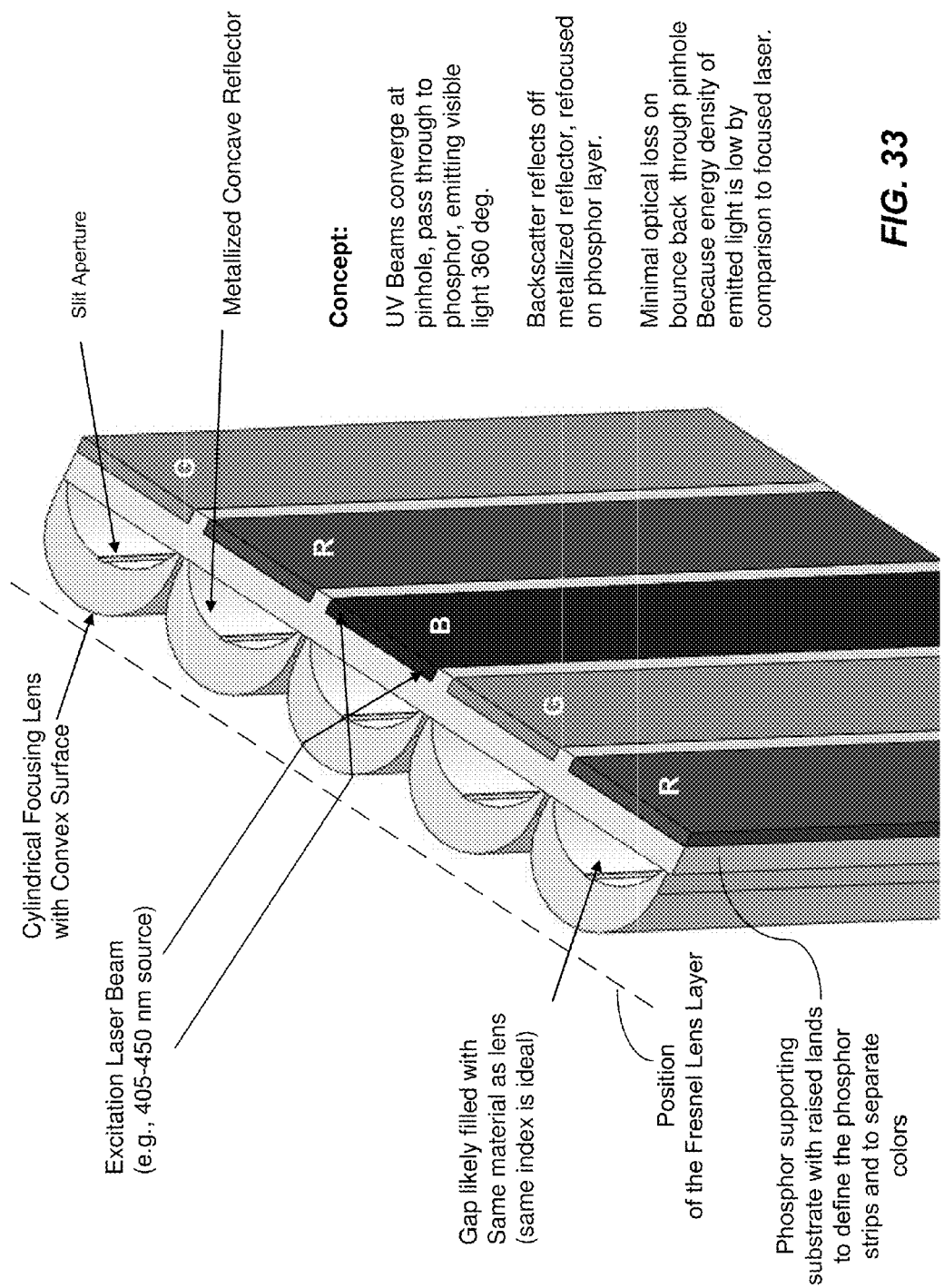
FIGS. 33 through 42B show examples of screen designs that use a reflector array layer with slit apertures to achieve a similar result of the combined operation of the two dichroic layers in designs in FIGS. 27A through 31.

FIG. 33 illustrates one example of such a screen. As illustrated, each cylindrical lens extends along its corresponding phosphor stripe and has a crescent shape. An index-matching material may be filled between the lens and the phosphor layer in some implementations. Each cylindrical lens is configured to focus the entry light at the slit aperture formed on the exiting surface of the lens. The combination of the slit aperture and the reflective surface formed on the surface of the lens facing the phosphor layer allows the UV laser light to transmit and the visible light emitted by the phosphor to reflect. A fraction of light emitted by the phosphors may hit the slit apertures and thus is not reflected back by the reflective surface. The optical loss caused by this fraction of light, however, is small and insignificant because the energy spatial density of the light emitted by the phosphors is small and the total area of each slit aperture is also small in comparison to the total area of the reflective surface in each subpixel. As such, the combination of the lens array, the slit apertures and the reflective surfaces enhances the image brightness with a high screen gain and a simple and low-cost structure.

The above combination of the lens array, the slit apertures and the reflective surfaces may be implemented in various configurations via different fabrication processes. Examples of some implementations are now described.

Figure 34A:
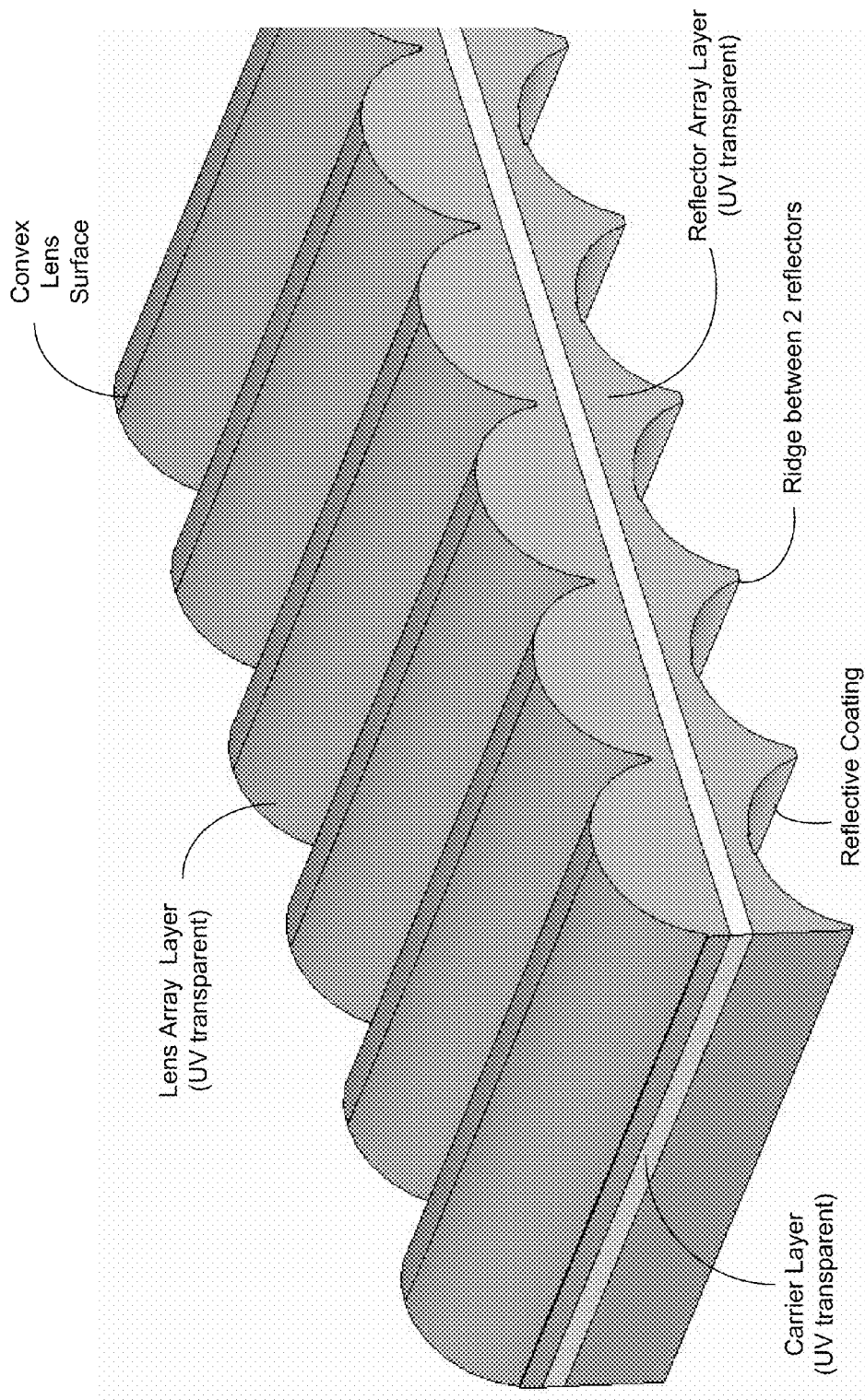
Figure 34B:
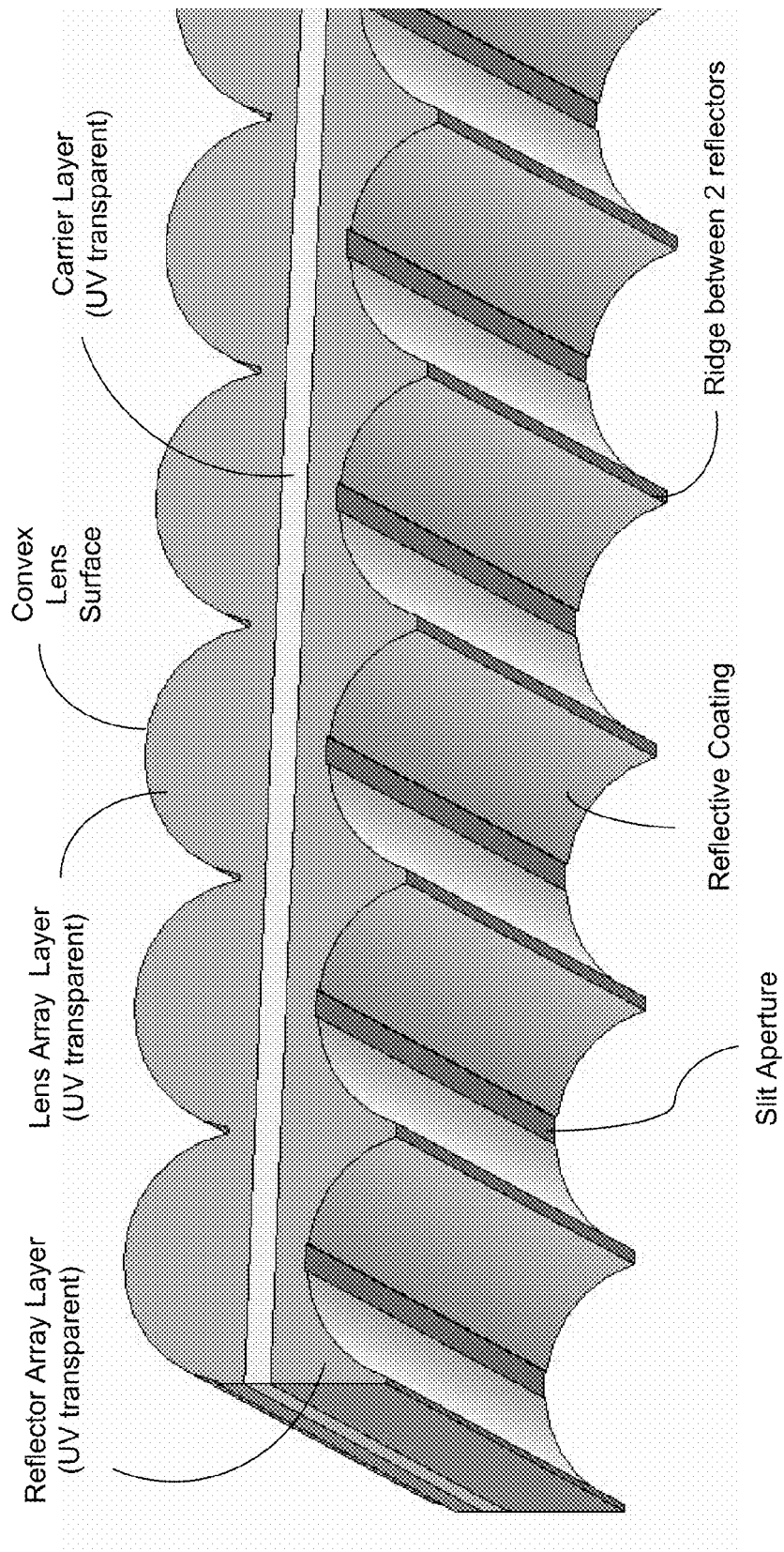

FIGS. 34A and 34B show one exemplary design of the combination of the lens array based on a three-layer construction. A batch level process may be used to fabricate a structure based on this design. As illustrated, a carrier layer is provided as the middle layer to carry the lens array layer on one side and the reflector array layer on the other side. The carrier layer is optically transparent to the excitation laser light and allows the excitation laser to transmit therethrough. The lens array layer is made of a material transparent to the excitation laser light and includes an array of cylindrical lenses in parallel along the direction of the phosphor stripes. Each cylindrical lens has a convex surface to focus the incident excitation laser light to the corresponding slit aperture in the reflector array layer. The reflector array layer is made of a material transparent to the excitation laser light and includes an array of cylindrical reflectors having concave reflective surfaces that are spatially aligned with the cylindrical lenses on the other side of the carrier layer, respectively. At or near the center of the concave reflective surface in each cylindrical reflector, a slit aperture is formed along the longitudinal direction of the reflector to divide the convex reflective surface into two separate parts. The geometry and dimension of the corresponding cylindrical lens on the other side of the carrier layer and the spacing between the lens and the slit aperture are designed to focus the incident excitation laser beam onto the slit aperture.

In other implementations, the designated carrier layer may be eliminated from the screen structure. For example, a substrate or sheet may be processed to monolithically fabricate optical elements such as the lens array on one side and the reflector array on the opposite side without separate the lens array layer, the carrier layer and the reflector array layer. Such a monolithic structure may be formed by embossing or pressing a substrate or sheet to form the optical structures, or by an extruding process through a die.

The geometries of the convex lens surfaces and the concave reflective surfaces may be different in some implementations and may be the same in other implementations. To simplify the fabrication tooling and the fabrication process, the convex lens surfaces and the concave reflective surfaces can be the identical curved surfaces and thus can be generated from the same diamond-turn master pattern using an embossing or extrusion fabrication process. The convex lens surface or the concave reflective surface may be designed in any suitable surface geometry that produces a sufficiently narrow focal spot at the slit aperture. Examples for surface shapes include, but are not limited to, a spherical surface, a hyperbolic surface, a parabolic surface, an elliptical surface, and an ellipsoidal surface. Simple spherical surfaces may be sufficient for many applications.

The materials for the lens array layer and the reflector array layer may be the same in some implementations and different in others. Various plastic materials, polymer materials and glass materials may be used for the lens and reflector array layers. The carrier layer may be a flexible layer or a rigid layer. Examples of materials suitable for a flexible carrier layer include, polyethylene terephthalate (PET), polycarbonate (PC), acrylic, polyvinyl chloride (PVC) and other plastic and polymer materials. During fabrication, the materials for the lens and reflector array layers are applied on the carrier layer and are shaped to their desired geometries. As an example, a radiation-curable resin, e.g., a UV-curable polymer, may be used for both the lens and reflector array layers. As the resin is applied on the carrier layer, the resin is exposed to the UV radiation beam and thus is cured.

One technical challenge to the design in FIGS. 34A and 34B is the alignment between the cylindrical lenses and their corresponding slit apertures. Referring back to the example in FIG. 33, the incident excitation laser beam is to be focused onto the slit aperture in order to pass through the concave surface and to minimize any optical loss. If there is a misalignment between the focusing position of the excitation laser beam by the lens and the position of the center of the corresponding slit aperture, a part of the excitation laser beam will be blocked by the slit aperture. Because the excitation laser beam is focused, the energy density of the beam at or near the slit aperture can be relatively high and thus the optical loss associated with the misalignment can be significant. As a result, the brightness of the associated color pixel is compromised. In many batch level processing procedures for making the lens and reflector array layers in the structure shown in FIGS. 34A and 34B, different layers are separately fabricated or processed at different stages of the fabrication process. Because errors can occur in each fabrication step and can occur from one position to another in the same fabrication step, there is no guarantee that the slit apertures on the reflective coatings of the concave surfaces are in alignment with the focusing positions of their corresponding lenses. In addition, different lenses may vary in their geometries and dimensions from one lens to another within the lens array layer due to the imperfections in the fabrication and this variation from one color pixel to another frustrates any attempt to systematically and uniformly controlling the above alignment in all color pixels. Apparently, any variation in optical loss from one color pixel to another can cause non-uniform brightness across the screen and thus can significantly degrade the image quality of the display.

In mass production of the screens shown in FIGS. 34A and 34B and other designs described in this application, the fabrication are generally controlled and executed at the batch level in a systematic control flow in order to be efficient and cost effective and to ensure the consistency in quality. The nature of this batch processing and systematic control may forbid different treatments for different pixels during the fabrication process. In recognition of these and other technical issues in fabricating the screens, a fabrication process is developed to allow for self-alignment between the lens and the slit aperture in each individual color pixel in a systematic controlled batch level fabrication flow. Under this process, the lenses and the slit apertures in all color pixels are individually and automatically aligned, respectively, without requiring separate treatment or handling of different pixels during the fabrication. FIGS. 35A through 35F illustrate one implementation of this self-alignment fabrication process.

Figure 35A:
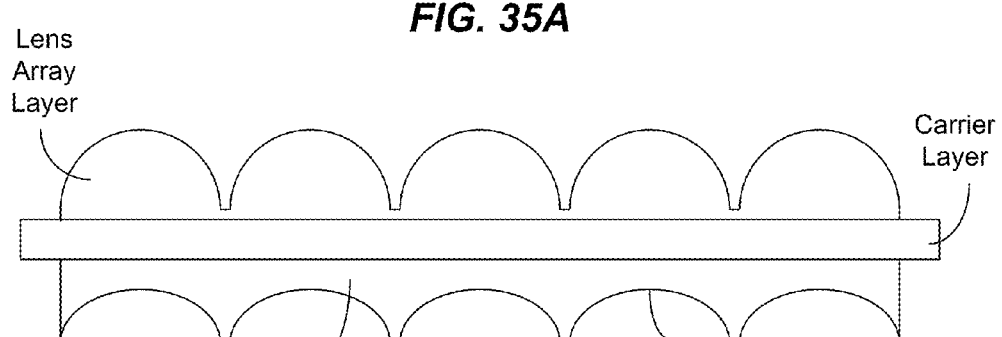

FIG. 35A shows a structure of the screen during the fabrication when the fabrication of the lens array layer on one side of the carrier layer has been completed. The reflector array layer on the other side of the carrier layer is partially completed when the concave surfaces for the reflectors are completed but the reflective coatings and the slit apertures have not been formed yet. The following photolithographic process for forming the reflective coatings and the slit apertures uses the already formed lenses in the lens array layer for the photo exposure and thus allows for self alignment in individual color pixels.

Figure 35B:
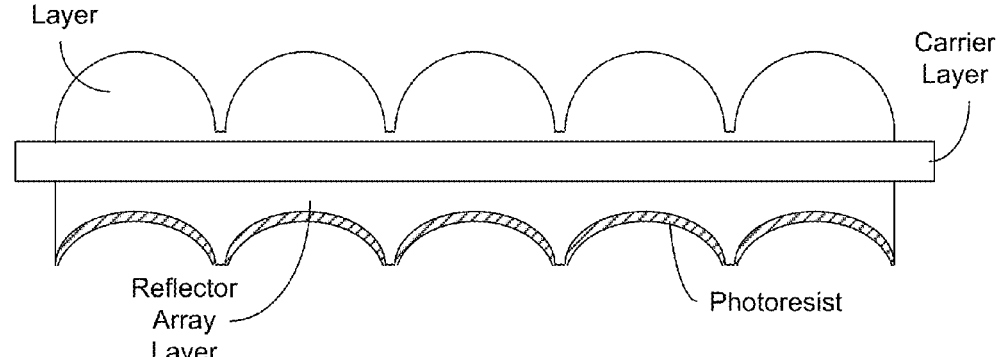
Figure 35C:
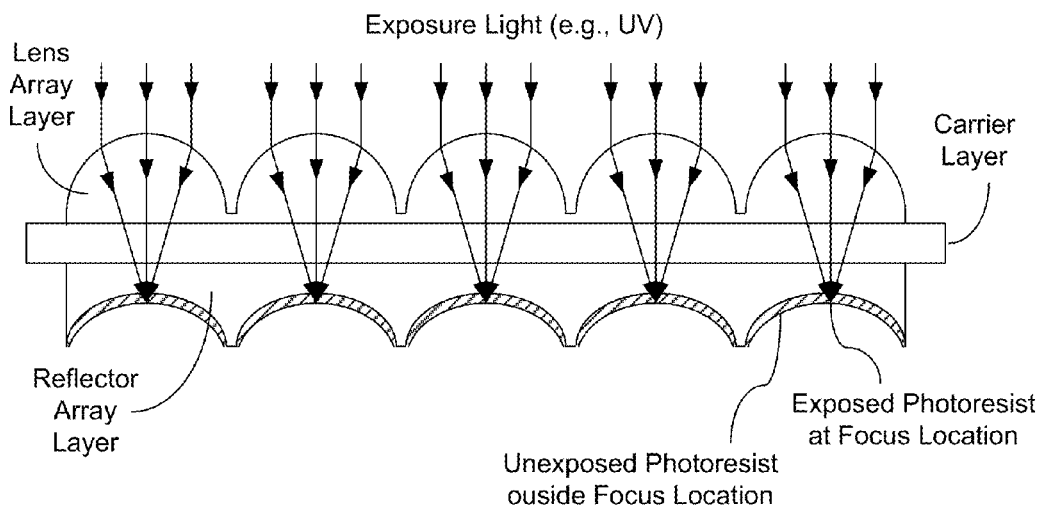

After the structure in FIG. 35A is completely, a photo resist layer is formed on the bare concave surfaces in the reflector array layer. This is shown in FIG. 35B. Instead of using a separate optical exposure system and a mask to expose the photoresist layer, the lenses already formed in the lens array layer on the other side of the carrier layer is now used as a "mask" to individually expose the photoresist layer in each concave surface in each pixel. As illustrated in FIG. 35C, multiple parallel laser beams (e.g., UV beams) are directed to the lens array in a direction normal to or substantially normal to the surface of the plane of the lens array layer. These beams are individually focused by the lenses onto their corresponding photoresist-covered concave surfaces in different pixels, respectively. Alternatively, a single beam may be used to expose one element at a time by scanning over the entire array. Because each lens is used to focus the beam for exposing the photoresist in its own pixel, the position of the exposed portion of the photoresist is automatically aligned with the lens. Notably, this alignment is done individually in each pixel and for each individual lens in the lens array layer regardless whether the lenses are identical to each other or not. Another feature of this process is that the photoresist layer may not be uniform.

Figure 35D:
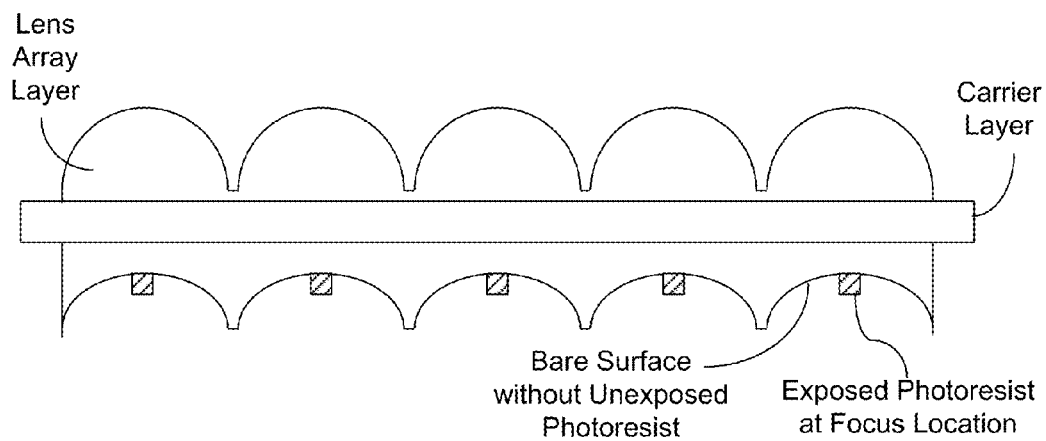
Figure 35E:
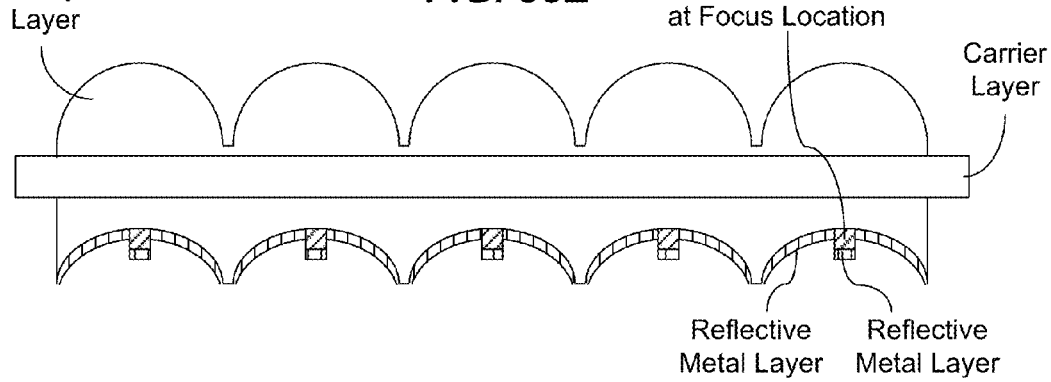
Figure 35F:
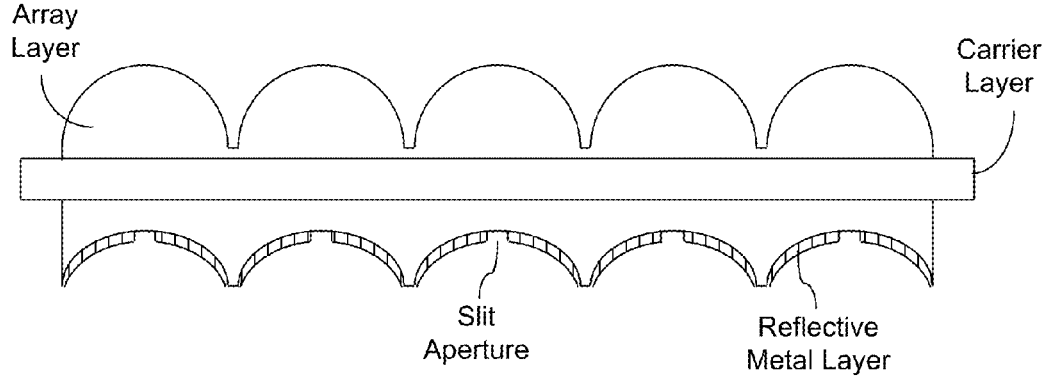

Next shown in FIG. 35D, the unexposed photoresist is removed by., e.g., washing away with a chemical solution. Subsequently, a reflective layer, e.g., an aluminum layer or other metallic layer is deposited on the bare concave surfaces and the top surfaces of the remaining exposed photoresist areas (FIG. 35E). Finally, shown in FIG. 35F, the exposed resist areas are removed along with the reflective materials on their top surfaces to leave the split aperture in the reflective layer formed in each concave surface. This removal process may be achieved by, for example, immersing the reflector array layer in a chemical solution that reacts or dissolves the exposed photoresist because the side areas of each exposed photoresist are exposed and are not covered by the deposited reflective material. FIGS. 34A and 34B show features of the structure after the above process is completed.

An alternative process for forming the optical slit apertures is laser ablation where a sufficiently powerful laser beam is used to ablate the reflective material such as a metal material of the reflector layer to form each slit aperture. Similar to the photo exposure process in the above photolithography process where the lens array is used to focus the exposure light beams to the desired focus locations on the photoresist layer, the lenses in the lens array layer can be used to focus the ablation laser beams in a self aligned manner. Referring to FIG. 35B, instead of forming the photoresist layer on the bare concave surfaces in the reflector array layer, a reflective layer such as a metal layer is deposited on the bare concave surfaces in the reflector array layer. Next in a similar manner as shown in FIG. 35C, an array of parallel ablation laser beams are directed and focused by the lenses in the lens array layer onto the focus locations of the reflective layer to form the slit apertures by ablating away the reflective material at the focus locations. Alternatively, a single ablation beam may be used to process one element at a time to form the slit apertures in the reflector layer. As an example, a laser with a high enough energy density at a slightly longer wavelength than the UV source imaging laser used in the photo exposure of the photoresist layer may be used to ablate the thin metal reflector to form the slit. As a more specific example, a 532-nm green laser may be used as the ablation layer to form the slit apertures. This ablation process uses the optical lenticular lenses in the lens array layer as a self-alignment tool to align and focus one or more ablation laser beams and eliminates a number of processes in the photolithography process described above. Hence, there is no need for any photomasking, exposure, and development steps. The slit width of the slit apertures can be controlled by controlling the ablation laser beam including, e.g., adjusting the ablation laser power, laser beam collimation, and the beam aperture.

Figure 36:
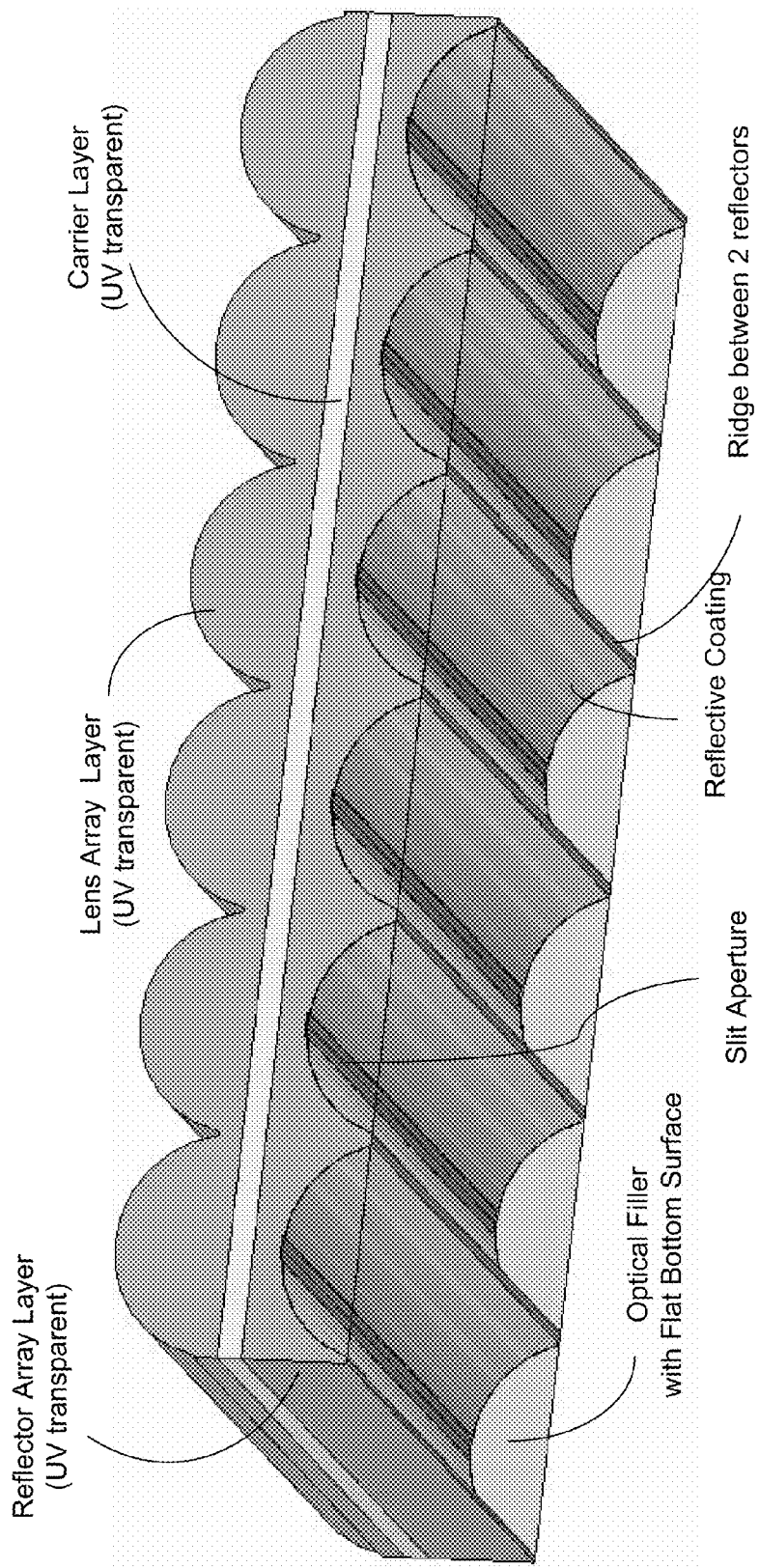

The screen structure in FIGS. 34A and 34B can be further processed to add parallel phosphor stripes. The space between the concave reflective surfaces and the corresponding phosphor stripes may be empty or filled with an optical transparent filler material. This optical filler allows light to propagate from the reflective surface to phosphor and may have a planar surface on which a phosphor material can be printed. FIG. 36 illustrates this design. In this and other designs with an optical filler between the phosphor stripes and the concave reflective surfaces, the optical filler material can be optically clear but need not be perfect. Various materials may be used as the optical filler. For example, the optical filler may be a UV-curable polymer or thermal curable polymer where the material is first filled in the semi-cylindrical reservoir cells formed by the concave surfaces and the divider ridges and is then cured. The optical filler may fill up to or below the plane of the reflector ridges so that ridges act as optical dividers to limit crosstalk between stripes. The ridges may be optically reflective or absorbent to better optically isolate adjacent phosphor stripes. For example, the ridges may be blackened with a black ink or other optically absorbing materials to reduce optical crosstalk between phosphor stripes. In one implementation, an optical film may be rolled over an ink roller during the web processing. In another implementation, a tacky material, such as an adhesive, may be first applied to the ridges and on top of the tacky material a black ink powder such as a carbon black powder may be applied. Next, the adhesive may be cured to bind the black powder. In yet another implementation, a black toner may be applied to the ridges similar to a laser printer or photocopier.

Figure 37:
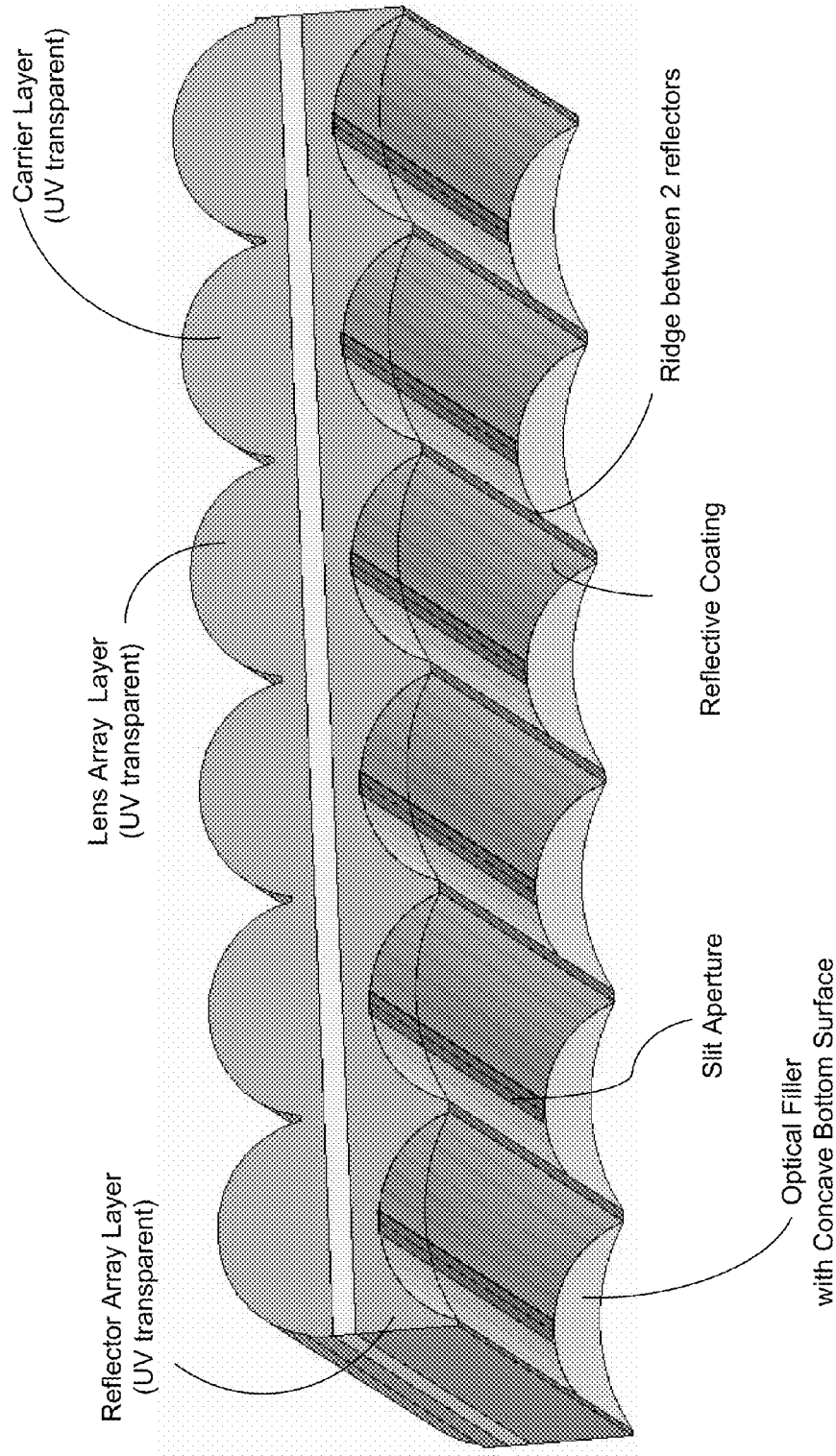
Figure 38:
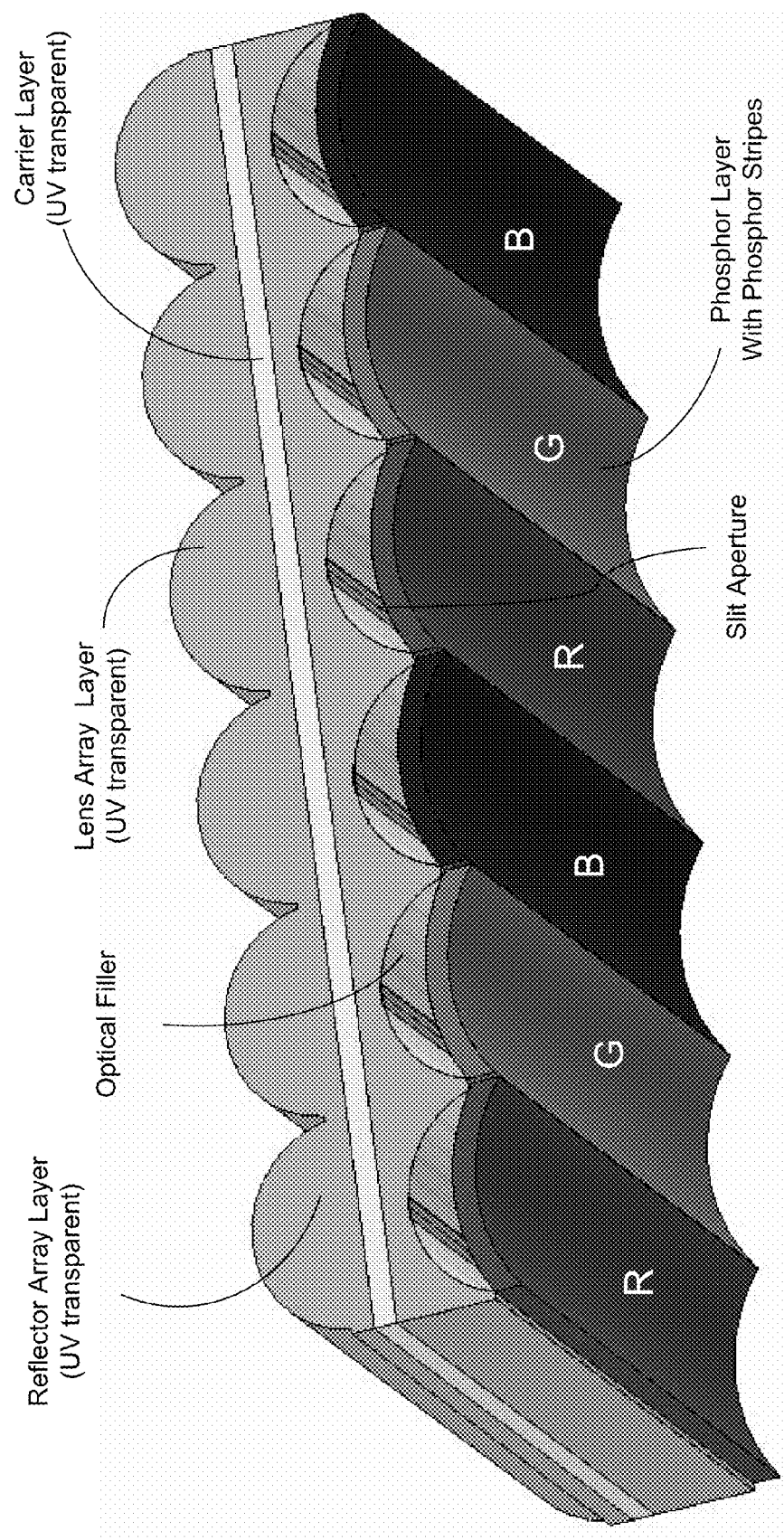

FIG. 37 shows another design of the optical filler where the exposed surfaces of the filler are not flat but are concave to form meniscus surfaces to improve the light isolation between two adjacent stripes. FIG. 38 illustrates a screen design where concave phosphor stripes are applied to the concave optical filler surfaces in FIG. 37 to form the final screen.

Figure 39:
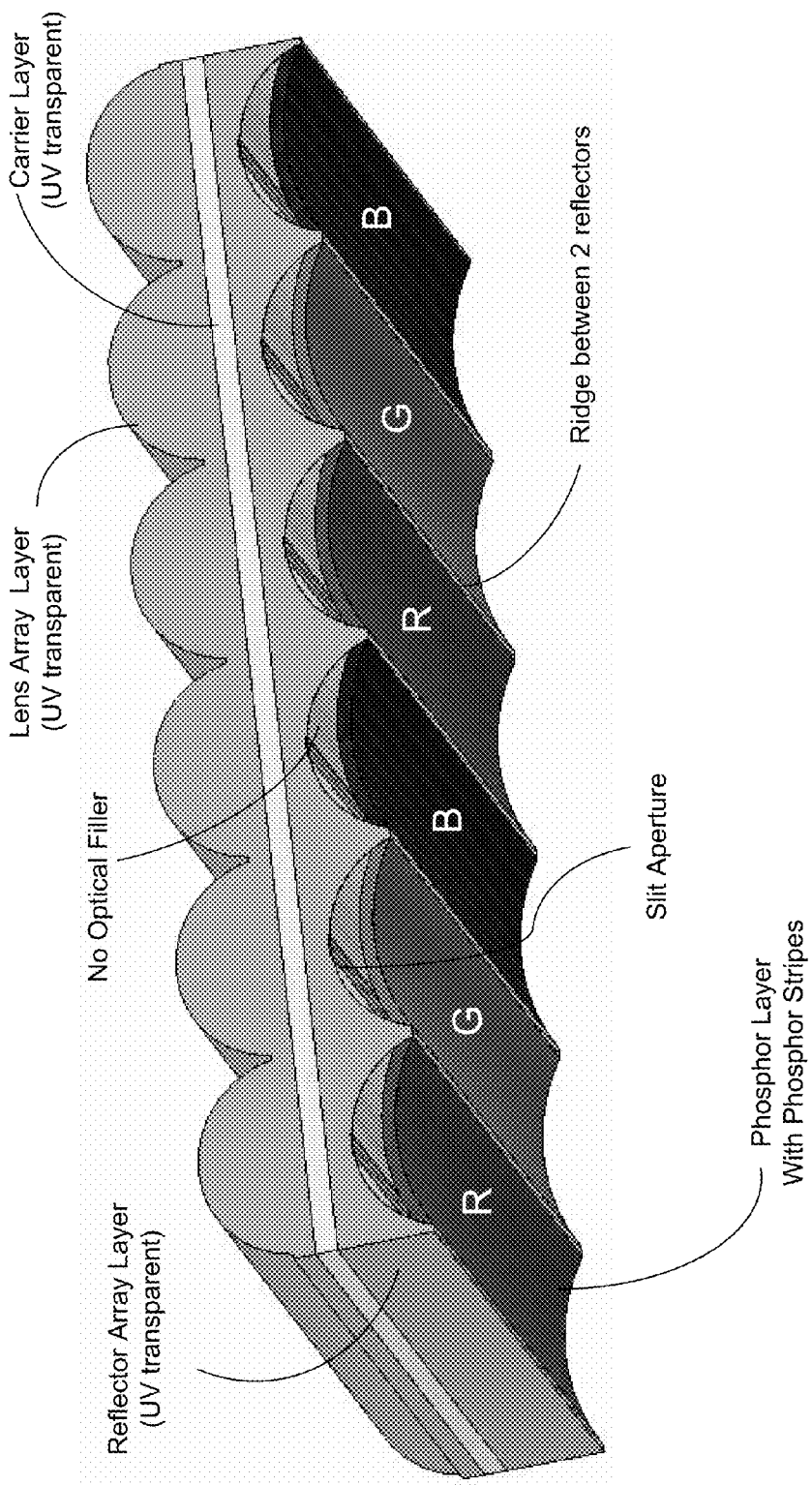

FIG. 39 shows a screen design where phosphor stripes are formed between ridges without the optical filler material between the concave reflective surfaces. In one implementation of this design, the phosphor layer may be deposited on the inner side walls of the ridges where the ridges serve as optical dividers to minimize crosstalk (optical color mixing at edges). The phosphor stripes may have either a planar or a concave bottom surface.

Phosphor stripes may be deposited by various methods. Examples include techniques such as screen printing of the "phosphor ink" in registration with the lens array and reflector array layers, selective UV tack with a distributed UV source to selectively pick up the phosphor as powder, and the electrostatic pickup. The inkjet printing for phosphor deposition may be implemented in various ways. In one implementation of the inkjet printing, a phosphor "ink" is produced by mixing a UV curable binder and a phosphor material, and is jetted through an inkjet nozzle orifice of a selected size, e.g., approximately 80 μm to print the phosphor ink on a surface. To properly position the inkjet nozzle for printing the phosphor ink at a reflector in the reflector layer, the screen may be illuminated from the side with the lens array layer and an optical detector is placed on the reflector layer side to track the bright transmission line emerging through the optical slit in each reflector. A servo mechanism tied to the inkjet nozzle can be used to position the nozzle in the proper location according to the detected transmission light by the optical detector as the nozzle sprays the phosphor ink into each reflector cavity. This method of depositing the phosphor can be used to achieve flexibility in volume control and contour shape of the phosphor layer in each reflector of the reflector layer. In this process, the inkjet nozzle does not directly contact the reflector surface. Such non-contact phosphor deposition is advantageous for manufacturing a screen that may be prone to damage via direct contact, such as the case when the inject nozzle moves at a high speed relative to the reflector layer in a high speed web process. This inkjet printing process may also be used to apply the optical filler material in the reflector layer and achieve flexibility in volume control and contour shape of the optical filler layer.

In some implementations, the phosphor layer may be further covered with a protection layer to isolate the phosphor stripes from external elements such as contaminants. The protection layer may be a polymer coating or other materials. In addition, a final rigid layer may be used to stiffen and protect the screen on the viewing side. The final layer would likely be a hard coating to prevent scratching of the screen.

Figure 40:
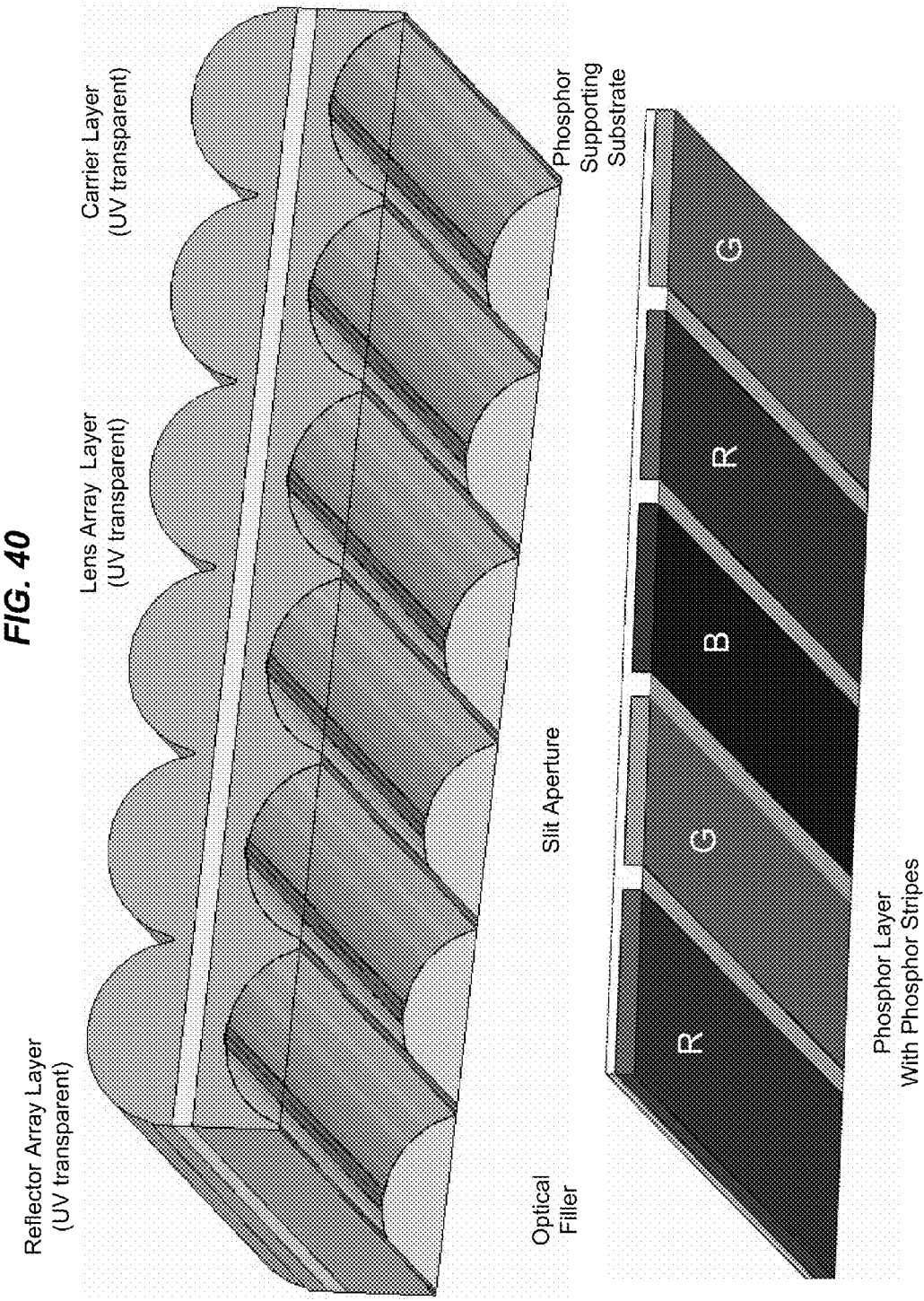

Referring back to FIG. 33, the phosphor layer may also be formed on a phosphor supporting substrate which is transparent to light and can be rigid or flexible. FIG. 40 further shows the assembly of the phosphor supporting substrate to the rest of the screen. The phosphor stripes may be directly printed on the supporting substrate to spatially align with and match the lens array and reflector array layers. Because the supporting substrate is separate from and is engaged to the rest of the screen, one difficulty is maintaining of the spatial alignment of the supporting substrate with respect to the lens array and reflector array layers under varying temperatures and humidity conditions.

Figure 41A:
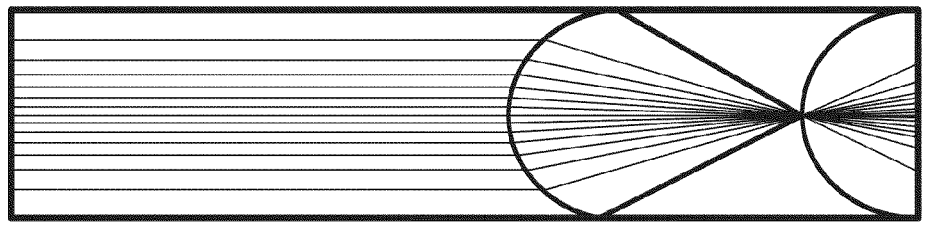
Figure 41B:
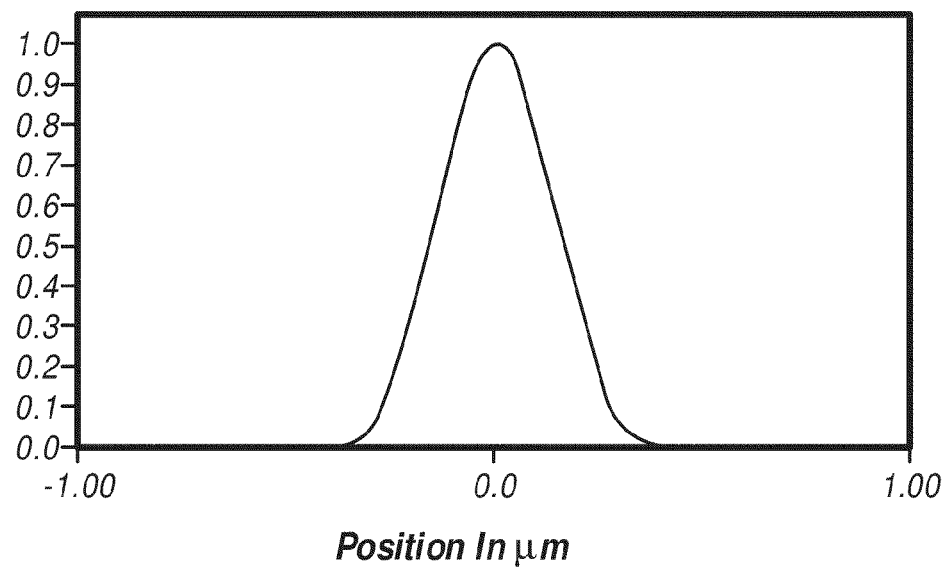

FIGS. 41A and 41B show one exemplary design for a lens in the lens array layer and the concave reflective surface for a pixel. FIG. 41A shows one exemplary design for a lens in the lens array layer and the concave reflective surface for a pixel. The lens surface has a shape which is ideally elliptical in shape but other convex shapes, such as circular, may be used to facilitate manufacturing. The lens surface causes the incident laser beam to focus down to a narrow beam which passes through a slit in the reflecting surface. FIG. 41B shows the shape of the focal spot at the slit, which is located at the apex of the concave reflective surface. The width of the slit should generally exceed the width of the focal spot for efficient transfer of laser energy to the phosphor screen. Light emitted by the phosphor surface that propagates back toward the reflecting surface will largely be redirected by that surface toward the phosphor and, as a result, toward the viewing side of the screen.

Figure 42A:
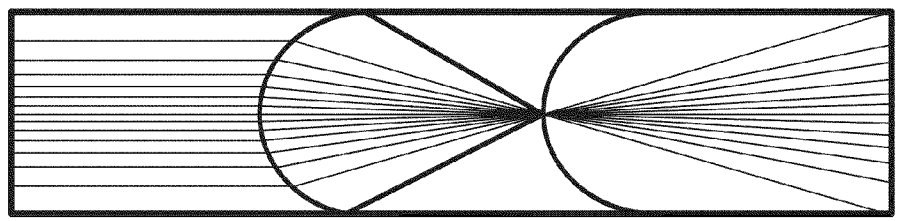
Figure 42B:
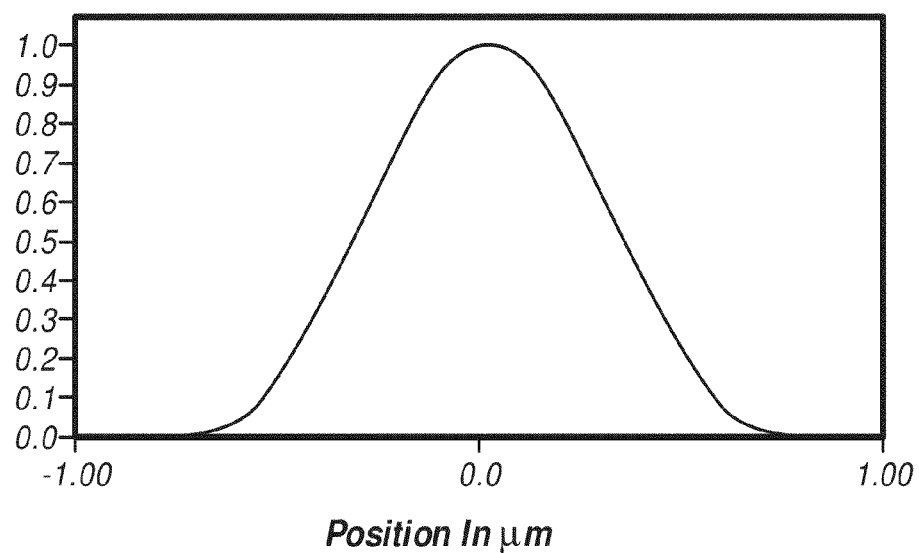

FIGS. 42A and 42B are functionally equivalent to FIGS. 41A and 42B. The difference is that the curved surfaces have shallower curvature and the thickness of the lens array layer is larger for FIG. 42A relative to FIG. 41A. FIG. 42A shows the shape of the focal spot at the slit, which is located at the apex of the concave reflective surface In the above examples, the reflective surfaces of the reflectors in the reflector array layer are concave in shape. In other implementations, other geometries for the reflective surfaces may also be used. For example, two or more reflective facets may be used as a combination in each reflector.

Referring to FIG. 33, the Fresnel lens used in the input side of the screen converting the input scanning excitation laser beam into an input beam perpendicular to the screen may be replaced by other optical element that performs the same optical function. For example, a microstructure diffractive optical element may be used to replace the Fresnel lens.

In the above screens with phosphor stripes, adjacent regions in the same stripe used for different subpixels of the same color for different color pixels may be better optically separated by having an optical divider between two adjacent sub-pixel areas within a phosphor stripe. The optical divider may be optically reflective or optically absorbent.

Figure 43:
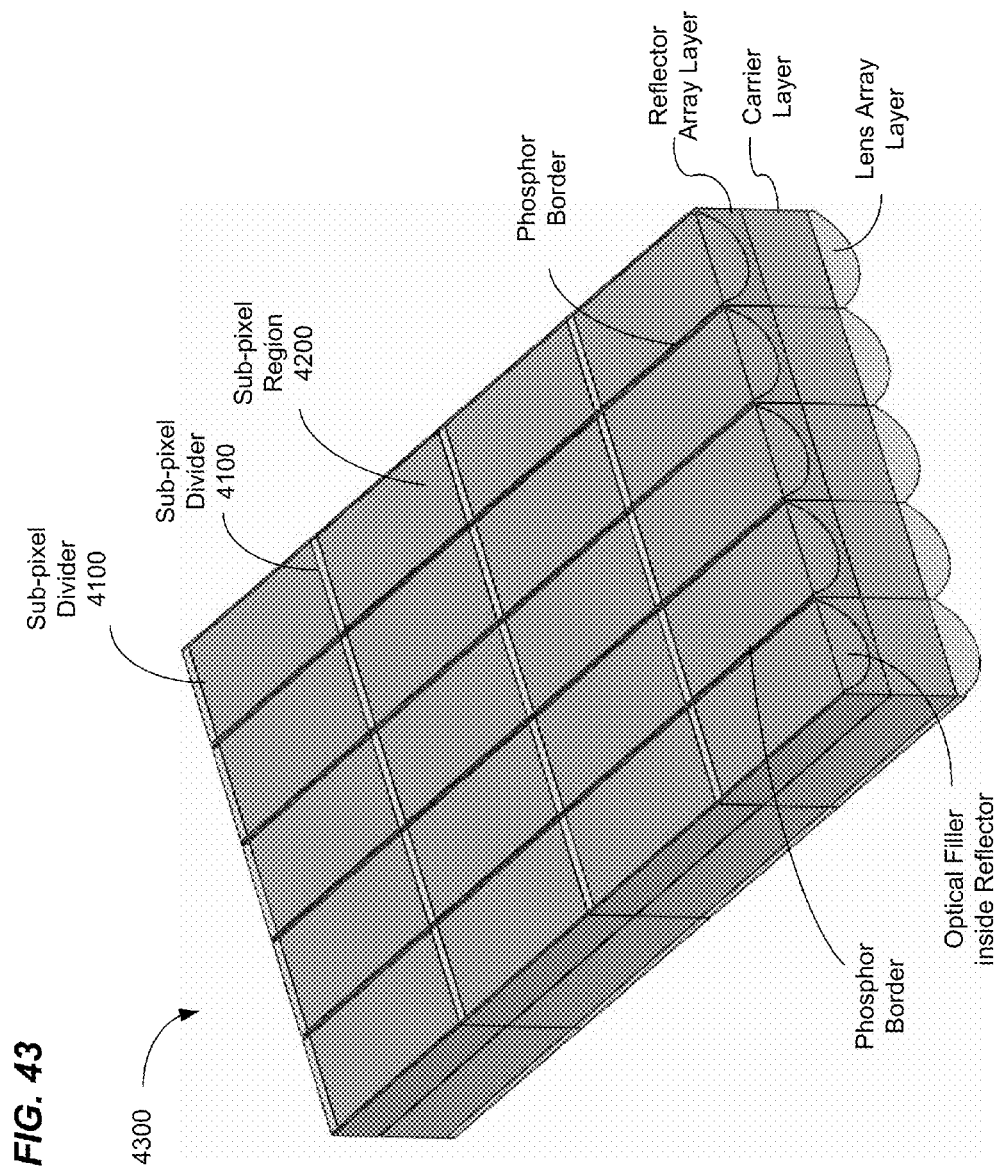
FIGS. 43 and 44 show two exemplary screens that optically separate different subpixel regions within each phosphor stripe to enhance contrast of the screens.

FIG. 43 shows one example of a screen 4300 having optically reflective or absorbent sub-pixel dividers 4100 that are perpendicular to the phosphor stripes to divide each phosphor stripe into sub-pixel regions 4200. The reflector array layer shown is implemented by parallel cylindrical reflectors having concave reflective surfaces in alignment with the cylindrical lens array. The dividers 4100 are formed in the concave space of the reflectors. This design reduces the crosstalk between different pixels. In the illustrated example, an optical filler is shown to fill in the concave space of the reflectors. Phosphor stripes are then formed on top of the reflector layer and the optical filler. In other implementations, phosphors may replace the optical filler to fill the concave space of the reflectors where the reflective concave surfaces also function to optically separate different phosphor stripes. In yet other implementations, the concave space of each reflector may be partially filled with an optical filler and, on top of the optical filler, a phosphor layer is formed to fill the remaining space in the concave space and to use the concave reflective surface of the reflector to optically separate phosphor from phosphor stripes in two adjacent phosphor stripes.

Figure 44:
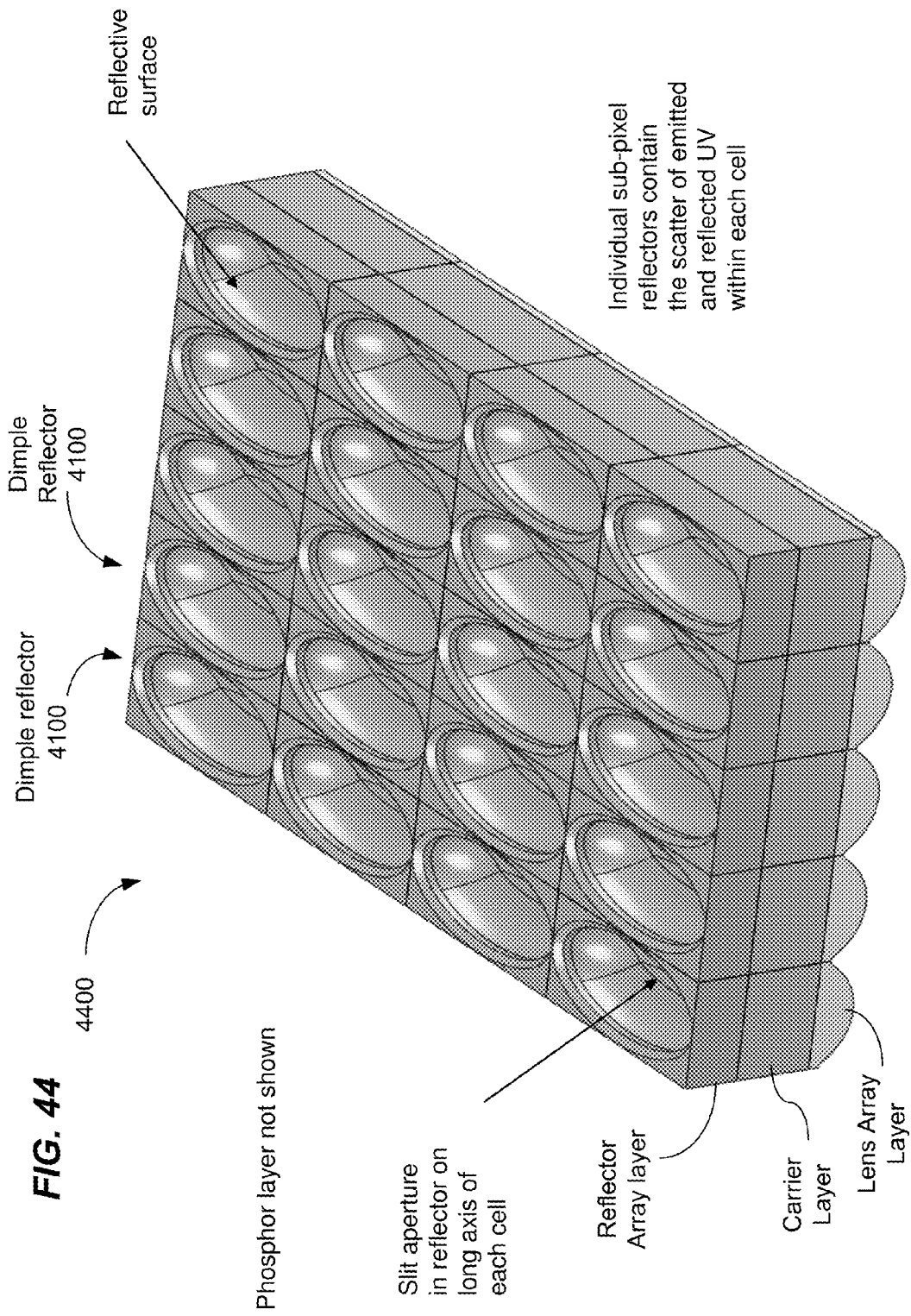

FIG. 44 shows an implementation where a screen 4400 includes a layer of separate reflectors 4410 arranged in a 2-dimensional array over the parallel phosphor stripes to define the subpixels. Each reflector 4410 is separated from adjacent reflectors by its boundaries and may be implemented, for example, as a dimple reflector as shown. Such a dimple reflector has a concave reflective surface within the boundary of each reflector andhad a center slit aperture whose elongated direction is along the elongated direction of the underlying phosphor stripe. The reflectors 4410 based on this and other designs provide optical separation between adjacent subpixels formed on either the same phosphor stripe and on different adjacent phosphor stripes.

The above techniques for providing optical separation of different subpixels can enhance the image contrast by reducing crosstalk between different pixels due to the internal structure of the screen. Various external factors may also adversely affect the contrast of the display systems described in this application. For example, a portion of the ambient light reflected off the screen may enter a viewer's eye along with the image signal and thus reduce the contrast of the image perceived by the viewer.

Figure 45:
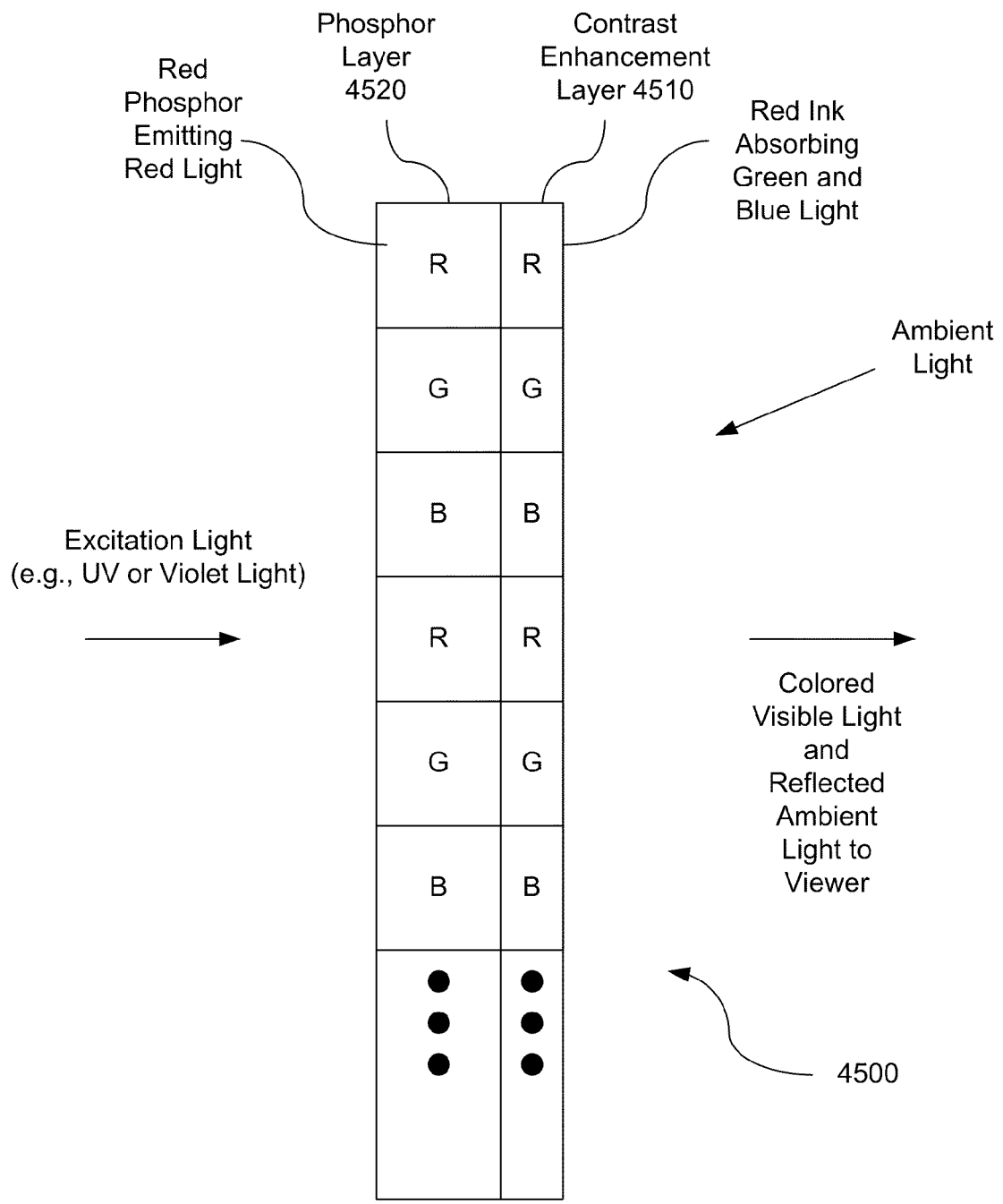
FIG. 45 illustrates one example of a screen that implements a contrast enhancement layer on the viewer side of the phosphor layer to reduce an adverse effect of the reflected ambient light on the screen contrast.

FIG. 45 shows one example of a screen design 4500 that uses a contrast enhancement layer 4510 on the viewer side of the phosphor layer 4520. The phosphor layer 4520 includes parallel phosphor stripes. Accordingly, the contrast enhancement layer 4510 also includes matching parallel stripes made of different materials. For a red phosphor stripe that emits red light in response to excitation by the excitation light (e.g., UV or violet light), the matching stripe in the contrast enhancement layer 4510 is made of a "red" material that transmits in a red band covering the red light emitted by the red phosphor and absorbs or otherwise blocks other visible light including the green and blue light. Similarly, for a green phosphor stripe that emits green light in response to excitation by UV light, the matching stripe in the contrast enhancement layer 4510 is made of a "green" material that transmits in a green band covering the green light emitted by the green phosphor and absorbs or otherwise blocks other visible light including the red and blue light. For a blue phosphor stripe that emits blue light in response to excitation by UV light, the matching stripe in the contrast enhancement layer 4510 is made of a "blue" material that transmits in a blue band covering the blue light emitted by the blue phosphor and absorbs or otherwise blocks other visible light including the green and red light. In FIG. 45, these matching parallel stripes in the contrast enhancement layer 4510 are labeled as "R," "G" and "B," respectively. Hence, the contrast enhancement layer 4510 includes different filtering regions that spatially match the fluorescent regions and each filtering region transmits light of a color that is emitted by a corresponding matching fluorescent region and blocks light of other colors. The different filtering regions in the layer 4510 may be made of materials that absorb other light of other colors different from the color emitted by the matching fluorescent region. Examples of suitable materials include dye-based colorants and pigment-based colorants. In addition, each of the R, G and B materials in the contrast enhancement layer 4510 may be a multi-layer structure that effectuates a band-pass interference filter with a desired transmission band. Various designs and techniques may be used for designing and constructing such filters. U.S.

Pat. Nos. 5,587,818 and 5,684,552, for example, describe red, green and blue filters that may be used in the design in FIG. 45.

In operation, the UV excitation light enters the phosphor layer 4520 to excite different phosphors to emit visible light of different colors. The emitted visible light transmits through the contrast enhancement layer 4510 to reach the viewer. The ambient light incident to the screen enters the contrast enhancement layer 4510 and a portion of the ambient light is reflected towards the viewer by passing through the contrast enhancement layer 4510 for the second time. Hence, the reflected ambient light towards the viewer has transmitted the contrast enhancement layer 4510 and thus has been filtered twice. The filtering of the contrast enhancement layer 4510 reduces the intensity of the reflected ambient light by two thirds. As an example, the green and blue portions comprise approximately two thirds of the flux of the ambient light entering a red subpixel. The green and blue are blocked by the contrast enhancement layer 4510. Only the red portion of the ambient light within the transmission band of the red filter material in the contrast enhancement layer 4510 is reflected back to the viewer. This reflected ambient light is essentially the same color for the subpixel generated by the underlying color phosphor stripe and thus the color contrast is not adversely affected.

Figure 46:
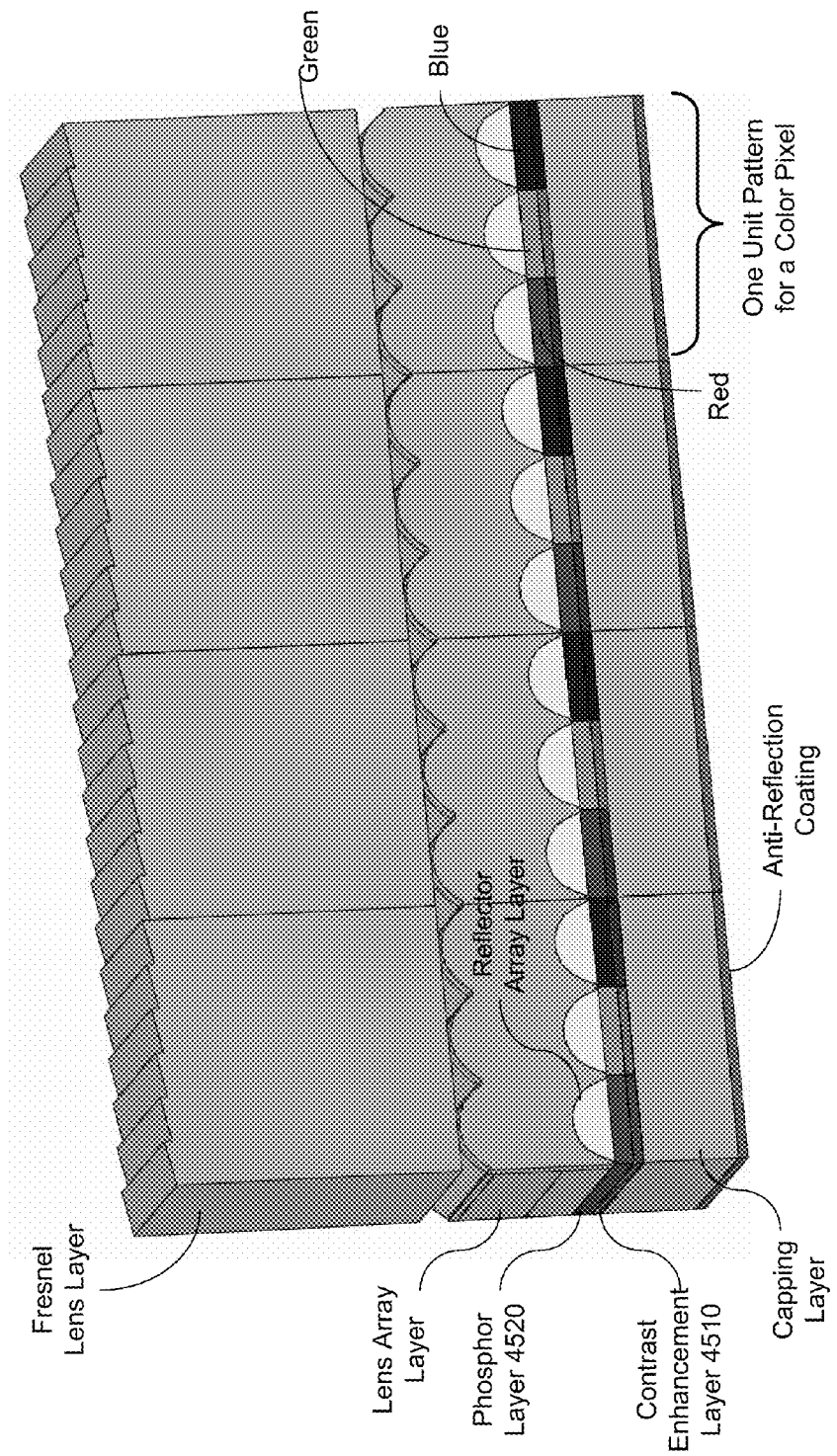
FIG. 46 shows an application of the contrast enhancement layer in a screen based on the designs shown in FIGS. 33 through 42B.

FIG. 46 illustrates one example of a screen structure that implements the contrast enhancement layer 4510 shown in FIG. 45. On one side of the phosphor layer 4520 are the Fresnel lens layer that receives the UV light, the lens array layer that focus the received UV light, and the reflector array layer that transmits the focused UV light through slit apertures and reflects light from the phosphor layer 4520 back. On the other side of the phosphor layer 4520 are the contrast enhancement layer 4510, and a capping layer with an anti-reflection coating which enhances the light transmission to the viewer. The reflector array layer may be implemented in any one of the structures described above, including the designs shown in FIGS. 43 and 44. The phosphor layer 4510 may alternatively be embedded in the concave space of the reflector array layer with or without an optical filter on the top.

In the above screen designs, the emitted colored light from the phosphor layer passes through various interfaces between two different layers or materials in the path towards the viewer. At each of such interfaces, a difference in the refractive indices at the two sides of the interface cause undesired reflection. In particular, the total internal reflection may occur at an interface when the emitted colored light propagates from a layer with an index higher than the next layer when the incident angle is greater than the critical angle of that interface. Therefore, the optical materials may be selected to have refractive indices as close as possible to minimize the reflection. The optical filler used in the concave space of the reflector array layer, for example, may be selected to match the index of the phosphor layer in order to get as much as possible the emitted visible light reflected from the reflector array layer through the phosphor layer to the viewer.

Only a few implementations are disclosed. However, it is understood that variations and enhancements may be made.

What is claimed is:

1. A device, comprising a display screen and an optical module that includes one or more lasers producing excitation light of one or more optical excitation beams modulated to carry optical pulses carrying images and scans the excitation light onto the display screen in a two dimensional pattern to direct the optical pulses at different locations on the display screen to display the images, wherein the display screen further comprises:

a fluorescent layer that absorbs excitation light to emit visible light, comprises a plurality of different fluorescent materials which absorb the excitation light to emit light at different visible wavelengths which are different in wavelength from the excitation light, and is patterned into parallel stripes, wherein three adjacent stripes are made of three different fluorescent materials and emit light at three different visible wavelengths, respectively, and define a color pixel dimension of the display screen, a first layer on a first side of the fluorescent layer to transmit the excitation light and to reflect the visible light, the first layer comprising a composite film stack of multiple polymer films that are coextruded to have alternating high and low refractive indices to form an optical interference filter, a second layer on a second side of the fluorescent layer to transmit the visible light and to block the excitation light, and a Fresnel lens located on the first side of the fluorescent layer to direct the excitation light of the one or more optical excitation beams scanned by the optical module at different incident angles at different locations on the display screen to be approximately normal to the first layer and the fluorescent layer.

2. The device as in claim 1, wherein the fluorescent layer comprises a phosphor material.

3. The device as in claim 2, wherein the phosphor material comprises nanoscale phosphor grains.

4. The device as in claim 2, wherein the phosphor material absorbs excitation light at an ultra violet wavelength.

5. The device as in claim 2, wherein the phosphor material absorbs excitation light at a violet wavelength.

6. The device as in claim 2, wherein the phosphor material absorbs excitation light at a wavelength less than 420 nm.

7. The device as in claim 2, wherein the fluorescent layer comprises a non-phosphor fluorescent material.

8. The device as in claim 7, wherein the fluorescent material comprises quantum dots.

9. The device as in claim 7, wherein the non-phosphor fluorescent material absorbs excitation light at an ultra violet wavelength.

10. The device as in claim 7, wherein the non-phosphor fluorescent material absorbs excitation light at a violet wavelength.

11. The device as in claim 7, wherein the non-phosphor fluorescent material absorbs excitation light at a wavelength less than 420 nm.

12. The device as in claim 1, wherein the Fresnel lens is in a telecentric configuration for the incident excitation light.

13. The device as in claim 1, wherein the display screen comprises a contrast enhancing layer formed over the second layer that comprises different filtering regions that spatially match the fluorescent stripes to receive and filter emitted visible light from the fluorescent layer, where each filtering region transmits light of a color that is emitted by a corresponding matching fluorescent stripe and blocks light of other colors.

14. The device as in claim 1, wherein each fluorescent stripe includes a boundary that separates the fluorescent stripe from an adjacent fluorescent stripe and is optically reflective.

15. The device as in claim 1, wherein each fluorescent stripe includes a boundary that separates the fluorescent stripe from an adjacent fluorescent stripe and is optically absorbent.

16. A device, comprising:

a display screen comprising a fluorescent layer that absorbs excitation light to emit visible light, wherein the fluorescent layer comprises a plurality of parallel fluorescent stripes, wherein at least three adjacent phosphor stripes are made of three different fluorescent materials: a first fluorescent material to absorb the excitation light to emit light of a first color, a second fluorescent material to absorb the excitation light to emit light of a second color, and a third fluorescent material to absorb the excitation light to emit light of a third color, the display screen further comprising dividers formed at boundaries between two adjacent fluorescent stripes to separate different fluorescent stripes and configured to reduce an amount of light emitted by one fluorescent stripe that enters an adjacent fluorescent stripe, and an optical module that includes one or more lasers producing excitation light of one or more optical excitation beams modulated to carry optical pulses carrying images and scans the excitation light onto the display screen in a two dimensional pattern to direct the optical pulses at different locations on the display screen to display the images, wherein the display screen further comprises a screen gain layer which modifies light emitted by the fluorescent layer, and wherein the screen gain layer comprises a diffractive optical element.

17. A device, comprising:

a display screen comprising a fluorescent layer that absorbs excitation light to emit visible light, wherein the fluorescent layer comprises a plurality of parallel fluorescent stripes, wherein at least three adjacent phosphor stripes are made of three different fluorescent materials: a first fluorescent material to absorb the excitation light to emit light of a first color, a second fluorescent material to absorb the excitation light to emit light of a second color, and a third fluorescent material to absorb the excitation light to emit light of a third color, the display screen further comprising dividers formed at boundaries between two adjacent fluorescent stripes to separate different fluorescent stripes and configured to reduce an amount of light emitted by one fluorescent stripe that enters an adjacent fluorescent stripe, and an optical module that includes one or more lasers producing excitation light of one or more optical excitation beams modulated to carry optical pulses carrying images and scans the excitation light onto the display screen in a two dimensional pattern to direct the optical pulses at different locations on the display screen to display the images, wherein the display screen further comprises:

a first layer on a first side of the fluorescent layer to transmit the excitation light and to reflect the visible light, and a second layer on a second side of the fluorescent layer to transmit visible light and to block the excitation light, wherein the first layer comprises a composite film stack of polymer films that are coextruded to have alternating high and low refractive indices and form an optical interference filter.

18. A device, comprising:

a display screen comprising a fluorescent layer that absorbs excitation light to emit visible light, wherein the fluorescent layer comprises a plurality of parallel fluorescent stripes, wherein at least three adjacent phosphor stripes are made of three different fluorescent materials: a first fluorescent material to absorb the excitation light to emit light of a first color, a second fluorescent material to absorb the excitation light to emit light of a second color, and a third fluorescent material to absorb the excitation light to emit light of a third color, the display screen further comprising dividers formed at boundaries between two adjacent fluorescent stripes to separate different fluorescent stripes and configured to reduce an amount of light emitted by one fluorescent stripe that enters an adjacent fluorescent stripe, and an optical module that includes one or more lasers producing excitation light of one or more optical excitation beams modulated to carry optical pulses carrying images and scans the excitation light onto the display screen in a two dimensional pattern to direct the optical pulses at different locations on the display screen to display the images, wherein the display screen further comprises:

a lens layer formed on the fluorescent layer, the lens layer comprising a plurality of cylindrical lenses having cylindrical axes parallel to the fluorescent stripes and being positioned to correspond to the fluorescent stripes, respectively, and a reflective layer coated on a lens surface of each cylindrical lens that faces the fluorescent layer and configured to have a slit aperture along the cylindrical axis of the cylindrical lens to transmit the excitation light while the excitation light entering at other positions of the cylindrical lens is blocked by the reflective layer.

19. A display device, comprising:

a carrier layer optically transparent to at least light of an excitation wavelength;

a lens array layer formed on a first surface of the carrier layer to include a plurality of lenses;

a reflector array layer optically transparent to the light of the excitation wavelength and formed on a second, opposite surface of the carrier layer to include a plurality of reflectors that spatially correspond to the lenses in the lens array layer, respectively, each reflector comprising a concave reflective surface facing away from the lens array layer and the carrier layer to reflect light and an aperture in the concave reflective surface at or near a center of each reflector to receive light of the excitation wavelength; and a fluorescent layer formed over the reflector array layer to include different fluorescent areas spatially corresponding to different reflectors to receive the light of the excitation wavelength that passes through the concave reflective surfaces of the reflectors, each fluorescent area comprising a fluorescent material to absorb the light of the excitation wavelength and to emit visible light.

20. The device as in claim 19, further comprising:

an input lens placed away from the lens array layer to direct the light of the excitation to be perpendicular to the lens array layer.

21. The device as in claim 20, wherein the input lens is a Fresnel lens.

22. The device as in claim 19, wherein the lenses in the lens array layer are a plurality of cylindrical lenses having cylindrical axes parallel to one another, and wherein the fluorescent layer comprises parallel fluorescent stripes positioned to spatially correspond to the cylindrical lenses, respectively.

23. The device as in claim 22, wherein each aperture in each reflector of the reflector array layer is a slit aperture along the cylindrical axis of the cylindrical lens.

24. The device as in claim 19, wherein edges in the reflector array layer between adjacent reflectors are blackened to reduce mixing of light emitted from different fluorescent areas.

25. The device as in claim 19, further comprising an optical filler material filled between the concave reflective surfaces and the fluorescent layer.

26. The device as in claim 19, wherein there is no material filled between the concave reflective surfaces and the fluorescent layer.

27. The device as in claim 19, further comprising a supporting substrate engaged to the reflector array layer to receive light from the reflector array layer, wherein the fluorescent layer is deposited on the supporting substrate.

28. The device as in claim 19, wherein each lens in the lens array layer has a focus at the aperture of a corresponding reflector in the reflector array layer.

29. The device as in claim 19, wherein the fluorescent layer comprise a phosphor material.

30. The device as in claim 29, wherein the phosphor material comprises nanoscale phosphor grains.

31. The device as in claim 19, wherein the fluorescent layer comprises a non-phosphor fluorescent material.

32. The device as in claim 31, wherein the non-phosphor fluorescent material comprises quantum dots.

33. The device as in claim 19, further comprising a contrast enhancing layer formed over the fluorescent layer to comprise a plurality of different filtering areas that spatially match the fluorescent areas of the fluorescent layer, where each filtering area transmits light of a color that is emitted by a corresponding matching fluorescent area and blocks light of other colors.

34. A method, comprising:
providing a structure which comprises a carrier layer optically transparent to at least light of an excitation wavelength, a lens array layer formed on a first surface of the carrier layer to include a plurality of lenses, and a reflector array layer formed on a second, opposite surface of the carrier layer to include a plurality of reflector areas that spatially correspond to the lenses in the lens array layer, respectively, each reflector area comprising a surface facing away from the lens array layer and the carrier layer;
forming a photoresist layer on the concave surface of each reflector area;
using the lenses in the lens array layer to direct and focus light through each individual lens onto a focus location on the photoresist layer to expose the illuminated photoresist at the focus location;
removing unexposed photoresist on the surfaces of the reflector areas in the reflector array layer;
depositing a layer of a reflective material on to a top surface of the exposed photoresist at the focus location in the concave surface of each reflector area and on remaining areas of the surface in each reflector area; and
removing the exposed photoresist at the focus location in the surface of each reflector area to remove the reflective material thereon, thus forming an aperture at the focus location and a reflective surface in the remaining areas of the concave surface in each reflector area.

35. The method as in claim 34, further comprising:
forming a phosphor layer formed over the reflector array layer to include different phosphor areas spatially corresponding to different reflectors to receive the light of the excitation wavelength that passes through the reflective surfaces of the reflectors.

36. The method as in claim 34, wherein the surface of each reflector area is a concave surface.

37. The method as in claim 34, wherein the surface of each reflector area is not a concave surface.

38. The method as in claim 34, wherein the surface of each reflector area includes at least two different surfaces.

39. A device, comprising an optical module and a screen which comprises:
a substrate;
a light-emitting layer formed on the substrate and comprising a plurality of fluorescent regions formed on the substrate, wherein at least two adjacent fluorescent regions include two different fluorescent materials that absorb excitation light to emit light at two different colors;
a contrast enhancing layer formed over the light-emitting layer comprising the fluorescent regions and comprising a plurality of different filtering regions that spatially match the fluorescent regions, where each filtering region transmits light of a color that is emitted by a corresponding matching fluorescent region and blocks light of other colors; and
a composite film stack positioned in an optical path of the excitation light between the light-emitting layer and the optical module to receive the excitation light from the optical module and to transmit the excitation light to the light-emitting layer, the composite film stack reflecting the colored light emitted by the light-emitting layer,
wherein the optical module is positioned relative to the screen and includes one or more lasers producing excitation light of one or more optical excitation beams modulated to carry optical pulses carrying images, the optical module scanning the excitation light onto the display screen in a two dimensional pattern to direct the optical pulses at different locations on the display screen to display the images.

40. The device as in claim 39, wherein the fluorescent materials comprise phosphor materials.

41. The device as in claim 40, wherein the phosphor materials comprise nanoscale phosphor grains.

42. The device as in claim 39, wherein the fluorescent materials comprise non-phosphor fluorescent materials.

43. The device as in claim 42, wherein the non-phosphor fluorescent materials comprise quantum dots.

44. The device as in claim 39, wherein the composite film stack comprises films which have different refractive indices between two adjacent films and are laminated or fused with one another to transmit the excitation light and to reflect the colored light emitted by the light-emitting layer.

* * * * *

UNITED STATES PATENT AND TRADEMARK OFFICE
CERTIFICATE OF CORRECTION

| | |
|---|---|
| PATENT NO. | : 7,733,310 B2 |
| APPLICATION NO. | : 11/337170 |
| DATED | : June 8, 2010 |
| INVENTOR(S) | : Roger A. Hajjar et al. |

It is certified that error appears in the above-identified patent and that said Letters Patent is hereby corrected as shown below:

On the Title Page, item (56), under "OTHER PUBLICATIONS", in Column 2, Line 1, please delete "luminesence" and insert -- luminescence --, therefor.

On the Title Page, item (56), under "OTHER PUBLICATIONS", in Column 2, Line 2, please delete "commerical" and insert -- commercial --, therefor.

On the Title Page, item (56), under "OTHER PUBLICATIONS", in Column 2, Line 4, please delete "Mary" and insert -- May --, therefor.

On the Title Page, item (56), under "Primary Examiner", in Column 2, Line 1, please delete "Mengitsu" and insert -- Mengistu --, therefor.

On Title Page 4, item (56), under "OTHER PUBLICATIONS", in Column 1, Line 2, please delete "Wo" and insert -- WO --, therefor.

On Title Page 4, item (56), under "OTHER PUBLICATIONS", in Column 2, Line 3, please delete ""Screening,"" and insert -- "Screening, --, therefor.

On Title Page 4, item (56), under "OTHER PUBLICATIONS", in Column 2, Line 4, please delete "tube." and insert -- tube". --, therefor.

On Title Page 4, item (56), under "OTHER PUBLICATIONS", in Column 2, Line 7, please delete "CaGa2S4:Ce" and insert -- $CaGa_2S_4:Ce$ --, therefor.

In Fig. 9, Sheet 5 of 46, please delete "ONE ONE-HUNDRED" and insert -- ONE/ONE-HUNDRED --, therefor.

In Fig. 35C, Sheet 34 of 46, please delete "ouside Focus" and insert -- outside Focus --, therefor.

Signed and Sealed this
Eleventh Day of October, 2011

David J. Kappos
*Director of the United States Patent and Trademark Office*

CERTIFICATE OF CORRECTION (continued)
U.S. Pat. No. 7,733,310 B2

Column 5, Line 21, please delete "(Ga.sub.2-y-z  Al$_y$In$_z$S4)" and insert -- (Ga$_{2-y-z}$Al$_y$In$_z$S$_4$) --, therefor.

Column 5, Line 40, please delete "monoklinic YalO and YalO-perovskite, Y,Ln)" and insert -- monoclinic YAlO and YAlO-perovskite, (Y,Ln) --, therefor.

Column 5, Line 44, please delete "OnN$_{16-n}$" and insert -- O$_n$N$_{16-n}$ --, therefor.

Column 6, Line 38, please delete "Sr$_{y,Euz}$)$_2$" and insert -- Sr$_y$,Eu$_z$)$_2$ --, therefor.

Column 9, Line 37, please delete "luminesce" and insert -- luminescence --, therefor.

Column 9, Line 38, please delete "excitation. is" and insert -- excitation. --, therefor.

Column 13, Line 27, please delete "horizontal" and insert -- the horizontal --, therefor.

Column 13, Line 29, please delete "on the the" and insert -- on the --, therefor.

Column 16, Line 40, please delete "2030B" and insert -- 2003B --, therefor.

Column 20, Line 9, after "Al$_5$O$_{12}$:" insert -- Ce --.

Column 20, Line 26, please delete "(Ce, Nd," insert -- (Ce, Pr, Nd, --, therefor.

Column 20, Line 28, please delete "Sr$_x$Ba$_y$Ca$_2$" and insert -- Sr$_x$Ba$_y$Ca$_z$ --, therefor.

Column 21, Line 38, please delete "(Ga.sub.2-y-z  Al$_y$In$_z$S$_4$)" and insert -- (Ga$_{2-y-z}$Al$_y$In$_z$S$_4$) --, therefor.

Column 24, Line 50, please delete "o≤x≤1 and o≤y≤1 and O≤z≤1" and insert -- 0≤x≤1 and 0≤y≤1 and 0≤z≤1 --, therefor.

Column 24, Lines 51-52, please delete "o≤x≤1 and o≤y≤1 and O≤z≤1" and insert -- 0≤x≤1 and 0≤y≤1 and 0≤z≤1 --, therefor.

Column 24, Lines 53-54, please delete "o≤x≤1 and o≤y≤ x+y=1." and insert -- 0≤x≤1 and 0≤y≤1 x+y=1. --, therefor.

Column 25, Line 3, please delete "phorsphor" and insert -- phosphor --, therefor.

Column 25, Line 16, please delete "Ln$_x$B$_2$⊙$_8$" and insert -- Ln$_x$B$_2$O$_8$ --, therefor.

Column 25, Line 38, please delete "SrS:EU$^{2+}$" and insert -- SrS:Eu$^{2+}$ --, therefor.

CERTIFICATE OF CORRECTION (continued)

Column 25, Line 52, please delete "monoklinic YalO and YalO-perovskite," and insert -- monoclinic YAlO and YAlO-perovskite, --, therefor.

Column 26, Line 30, please delete "On" and insert -- $O_n$ --, therefor.

Column 26, Line 54, please delete "Al$_{(m+n-)}$" and insert -- Al$_{(m+n)}$ --, therefor.

Column 29, Line 55, please delete "(Lasi$_3$N$_5$)" and insert -- (LaSi$_3$N$_5$) --, therefor.

Column 30, Line 2, please delete "phosphoer" and insert -- phosphor --, therefor.

Column 30, Line 41, please delete "Cl:Eu$^{2+}$" and insert -- Cl:Eu$^{2+}$. --, therefor.

Column 31, Lines 38-39, please delete "electroluminesces" and insert -- electroluminescences --, therefor.

Column 32, Lines 26-27, please delete "X+Y+Z=1; Z>0; and 0.05<W<0.50" and insert -- x+y+z=1; z>0; and 0.05<w<0.50 --, therefor.

Column 32, Line 28, please delete "X+Y+Z=1; 0.01≦Z≦0.1; and 0.1≦W<0.50. X and Y" and insert -- x+y+z=1; 0.01≦z≦0.1; and 0.1≦w<0.50. x and y --, therefor.

Column 34, Line 27, please delete "0.75and" and insert -- 0.75 and --, therefor.

Column 34, Lines 41-54, please delete "A phosphor screen layer epitaxy" and insert the same at Line 40, after "display screen", as a continuation of the paragraph.

Column 37, Line 57, please delete "MnCl$_2$H$_2$S" and insert -- MnCl$_2$, H$_2$S --, therefor.

Column 38, Line 1, please delete "Y2020S:Eu   3+" and insert -- Y$_2$O$_2$S:Eu$^{3+}$ --, therefor.

Column 38, Line 19, please delete "fabricatingscreens" and insert -- fabricating screens --, therefor.

Column 38, Line 21, please delete "CaGa2S4:Ce" and insert-- CaGa$_2$S$_4$:Ce --, therefor.

Column 38, Line 25, please delete "Ca(thd)2" and insert -- Ca(thd)$_2$ --, therefor.

Column 41, Lines 33-34, please delete "contruct" and insert -- construct --, therefor.

Column 45, Line 45, please delete "needfor" and insert -- need for --, therefor.

Column 47, Line 35, please delete "surface" and insert -- surface. --, therefor.

Column 48, Line 14, please delete "andhad" and insert -- and had --, therefor.